United States Patent [19]

Inadome et al.

[11] Patent Number: 5,018,843
[45] Date of Patent: May 28, 1991

[54] ZOOM LENS APPARATUS WITH LENS UNITS FOR ZOOMING AND FOCUSING

[75] Inventors: Kiyotaka Inadome; Hitoshi Imanari, both of Kawasaki; Kunihiro Fukino, Fujisawa; Toru Takayama, Yokohama, all of Japan

[73] Assignee: Nikon Corporation, Tokyo, Japan

[21] Appl. No.: 447,576

[22] Filed: Dec. 7, 1989

[30] Foreign Application Priority Data

Dec. 8, 1988 [JP] Japan .................. 63-311494
Jun. 6, 1989 [JP] Japan .................. 1-143819

[51] Int. Cl.$^5$ ............................................. G02B 15/00
[52] U.S. Cl. .................................... 350/429; 350/423; 350/465
[58] Field of Search ............... 350/429, 430, 255, 423, 350/455, 456, 462, 465

[56] References Cited

U.S. PATENT DOCUMENTS 4,275,952 6/1981 Uesugi .................................. 350/429
4,315,670 2/1982 Shigoku .............................. 350/429

FOREIGN PATENT DOCUMENTS 57-4018 1/1982 Japan .
58-202416 11/1983 Japan .

Primary Examiner—Bruce Y. Arnold
Assistant Examiner—Loha Ben
Attorney, Agent, or Firm—Shapiro and Shapiro

[57] ABSTRACT

A zoom lens barrel has a lens unit with both functions of zooming and focusing, comprises a first cyindrical member having a zoom guide groove (or zoom cam) corresponding to a zooming orbit of displacement of the lens unit with both the functions of zooming and focusing and a second cylindrical member having a focus guide groove (or focus cam) for displacing the lens unit with the functions of zooming and focusing along an optical axis for focusing. The focus guide groove or focus cam is non-linear and has an area inclined with respect to the optical axis to permit the relative displacement of the first and second cylindrical members to each other in the optical axis direction necessary for the focusing of a given object to be held substantially constant irrespective of the status of zooming and also permit the displacement of the lens unit with both the functions of zooming and focusing for focusing to be varied according to the status of zooming.

10 Claims, 26 Drawing Sheets

FIG. 3A  |ΔF|>|ΔX|
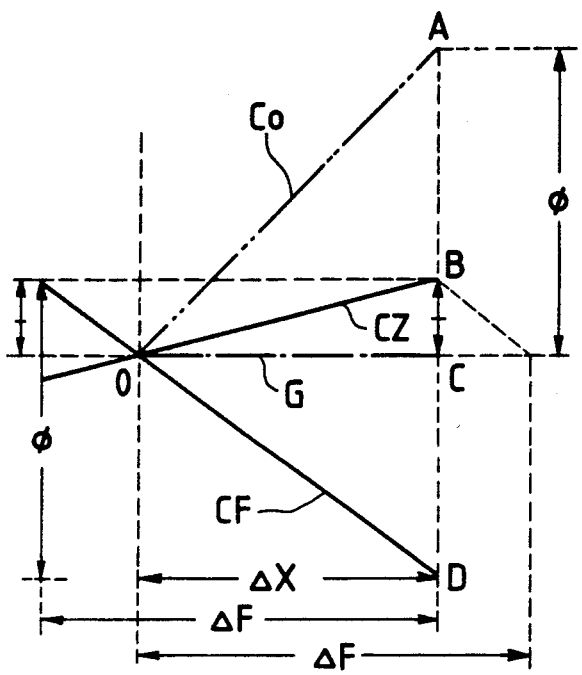
FIG. 3B  |ΔF|<|ΔX|
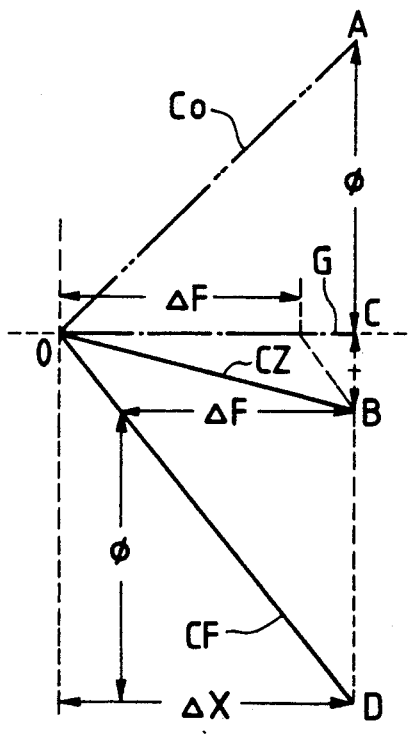

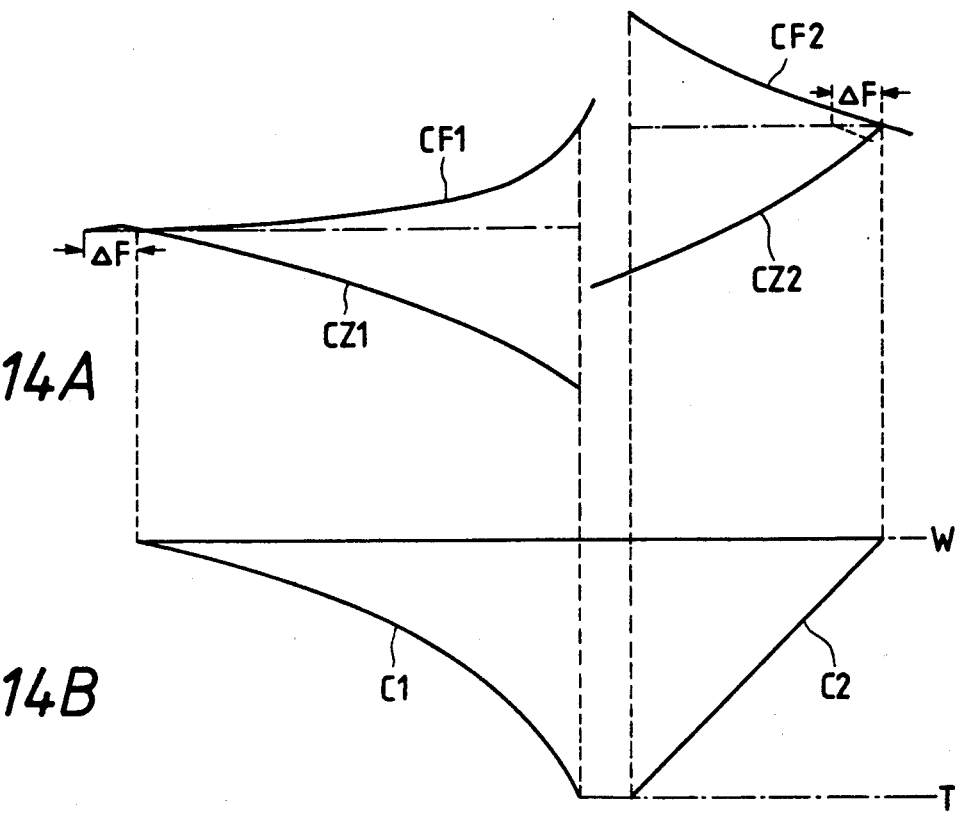
FIG. 14A
FIG. 14B
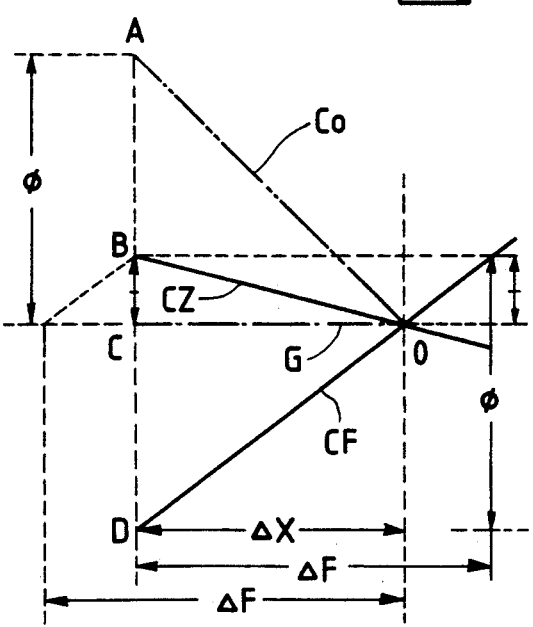
FIG. 15

|ΔF| > |ΔX|

|ΔF| < |ΔX|

$\Delta F > \Delta X$ $\Delta F < \Delta X$

|ΔF| > |ΔX|

|ΔF| < |ΔX|

$\Delta F > |\Delta X|$

ZOOMING FOCUSING FOCUS CAM $\Delta F < |\Delta X|$

ZOOMING FOCUSING FOCUS CAM

FIG. 21A
|ΔF| > ΔX
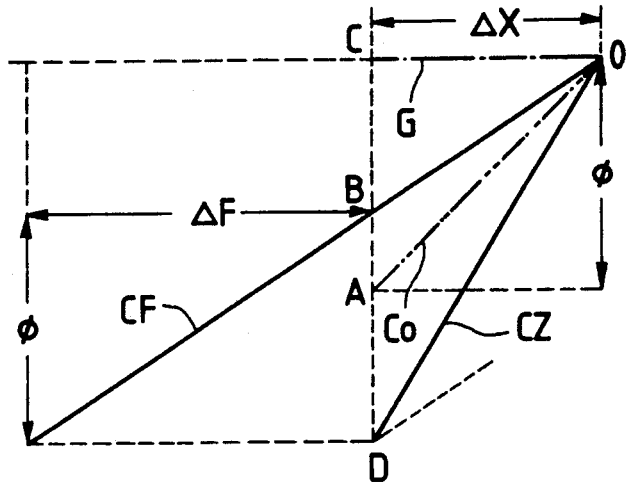
FIG. 21B
|ΔF| < ΔX
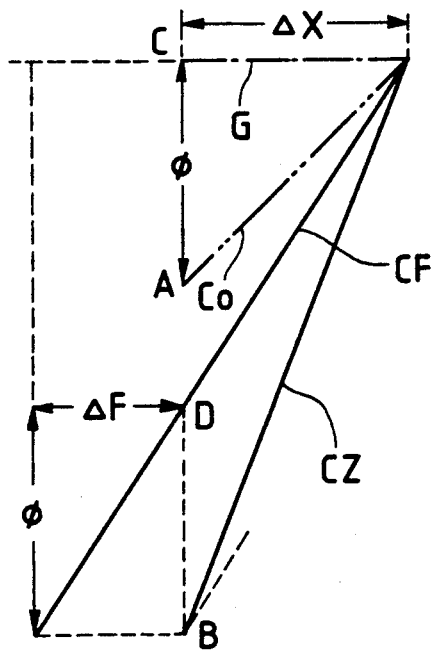

FIG. 22A
$|\Delta F| > \Delta X$
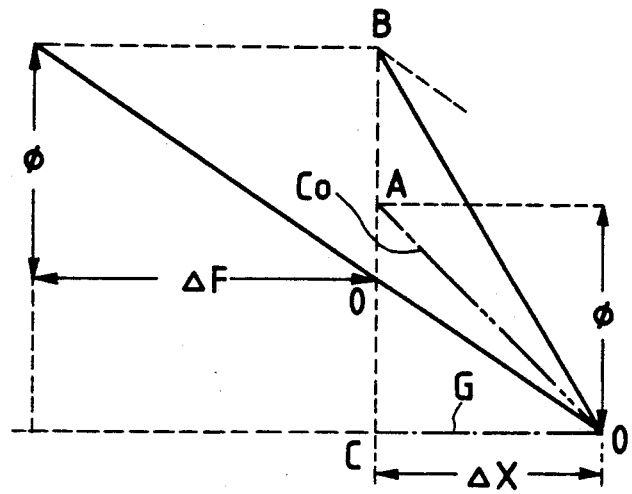
FIG. 22B
$|\Delta F| < \Delta X$
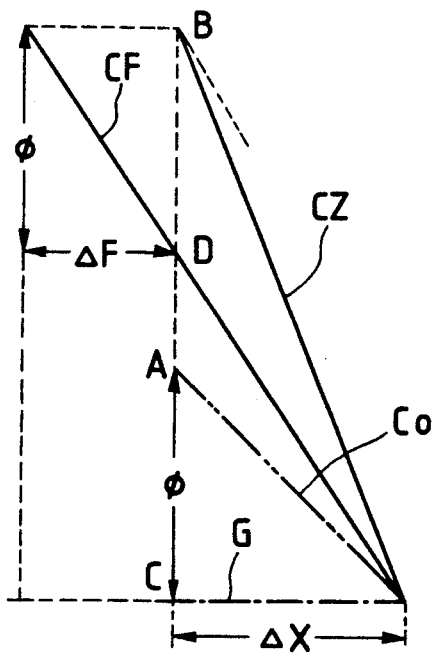

$\Delta F > |\Delta X|$

ZOOMING FOCUSING FOCUS CAM ← $\Delta F$ $\Delta F < |\Delta X|$

ZOOMING FOCUSING FOCUS CAM ← $\Delta F$

ZOOM LENS APPARATUS WITH LENS UNITS FOR ZOOMING AND FOCUSING

BACKGROUND OF THE INVENTION

1. Field of the Invention

This invention relates to a focusing apparatus for a zoom lens and, more particularly, to a focusing apparatus suitable for zoom lenses of an inner or rear focus system based on displacement of some lens units in a lens system and also of an object side lens feed system based on displacement of object side lens units or a whole lens feed system based on displacement of whole lens units.

2. Related Background Art

As a focusing system for a zoom lens, there are those of a so-called object side lens feed system, in which object side lens units nearest to the object side are displaced, an inner or rear focus system, in which some lens units in a lens system are displaced, and of a whole lens feed system, in which the whole lens system is displaced for focusing. Usually, in the inner or rear focus system and in the whole lens feed system, the necessary extent of feed for the same object distance is changed with changes in the focal distance of the overall lens system. Therefore, even when focusing is done with an object distance corresponding to a given focal distance, by changing the focal distance through zooming the position of focus is greatly changed. This means that the focusing should be done every time zooming is done.

There are proposed various methods of automatically and electrically effecting the focusing of lens. These methods may be utilized for auto-focus systems but can not be utilized for a commonly termed manual focus system, in which the focusing is done by manually operating a distance adjustment ring (or focus ring).

Further, even in case of application to an auto-focus system a time is necessary for calculating the extent of feed necessary for zooming every time zooming is done, thus posing problems in view of the quickness feature of the auto-focus system. In the object side lens feed system, with a zoom lens system of a variable length a reduction of the object distance increases the difference of feed extent due to the focal distance, thus giving rise to the problems as noted above.

As a method of solving the above problems, there is known system, in which the transverse magnification of a focusing lens unit is changed with zooming such that the extent of feed of lens units at the time of focusing is fixed irrespective of the focal distance. An example of such zoom lens is disclosed in Japanese Patent Laid-Open Application Sho 58-202416. In this disclosed lens system, for focusing three focusing lens units are displaced independently of zooming and in unison with one another substantially for a fixed extent irrespective of the focal distance.

As an entirely difference method, Japanese Patent Laid-Open Application Sho 57-4018 discloses a structure, in which a novel focusing cam for interlocking a zooming mechanism and a focusing mechanism to each other is provided to permit focusing structurally irrespective of change in the feed extent with changes in the focal distance.

However, in the method noted above, in which the extent of feed for focusing is substantially constant irrespective of changes in the focal distance, i.e., changes in the state of zooming, a plurality of lens units are displaced in unison with one another for focusing. Therefore, it is impossible to adopt a floating mechanism for suppressing close aberration variations, i.e., vary relative air distances of the individual focusing lens units to one another at the time of focusing, that is, it is impossible to maintain high performance when close focusing is done.

In the method using a novel focusing cam for interlocking the zooming and focusing mechanism to each other, curves as shown in FIG. 25, obtained as intersections curved surfaces representing the extent $\Delta x$ of feed of focusing lens unit as a function of the inverse $1/F$ of focal distance and object distance R and planes parallel to a $1/F - \Delta x$ plane and corresponding to various values of R, are displaced in parallel displacement along the $1/F$ axis to obtain a single substitute curve, which is utilized as focus cam.

In this method, focusing can be obtained even if the extent of feed of the focusing lens unit varies with the focal distance. However, since curves corresponding to various values of R (object distance) are displaced by parallel displacement for substitution by a single curve, it is difficult to realize focusing in case when the extent of feed is not changed simply with the focal distance.

Further, where the floating for suppressing the close aberration variations is adopted for the focusing lens unit, the extent of parallel displacement in the stage of obtaining the focus curve from the individual curved surfaces is no longer fixed, and hence no correspondence between the extent of parallel displacement and focus cam for lens unit can be obtained. Besides, the extent of feed by floating is not presumably changed simply due to aberrations, and it is liable that a focus cam fails to be realized for each focusing lens unit.

SUMMARY OF THE INVENTION

The present invention has an object of solving the above drawbacks inherent in the prior art by the provision of a zoom lens apparatus, which has a simple construction such that the displacement of a member movable for focusing is held substantially constant irrespective of changes in the focal distance, i.e., changes in the status of zooming and nevertheless permits displacement of focusing lens unit at the time of focusing to be changed by an optimum amount according to the status of zooming as well as permitting utmost use of the freedom of the lens system in close focusing to maintain high performance.

To attain the above object of the invention, there is provided a zoom lens apparatus having a lens unit with both functions of zooming and focusing, which comprises a first cylindrical member having a zoom guide groove (or zoom cam) corresponding to a zooming orbit of displacement of the lens unit with both the functions of zooming and focusing and a second cylindrical member having a focus guide groove (or focus cam) for displacing the lens unit with both the functions of zooming and focusing along an optical axis for focusing.

The first and second cylindrical members are rotated relative to each other about the optical axis of the zoom lens apparatus to cause displacement of the lens unit with both the functions of zooming and focusing along the optical axis to an extent determined by a displacement of an engaging member engaged in and movable along the zoom and focus cams noted above at the intersection thereof, thus obtaining a desired zooming;

Further, these cylindrical members are displaced relative to each other in the direction of the optical axis to cause displacement of the lens unit with both the functions of zooming and focusing along the optical axis to an extent determined by the displacement of the point of intersection between the zoom and focus cams, thus obtaining a desired focusing. The above constitution is disclosed in a U.S. application Ser. No. 203,639 filed by the same assignee as this application on June 3, 1988, now U.S. Pat. No. 4,963,006. A feature of the present invention resides in that the focus guide groove or focus cam is non-linear and has an area inclined with respect to the optical axis to permit the relative displacement of the first and second cylindrical members to each other in the optical axis direction necessary for the focusing of a given object to be held substantially constant irrespective of the status of zooming and also permit the displacement of the lens unit with both the functions of zooming and focusing for focusing to be varied according to the status of zooming.

With this construction according to the invention, both zooming and focusing can be obtained with the first and second cylindrical members having zoom and focus cams, respectively, and the relative displacement of the first and second cylindrical members to each other in the optical axis direction necessary for the focusing of an object at a constant from an infinitely distant photographing state may be held substantially constant irrespective of the zooming status.

According to the invention, a zoom guide groove formed in a rotary cam cylinder for defining a zooming orbit of displacement of a zooming lens unit in the usual zoom lens and a guide groove parallel to the optical axis for defining the displacement of the lens unit in the direction of the optical axis and direction perpendicular thereto. Thus, even when the extent of feed of the focusing lens unit itself is changed with a changed in the zooming status or when a floating mechanism for suppressing close aberration variation is assumed, focusing is possible for the focusing lens unit itself is displaced along an orbit which is traced for zooming. Therefore, the invention is applicable to a commonly termed manual focus system as well and also permits increasing the focusing speed at the time of auto-focusing.

More specifically, for expressing the orbit of displacement of the lens unit for zooming, the displacement of the lens unit in the direction of the optical system and angle $\theta$ of rotation of a commonly termed cam cylinder perpendicular to the optical axis are used as respective variable for conversion of variable displacement $\Delta x$ of the focusing lens unit in the optical axis direction for focusing in a given state of zooming to variable rotation $\phi$ of the rotary cam cylinder in the orbit of displacement. To this end, a guide groove which was hitherto a straight line parallel to the optical axis is modified to a non-linear curved focus guide groove (or focus cam) at an angle to the optical axis.

Further, to match the relation between the orbit traced by the focusing lens unit for zooming and linear orbit in the guide groove before the modification, the orbit of displacement of the focusing lens unit for zooming, i.e., zoom guide groove (or zoom cam) is modified to the direction of the rotational angle $\theta$ of the rotary cam cylinder. With such modifying operation, the shapes of the zooming and focusing guide grooves (i.e., zoom and focus cams) is determined.

With such modification of the shape of guide grooves, focusing is obtained with displacement of the focusing lens unit along an orbit (zoom cam) which is traced for zooming. For zooming, the focus and zoom cams having the modified shapes are relatively rotated to each other about the optical axis, that is either the modified focus of zoom cam is displaced in the direction perpendicular to the optical axis. By so doing, the position of the lens unit having the zooming function on the optical axis is change to effect zooming. At the time of focusing, even if the extents of displacement of the individual lens units in the optical axis direction are different with respect to an object of the same object distance, the focusing can be attained by merely displacing the focus cam of the modified shape substantially by the same amount in the optical axis direction to the same extent $\Delta F$. At this time, the commonly termed floating for compensation for the close aberration variations due to relative displacement of focusing lens units may be adopted for focusing. In this case, if the displacement for focusing is different with different focusing lens units or with different zooming conditions, the focusing can be obtained by merely displacing the focus cam substantially by the same extent $\Delta F$ in the optical axis direction.

The above and other objects, features and advantages of the invention will become fully apparent from the following detailed description of the preferred embodiments with reference to the accompanying drawings.

BRIEF DESCRIPTION OF THE DRAWINGS

FIG. 3A is a view for explaining cam orbit modification in case when the displacement of the focus cam in the optical axis direction is greater than the displacement of the focusing lens units;

FIG. 3B is a view for explaining cam orbit modification in case when the displacement of the focus cam in the optical axis direction is smaller than the displacement of the focusing lens units;

FIGS. 14A and 14B are developed diagrams showing cam orbits of zoom and focus cams in an embodiment of the invention, in which all the lens units in the zoom lens shown in FIG. 13A can be displaced for focusing;

FIG. 15 is a view for explaining the operation of deriving modified orbits of cams shown in FIGS. 14A and 14B;

FIGS. 16A and 16B to 23A and 23B are views for explaining the operation of deriving modified orbits of cams according to the invention on the basis of the extent relation between relative displacement ΔF of focus and zoom cams to each other in the optical axis direction and displacement ΔX of lens units displaced for focusing in the optical axis direction, direction of displacement of focusing lens units at the time of zooming, direction of displacement of focusing lens units at the time of focusing and direction of relative displacement of the focus and zoom cams to each other at the time of focusing;

DESCRIPTION OF THE PREFERRED EMBODIMENTS

Preferred embodiment of the invention will now be described with reference to the accompanying drawings.

Figure 1A:
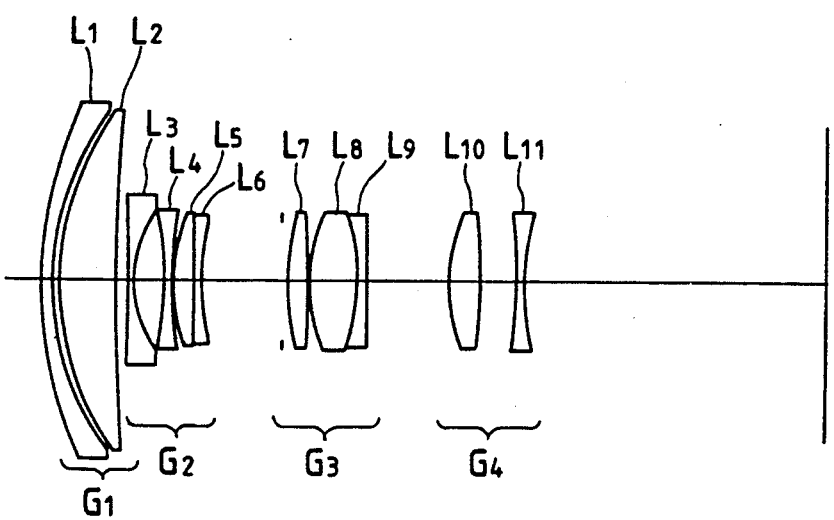
FIG. 1A is a schematic view showing a zoom lens having a four-lens unit structure used for an embodiment of the invention.

FIG. 1A shows a zoom lens for a first embodiment of the invention. This zoom lens comprises first lens unit G1 having positive refracting power, second lens unit G2 having negative refracting power and third and fourth lens units G3 and G4 having positive refracting power, these lens units being arranged in the mentioned order from the object side. For zooming from wide angle side to telephoto side, all the lens units are displaced along the optical axis to the object side, while for focusing third and fourth lens units G3 and G4 are displaced along the optical axis.

The structures of the individual lens units will now be described. First lens unit G1 having positive refracting power includes negative meniscus lens L1 with convex surface on the object side and positive lens L2 with surface of stronger radius of curvature on the object side, these lenses being arranged in the mentioned order from the object side. Second lens unit G2 having negative refracting power includes negative lens L3 with surface of stronger radius of curvature on the image side, negative lens L4 having concave surfaces on both sides, positive lens L5 with surface of stronger radius of curvature on the object side and negative lens L6 bonded to lens L5 and with surface of stronger radius of curvature on the image side. Third lens unit G3 having positive refracting power includes positive lens L7, positive lens L8 and negative lens L9 bonded thereto. Fourth lens unit G4 having positive refracting power includes positive lens L10 with surface having stronger radius of curvature on the object side and lens L11 with concave surfaces on both sides.

Table 1 shows specifications of this zoom lens. Represented by f is the focal distance, and FN the F number. In the upper part of the Table 1, represented by r is the radius of curvature of lens surface, d the distance between lens surfaces, n the refractive index, and V the abbe's number. The suffix figures are ordinal numbers from the object side. In the middle part of Table 1 there are shown numerical values of coefficients representing the shape of non-spherical surface formed as the object side lens surface (r20) of final lens L11.

This non-spherical surface is represented by a non-spherical surface equation given as $$x = \frac{h^2/r}{1 + \sqrt{1 - kh^2/r^2}} + \sum_{i=1}^{5} A_{2i} \cdot h^{2i}$$

where h represents the height from the optical axis, x the distance of the non-spherical surface at the height h from the plane of contact of the apex, k a conic constant, A2, A4, A6, A8 and A10 non-spherical surfaces of the second, fourth, sixth, eighth and tenth non-spherical surface constants, respectively, and r the radius of curvature of paraxis.

In the middle part of Table 1, values of the conic constant k and second, fourth, sixth, eighth and tenth non-spherical surface constants A2, A4, A6, A8 and A10 are entered in the mentioned order from the left. E-n in the non-spherical surface constant values represent $10^{-n}$. In the lower part of Table 1 there are shown distances between adjacent lens units at six positions (f=36.0, 50.0, 60.0, 70.0, 85.0, 102.0) corresponding to respective states of zooming from wide angle end to telescopic end.

Figure 1B:
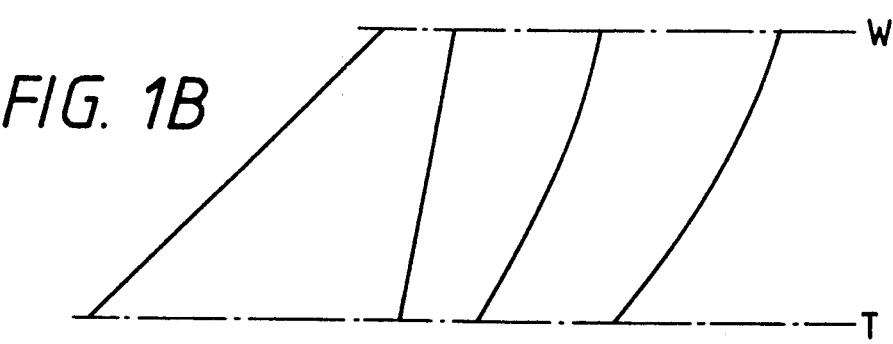
FIG. 1B is a diagram showing orbits of displacement of the individual lens units in the zoom lens for zooming.

In FIG. 1B, orbits of displacement of the individual lens units at the time of zooming. In this case, the abscissa (optical axis direction) and ordinate ($\theta$ direction) are selected such that the orbit of displacement of first lens unit G1 at the time of zooming is a straight line at an angle of 45 with respect to the optical axis.

Table 2 shows values of the displacement $\Delta X$ in the optical axis direction and values of $\phi$ corresponding to the values of $\Delta X$ obtained by conversion with respect to the rotational direction $\theta$ about the optical axis in the orbits shown in FIG. 1B for focusing while effecting the floating with third and fourth lens units G3 and G4 for suppressing close aberration variations and maintain high focusing performance with an object distance of 1 m. In Table 2, represented by F is the focal distance of the entire system, 1 to 4 first to fourth lens units G1 to G4, respectively, and R the object distance.

As shown in Table 2, at the time of focusing only third and fourth lens units G3 and G4 are displaced along the optical axis, with first and second lens units G1 and G2 held stationary.

Now, a method of converting the displacement orbits (i.e., cam shape) inclusive of guide groove parallel to the optical axis with respect to the rotational direction $\theta$ with $\Delta X$ and $\phi$ as variables will be described. The focus and zoom cams which are converted are actually determined by three variables, i.e., after conversion, $\Delta X$ before conversion and a new variable $\Delta F$.

The relative displacement $\Delta F$ of the focus and zoom cams to each other in the optical axis direction for focusing, which is introduced here, is constant for a corresponding object distance irrespective of the state of zooming. This means that the displacement of focusing lens units, which are displaced for focusing, at the time of focusing is determined according to $\Delta F$. In other words, even if the individual focusing lens units are displaced to different extents at the time of focusing or irrespective of the state of zooming, focusing is possible by causing relative displacement of the focus and zoom cams in the optical axis direction by to the same extent $\Delta F$.

TABLE 1

| f = 36.0-102.0 FN = 3.6-4.9 | | | | | | | | | |
|---|---|---|---|---|---|---|---|---|---|
| r1 = | 57.359 | d1 = | 1.600 | n1 = | 1.86074 | v1 = | 23.0 | L1 | G1 |
| r2 = | 39.201 | d2 = | 1.000 | | | | | | |
| r3 = | 39.816 | d3 = | 8.150 | n2 = | 1.69680 | v2 = | 55.6 | L2 | |
| r4 = | 402.064 | d4 = | 1.456 | | | | | | |
| r5 = | −672.548 | d5 = | 1.000 | n3 = | 1.77279 | v3 = | 49.4 | L3 | G2 |
| r6 = | 16.810 | d6 = | 4.300 | | | | | | |
| r7 = | −35.034 | d7 = | 1.000 | n4 = | 1.50137 | v4 = | 56.5 | L4 | |
| r8 = | 46.650 | d8 = | .100 | | | | | | |
| r9 = | 25.344 | d9 = | 3.000 | n5 = | 1.80458 | v5 = | 25.5 | L5 | |
| r10 = | −388.047 | d10 = | 1.000 | n6 = | 1.51680 | v6 = | 64.1 | L6 | |
| r11 = | 37.319 | d11 = | 11.206 | | | | | | |
| r12 = | .000 | d12 = | .800 | | | | | | G3 |
| r13 = | 35.757 | d13 = | 3.000 | n7 = | 1.53172 | v7 = | 49.1 | L7 | |
| r14 = | −144.185 | d14 = | .100 | | | | | | |
| r15 = | 23.161 | d15 = | 6.800 | n8 = | 1.46450 | v8 = | 65.8 | L8 | |
| r16 = | −25.692 | d16 = | 1.300 | n9 = | 1.80458 | v9 = | 25.5 | L9 | |
| r17 = | 79829.880 | d17 = | 11.180 | | | | | | |
| r18 = | 22.584 | d18 = | 4.600 | n10 = | 1.54814 | v10 = | 45.9 | L10 | G4 |
| r19 = | −66.079 | d19 = | 4.750 | | | | | | |
| r20 = | −303.015 | d20 = | 1.300 | n11 = | 1.80384 | v11 = | 33.9 | L11 | |
| r21 = | 43.209 | d21 = | 41.872 | | | | | | |
| r20 | .1000E + 01 | .0000 | −.4126E − 04 | −.9462E − 07 | .3470E − 09 | −.1290E − 11 | | | |
| | pos(1) | pos(2) | pos(3) | pos(4) | pos(5) | pos(6) | | | |
| f&b | 36.000 | 50.000 | 60.000 | 70.000 | 85.000 | 102.000 | | | |
| d0 | .000 | .000 | .000 | .000 | .000 | .000 | | | |
| d4 | 1.456 | 14.028 | 20.453 | 25.434 | 31.196 | 36.226 | | | |
| d11 | 11.206 | 7.935 | 6.318 | 5.010 | 3.422 | 1.978 | | | |
| d17 | 11.180 | 8.950 | 7.865 | 6.975 | 5.896 | 4.955 | | | |
| d21 | 41.872 | 48.721 | 52.665 | 56.198 | 60.901 | 65.479 | | | |

TABLE 2

| F | (1) | (2) | (3) | (4) | R(mm) |
|---|---|---|---|---|---|
| ΔX | | | | | |
| 35.9975 | .0000 | .0000 | −1.9058 | −2.7254 | 1000.00 |
| 50.0000 | .0000 | .0000 | −1.6563 | −2.4017 | 1000.00 |
| 59.9988 | .0000 | .0000 | −1.7319 | −2.5286 | 1000.00 |
| 85.0000 | .0000 | .0000 | −2.0477 | −3.0306 | 1000.00 |
| 101.9946 | .0000 | .0000 | −2.3473 | −3.6618 | 1000.00 |
| φ | | | | | |
| 35.9975 | .0000 | .0000 | −5.8947 | −5.5781 | 1000.00 |
| 50.0000 | .0000 | .0000 | −4.8289 | −4.8385 | 1000.00 |
| 59.9988 | .0000 | .0000 | −4.5357 | −4.8556 | 1000.00 |
| 85.0000 | .0000 | .0000 | −4.3039 | −4.9614 | 1000.00 |
| 101.9946 | .0000 | .0000 | −4.6222 | −5.7588 | 1000.00 |

Figure 2A:
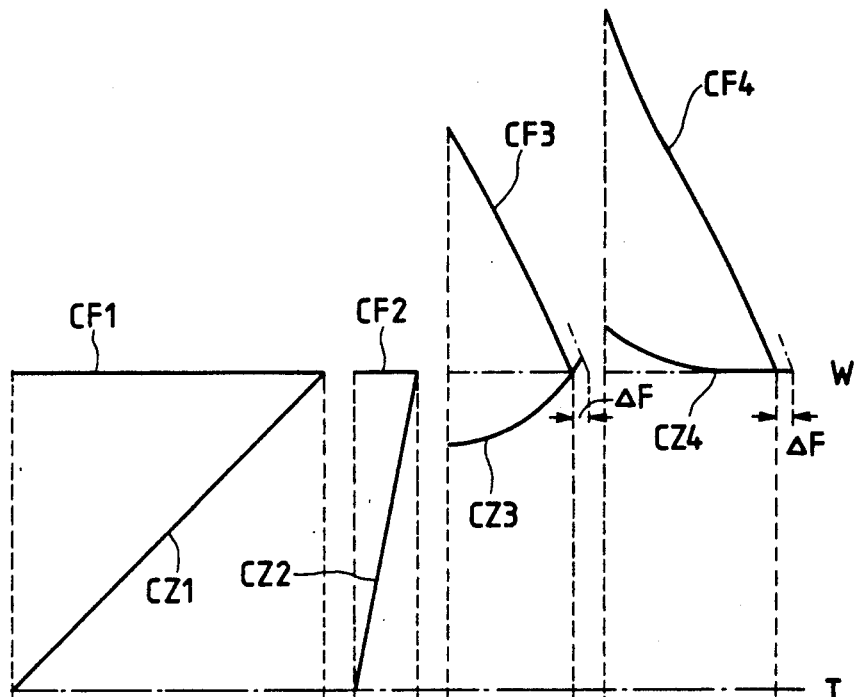
FIGS. 2A and 2B are developed diagrams showing orbits of zoom and focus cams in a focusing system of the zoom lens shown in FIGS. 1A and 1B, in which third and fourth lens units constitute an optical system for both zooming and focusing, before modification of the cam shape (FIG. 2A) and after modification thereof (FIG. 2B)
Figure 2B:
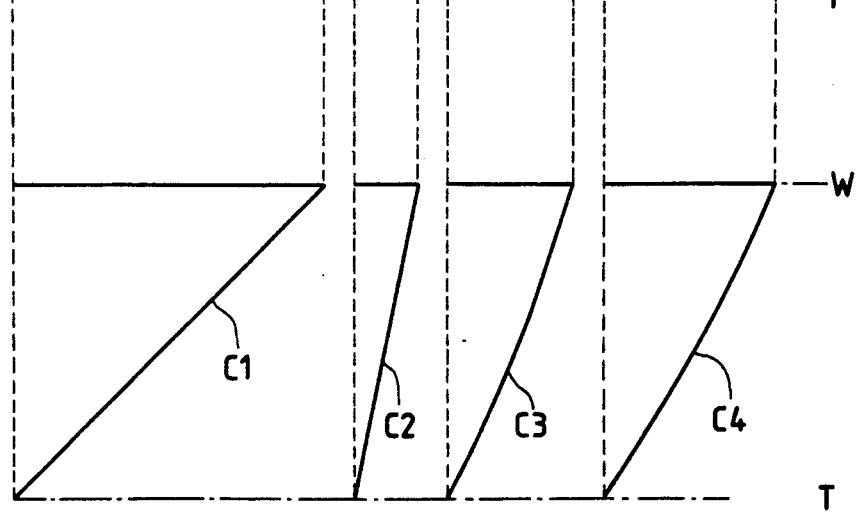

FIGS. 2A and 2B are views summarizing the shapes of focus cams CF1 to CF4 and zoom cams CZ1 to CZ4 obtained by conversion of displacement orbits according to the invention with respect to the zoom lens shown in FIG. 1A and specified in Table 1. FIG. 2A shows the orbits after the conversion, while FIG. 2B shows orbits C1 to C4 of individual lens units in the prior art system for zooming before the conversion.

FIGS. 3A and 3B illustrate orbit conversion with the rotational and φ of the rotary cam cylinder for zooming, displacement ΔX of the lens units displaced for focusing along the optical axis and relative displacement ΔF of focus and zoom cams CF and CZ to each other in the optical axis direction as variables.

The operations of obtaining focus cams CF3 and CF4 and zoom cams CZ3 and CZ4 after conversion as shown in FIG. 3 will now be described with reference to FIGS. 3A and 3B. The orbits before conversion are, as shown in FIG. 3A, orbit CO corresponding to the zooming cam groove formed in the rotary cam cylinder for zooming to regulate the orbits of the zooming lens units for zooming and guide groove G parallel to the optical axis of regulating the displacement of the lens units in the optical axis direction.

The relations of the variables before and after the conversion are usually varied with various factors such as the directions of displacement of the focusing lens units at the time of zooming and at the time of focusing, sign of the relative displacement ΔF of the focus and zoom cams in the optical axis direction and relation between ΔF and ΔX. The relation shown in FIGS. 3A and 3B is based on the orbits shown in FIG. 1B and displacements shown in Table 2 as a specific example. More specifically, in this relation with variation of zooming from wide angle to telescope the zooming lens units having the focusing function are displaced to the object side, while at the time of focusing these lens units are displaced to the image side, i.e., from the telescope side to the wide angle side, along the orbits for zooming. Further, the same sign is taken for ΔF and ΔX. The relation between ΔF and ΔX provides for the cases of FIGS. 3A and 3B. In each Figure, double-dash-and-bar line CO represents the orbit of displacement of the zooming/focusing lens units before conversion, which corresponds to φ obtained by conversion with respect to the direction φ of the necessary displacement of the zooming/focusing lens units in the optical axis direction for focusing. Single-dash-and-bar line G is a straight orbit parallel to the optical axis. The orbits of focus and zoom cams CF and CZ as shown in solid lines can be obtained by conversion of the two orbits CO and G under the relation of ΔX and ΔF as shown.

The correspondence relation between zooming and focusing before and after the conversion will now be described.

Referring to FIGS. 3A and 3B, it is assumed that point 0 represents the position of the zooming/focusing lens units with infinite object distance in a certain state of zooming. When a parallel displacement of guide groove G by φ in the ordinate direction (i.e., direction of the rotational angle θ of the rotaty cam cylinder) is caused from this state for zooming, orbit CO before conversion and guide groove G intersect at point A. This means that the zooming/focusing lens units are displaced in the optical axis direction to an extent ΔX which corresponds to a distance from point 0 to point C.

Likewise, when parallel displacement of zoom cam CF is caused relative to focus cam CF after conversion by φ in the ordinate direction for zooming, focus and zoom cams CF and CZ intersect at point D. This means that the zooming/focusing lens units are displaced in the optical axis direction to extent ΔX corresponding to the distance from point 0 to point C like the case before conversion. Thus, at the time of zooming, the positional relation in the optical axis direction is unchanged before and after the conversion.

At the time of focusing, with a displacement of focus cam CF after the conversion by ΔF in the optical axis direction focus cam CF intersects with zoom cam CZ point B, and the zooming/focusing lens units are displaced in the optical axis direction to extent ΔX corresponding to the distance from point 0 to point C. This extent of displacement is equal to the necessary extent of displacement for focusing before the conversion.

Thus, by effecting conversion under the relation shown in FIGS. 3A and 3B the correspondence relation before and after the conversion can be satisfied with respect to both zooming and focusing. In the above explanation in connection with FIGS. 3A and 3B the displacement at the time of zooming and that at the time of focusing are assumed to be equal to ΔX, this is only for the sake of simplicity, and generally the displacement is different in the two cases.

The above converting operation is performed in case of effecting desired close focusing with reference to the position of the zooming/focusing lens units corresponding to infinite object distance in a certain state of zooming. It is thus possible to determine orbits (or cam shapes) of focus and zoom cams CF and CZ through similar conversion of the orbits before the conversion in any state of zooming. Final focus and zoom cams CF and CZ are determined as shown in FIG. 2A through orbit conversion over the entire zooming range. Focus cam CF, which is thus obtained by progressively performing the converting operation as shown in FIG. 3A or 3B along orbits with ΔF with respect to a predetermined object distance held constant, is non-linear and inclined with respect to the optical axis in a certain area.

Shown in FIG. 2A are final orbits of displacement of third and fourth lens units G3 and G4 as zooming/focusing lens units in the first embodiment, which are determined from ΔX and φ in Table 2 when the relative displacement ΔF of focus and zoom cams CF and CZ in the optical axis direction necessary for the focusing of an object at object distance of R=1,000 mm (i.e., 1 m) is set to ΔF=−2.4 mm. More specifically, in FIG. 2A the relation between focus cams CF1 to CF4 and zoom cams CZ1 to CZ4 for conversion to obtain the orbits of displacement of the individual lens units is shown with reference to the zooming state of the wide angle end W. AS focus cams CF1 to CF4 and zoom cams CZ1 to CZ4 are displaced relative to one another in direction perpendicular to the optical axis (i.e., vertical directions in FIG. 2A) for zooming to the telescope end T, the individual lens units are displaced along the optical axis for zooming according to the displacement of the intersection of both cams. According to the invention, the orbits of displacement of first and second lens units G1 and G2 which are zooming lens units without focusing function are the same as before the conversion as shown in FIG. 2A, and focus cams CF1 and CF2 are formed in straight guide grooves parallel to the optical axis.

Now, displacement of third and fourth lens units G3 and G4 as zooming/focusing lens units with displacement of cams CF and CZ will be described with reference to FIGS. 4A and 4B.

Figure 4A:
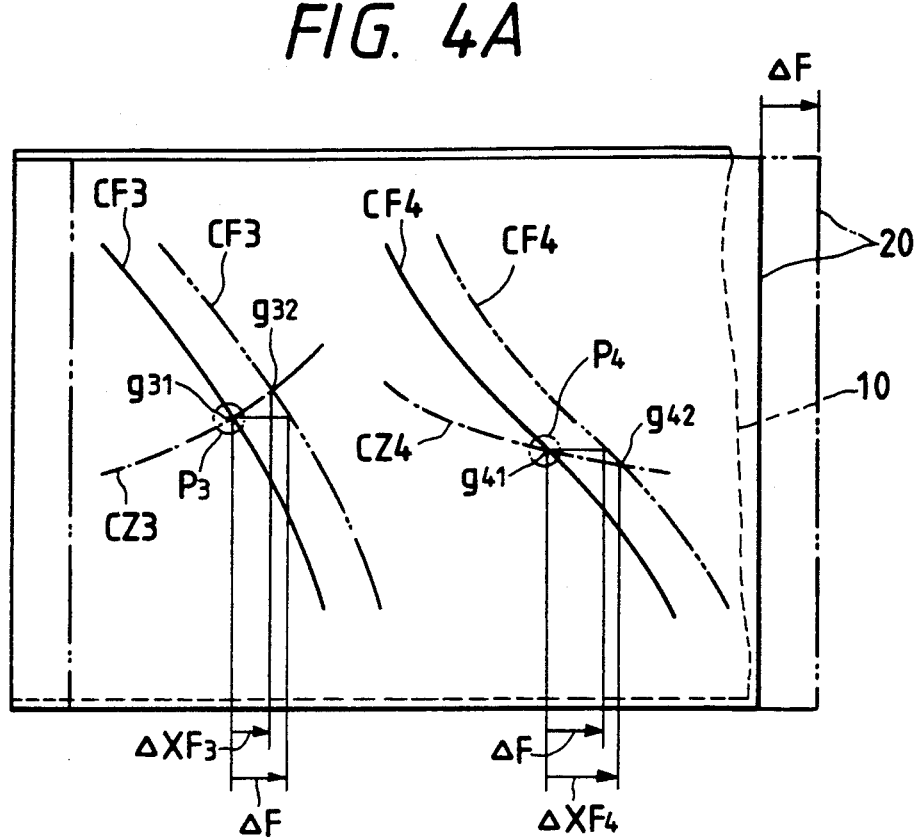
FIG. 4A is a view for explaining displacement of lens for focusing with displacement of the focus cam after the modification of the cam shape according to the invention.
Figure 4B:
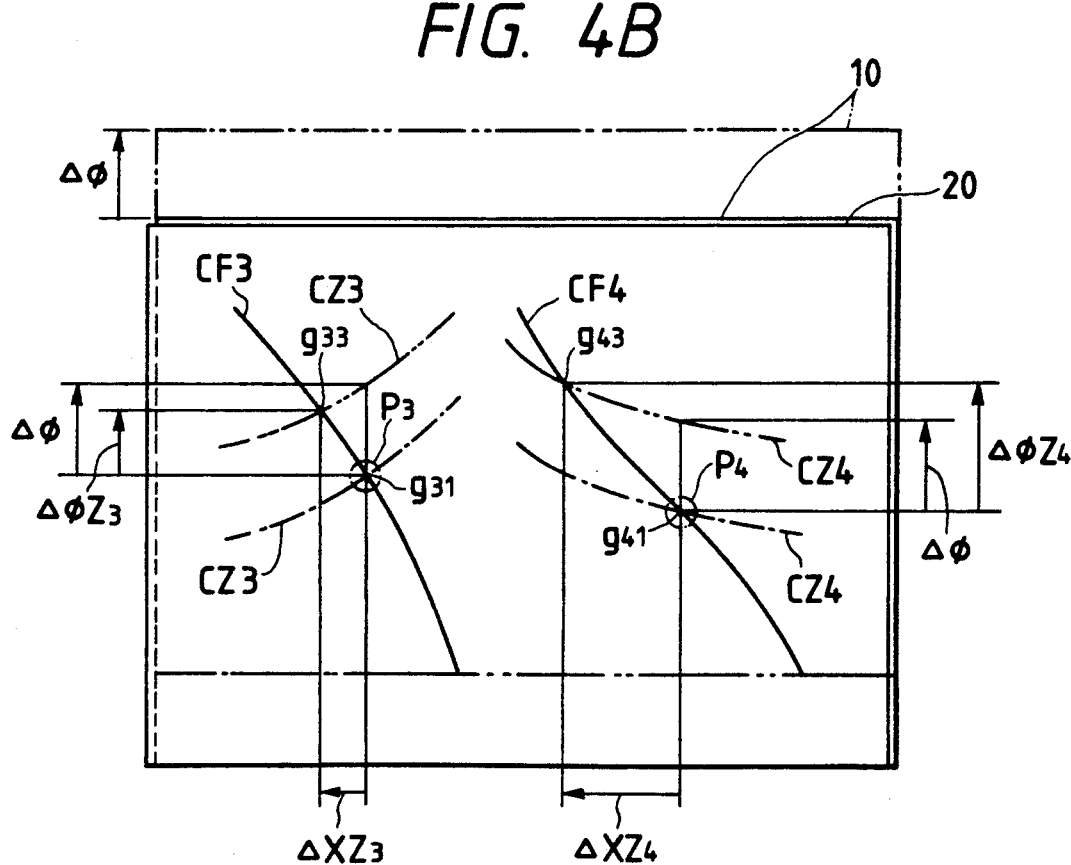
FIG. 4B is a view for explaining displacement of lens for zooming with rotational displacement of the zoom cam after the modification of the cam shape according to the invention.

FIGS. 4A and 4B are developed views showing first barrel 10 with zoom cams CZ3 and CZ4 and second barrel 20 with focus cams CF3 and CF4. FIG. 4A shows the focusing state of both the cam cylinders changing with displacement thereof in the optical axis direction, and FIG. 4B shows the zooming state of the cam cylinders changing with relative rotation thereof.

First barrel 10 for zooming is constructed such that it is only rotatable about the optical axis, and second barrel 20 for zooming is constructed such that it is only movable along the optical axis. Third lens unit G3 is capable of displacement with displacement of slide pin P3 coupled commonly to cams CZ3 and CF3, and fourth lens unit G4 is capable of displacement with displacement of slide pin P4 coupled commonly to cams CZ4 and CF4.

For focusing, second barrel 20 with focus cams CF3 and CF4 is displaced relative to first barrel 10 with zoom cams CZ3 and CZ4 along the optical axis by $\Delta F$ to the image side (i.e., to the right side in the Figure), as shown in FIG. 4A. Consequently, intersection g31 between zoom as shown by solid line and focus cam CF3 in the state of infinitely distant focusing is shifted along zoom cam CZ3 to intersection g32 with focus cam CF3 as shown by double-dash-and-bar line after relative displacement, that is, third lens unit G3 is shifted along the optical axis by $\Delta XF3$ to the image side. Also, intersection g41 between zoom cam CZ4 as shown by solid line and focus cam CF4 in the state of infinitely distant focusing is shifted along zoom cam CZ4 to intersection g42 with focus cam CF4 as shown by double-dash-and-bar line after relative displacement, that is, fourth lens unit G4 is shifted in the optical axis direction by $\Delta XF4$ to the image side. As shown, by causing displacement of second barrel 20 relative to first barrel 10 in optical axis direction by $\Delta F$ third and fourth lens G3 and G4 can be displaced along the optical axis by $\Delta XF3$ and $\Delta XF4$, respectively, thus obtaining focusing to a desired object distance.

For zooming, first barrel 10 with zoom cams CZ3 and CZ4 is rotatedly displaced relative to second barrel 20 with focus cams CF3 and CF4 in a direction perpendicular to the optical axis (i.e., upwards in the Figure) by $\Delta \phi$, as shown in FIG. 4B. Consequently, the position of third lens unit G3 determined by intersection g31 between focus cam CF3 and zoom cam CZ3 as shown by broken line in certain state of zooming is shifted to position determined by intersection g33 with zoom cam CZ3 as shown by double-dash-and-bar line after relative rotational displacement. That is, third lens unit G3 is relatively displaced by $\Delta \phi Z3$ and also by $\Delta XZ3$. Also, position of fourth lens unit G4 determined by intersection g41 between focus cam CF4 and zoom cam CZ4 as shown by broken line is shifted to position determined by intersection g43 with zoom cam CZ4 as shown by double-dash-and-bar line. That is, fourth lens unit G4 is relatively displaced by $\Delta \phi Z4$ and also by $\Delta XZ4$. As shown, by causing rotational displacement of first barrel 10 relative to second barrel 20 in a direction perpendicular to the optical axis by $\Delta \phi$, third and fourth lens units G3 and G4 as zooming/focusing lens units can be displaced along the optical axis by $\Delta XZ3$ and $\Delta XZ4$, respectively, thus obtaining a shift to a desired state of zooming.

As shown above, orbits of displacement after conversion are utilized to permit focusing through displacement of zooming/focusing lens units G3 and G4 along orbits (zoom cams) CZ3 and CZ4 which are traced at the time of zooming. More specifically, zooming is effected with the individual lens units shifted in position along the optical axis by causing rotational displacement of either focus cam (straight orbit of guide for first and second lens units G1 and G2) or zoom cam in direction 0 perpendicular to the optical axis, while focusing is effected by causing displacement of focus cam CF3 by $\Delta F$ ($\Delta F = -2.4$ mm with R = 1.0 m in the first embodiment) even if focusing lens units G3 and G4 are displaced to different extents in the optical axis direction with the same object distance.

Table 3 shows the extent $\Delta F$ (DF) of feed of the second cylinder with the focus cams with object distance R of 0.85, 1.0, 2.0, 3.0 and 5.0 m in zooming state with focal distance F of 36, 50, 60, 70, 85 and 102 mm as calculated from the orbits of displacement after conversion as shown in FIG. 2A, actual extent $\Delta X$ (DX) of feed of the individual lens units corresponding to $\Delta F$ and displacement (BF) of focal point when displacement $\Delta X$ along the optical axis is given to the individual lens units. Upper part of Table 3 shows the displacement (BF) of the focal point with each object distance R in each zooming state. Middle part of the table shows the displacement $\Delta F$ (DF) of focus cams CF necessary for optimum focusing with each object distance R. This displacement $\Delta F$ (DF) of focus cams CF is selected such that the displacement of the focal point is zero at the telescope end. Lower part of the table shows the extent $\Delta X$ (DX) of actual feed of lens units G1 to G4 corresponding to $\Delta F$ with object distance R of 0.85, 1.0, 1.5, 2.0, 3.0 and 5.0 mm in zooming state with focal distance F of 36, 50, 60, 70, 85 and 102 mm. In the lower part of the table, figures at the left end show the focal distance F of the entire system, and those at the right end show the object distance R. Figures intermediate between the ends show the extent $\Delta X$ (DX) of actual feed of first to fourth lens units G1 to G4 in the mentioned order. Any figure value is positive for displacement to the object side.

It will be seen from Table 3 that the displacement of the focal point is small and about 0.067 mm at the most with each focal distance and each object distance. The displacement is sufficiently in focal point depth in any zooming state and with any object distance. Thus, satisfactory focusing can be obtained for all zooming range with a very simple mechanism of relative displacement of second barrel 20 with focus cams CF and first barrel 10 with zoom cams CZ in the optical axis direction to each other.

It will be appreciated from the above that once a new variable $\Delta F$ is set as relative displacement of focus cams CF1 to CF4 and zoom cams CZ1 to CZ4 to one another in the optical axis direction that is necessary for focusing, it is fixed irrespective of the zooming state or object distance or different extents of feed of the focusing lens units for focusing, and thus the invention is applicable to commonly termed manual focusing. The relative displacement $\Delta F$ of both cams in the optical axis direction varies with the object distance as shown in the middle part of Table 3.

TABLE 3

|   |         |    | R      | 850.00 | 1000.00 | 1500.00 | 2000.00 | 3000.00 | 5000.00 |
|---|---------|----|--------|--------|---------|---------|---------|---------|---------|
| F | 36.0000 | BF |        | .0298  | .0001   | −.0332  | −.0427  | −.0419  | −.0314  |
| F | 50.0000 | BF |        | .0369  | .0000   | −.0433  | −.0508  | −.0471  | −.0345  |
| F | 60.0000 | BF |        | .0469  | −.0001  | −.0570  | −.0673  | −.0629  | −.0463  |
| F | 70.0000 | BF |        | .0621  | .0207   | −.0332  | −.0457  | −.0458  | −.0342  |

TABLE 3-continued

| F | 85.0000 | BF | .0286 | −.0002 | −.0338 | −.0403 | −.0381 | −.0274 |
|---|---|---|---|---|---|---|---|---|
| F | 102.0000 | BF | −.0001 | .0000 | .0000 | .0000 | .0000 | .0000 |
|   |   | FOCUS DF | −2.8510 | −2.4000 | −1.5723 | −1.1696 | −.7737 | −.4610 |
|   |   |   | (1) | (2) | (3) | (4) |   |   |
| F | 36.0000 | DX | .0000 | .0000 | −2.2774 | −3.2468 | R | 850.00 |
| F | 50.0000 | DX | .0000 | .0000 | −1.9669 | −2.8543 | R | 850.00 |
| F | 60.0000 | DX | .0000 | .0000 | −2.0480 | −2.9900 | R | 850.00 |
| F | 70.0000 | DX | .0000 | .0000 | −2.1758 | −3.1961 | R | 850.00 |
| F | 85.0000 | DX | .0000 | .0000 | −2.4188 | −3.5632 | R | 850.00 |
| F | 102.0000 | DX | .0000 | .0000 | −2.7687 | −4.2717 | R | 850.00 |
| F | 36.0000 | DX | .0000 | .0000 | −1.9057 | −2.7254 | R | 1000.00 |
| F | 50.0000 | DX | .0000 | .0000 | −1.6563 | −2.4017 | R | 1000.00 |
| F | 60.0000 | DX | .0000 | .0000 | −1.7319 | −2.5287 | R | 1000.00 |
| F | 70.0000 | DX | .0000 | .0000 | −1.8382 | −2.7028 | R | 1000.00 |
| F | 85.0000 | DX | .0000 | .0000 | −2.0477 | −3.0307 | R | 1000.00 |
| F | 102.0000 | DX | .0000 | .0000 | −2.3474 | −3.6621 | R | 1000.00 |
| F | 36.0000 | DX | .0000 | .0000 | −1.2308 | −1.7651 | R | 1500.00 |
| F | 50.0000 | DX | .0000 | .0000 | −1.0877 | −1.5740 | R | 1500.00 |
| F | 60.0000 | DX | .0000 | .0000 | −1.1459 | −1.6714 | R | 1500.00 |
| F | 70.0000 | DX | .0000 | .0000 | −1.2135 | −1.7856 | R | 1500.00 |
| F | 85.0000 | DX | .0000 | .0000 | −1.3566 | −2.0294 | R | 1500.00 |
| F | 102.0000 | DX | .0000 | .0000 | −1.5576 | −2.4832 | R | 1500.00 |
| F | 36.0000 | DX | .0000 | .0000 | −.9080 | −1.2972 | R | 2000.00 |
| F | 50.0000 | DX | .0000 | .0000 | −.8108 | −1.1715 | R | 2000.00 |
| F | 60.0000 | DX | .0000 | .0000 | −.8572 | −1.2489 | R | 2000.00 |
| F | 70.0000 | DX | .0000 | .0000 | −.9066 | −1.3339 | R | 2000.00 |
| F | 85.0000 | DX | .0000 | .0000 | −1.0155 | −1.5294 | R | 2000.00 |
| F | 102.0000 | DX | .0000 | .0000 | −1.1658 | −1.8807 | R | 2000.00 |
| F | 36.0000 | DX | .0000 | .0000 | −.5954 | −.8450 | R | 3000.00 |
| F | 50.0000 | DX | .0000 | .0000 | −.5377 | −.7755 | R | 3000.00 |
| F | 60.0000 | DX | .0000 | .0000 | −.5705 | −.8297 | R | 3000.00 |
| F | 70.0000 | DX | .0000 | .0000 | −.6025 | −.8861 | R | 3000.00 |
| F | 85.0000 | DX | .0000 | .0000 | −.6762 | −1.0265 | R | 3000.00 |
| F | 102.0000 | DX | .0000 | .0000 | −.7757 | −1.2674 | R | 3000.00 |
| F | 36.0000 | DX | .0000 | .0000 | −.3521 | −.4967 | R | 5000.00 |
| F | 50.0000 | DX | .0000 | .0000 | −.3211 | −.4623 | R | 5000.00 |
| F | 60.0000 | DX | .0000 | .0000 | −.3416 | −.4960 | R | 5000.00 |
| F | 70.0000 | DX | .0000 | .0000 | −.3603 | −.5298 | R | 5000.00 |
| F | 85.0000 | DX | .0000 | .0000 | −.4052 | −.6193 | R | 5000.00 |
| F | 102.0000 | DX | .0000 | .0000 | −.4643 | −.7644 | R | 5000.00 |

Tables 4-(1) to 4-(3) show cam data, i.e., coordinates of the focus and zoom cams of lens units in the X (optical axis) direction and : direction perpendicular thereto corresponding to FIG. 2A (focus and zoom cams after conversion) and Table 3.

In Tables 4-(1) to 4-(3), $\phi f(n)$ represents the co-ordinate of the focus cam of the n-th lens unit in the direction perpendicular to the X (optical axis) direction, Xf(n) the co-ordinate of the n-th lens unit focus cam in the X (optical axis) direction $\phi z(n)$ the co-ordinate of the zoom cam of the n-th lens unit in the $\phi$ direction perpendicular to the X (optical axis) direction, Xz(n) the co-ordinate of the n-th lens unit zoom cam in the X (optical axis) direction, F the focal distance, and R the object distance.

Table 4-(1) shows cam data of first and second lens units G1 and G2. The focus cams of first and second lens units G1 and G2 are straight guide grooves parallel to the optical axis. Since the co-ordinates of the zoom cam are fixed irrespective of the object distance R, the column of object distance R is omitted.

Table 4-(2) shows cam data of the focus and zoom cams of third lens unit G3 with each focal distance F and each object distance R. Table 4-(3) shows cam data of the focus and zoom cams of fourth lens unit G4 with each focal distance F and object distance R.

In Tables 4-(1) to 4-(3), the co-ordinates of the individual lens units with F=36 and R= ∞ are set as origin. As for $\phi f(3)$ and $\phi f(4)$, i.e., displacement of third and fourth lens units G3 and G4 with focus cams CF3 and CF4 after conversion shown in FIG. 2A in the $\phi$ direction (perpendicular to the optical axis), downward direction in FIGS. 2A and 2B is assumed to be positive.

Also, as for $\phi z(3)$ and $\phi z(4)$, i,e., displacement of third and fourth lens units G3 and G4 with zoom cams CZ3 and CZ4, downward direction in FIGS. 2A and 2B is assumed to be positive. As for Xf(3) and Xf(4), i.e., displacement of third and fourth lens units G3 and G4 with focus cams CF3 and CF4 in the X (optical axis) direction, leftward direction (to the object side) in FIGS. 2A and 2B is assumed to be positive, and as for Xz(3) and Xz(4), i.e., displacement of third and fourth lens units with zoom cams CZ3 and CZ4 in the X (optical axis) direction, leftward direction (to the object side) is assumed to be positive.

Tables 4-(1) to 4-(3) will now be described in conjunction with movement of third lens unit G3 in focusing from R= ∞ to R=1,500 with focal distance of F=36 in the cam data as example with reference to FIG. 5.

Figure 5:
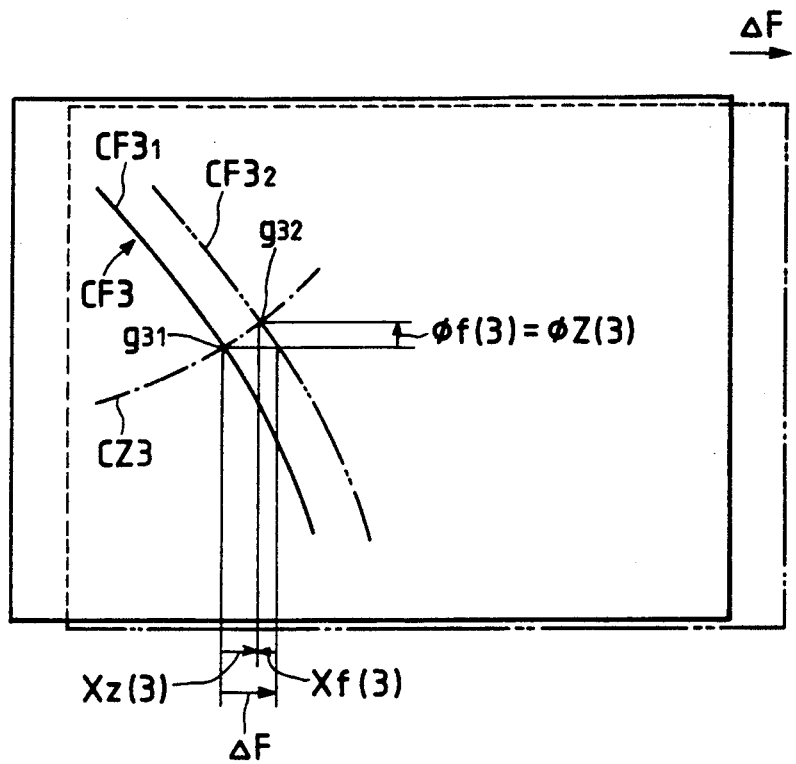
FIG. 5 is a view for explaining focusing attained on the basis of cam data of zoom and focus cams for the third lens unit as shown in Table 4.

Referring to FIG. 5, CZ3 designates the zoom cam of third lens unit G3, CF3 the position of focus cam CF3 with R= ∞, and CF3 the position of focus cam CF3 with R=1,500. In focusing with object distance of R= ∞ to R=1,500 focus cam CF3 is displaced in the X direction (optical axis direction) by ΔF (ΔF (DF)= −1,5723 in Table 3), i.e., from position CF3 to position CF3, and the position of third lens unit G3 determined by the intersection between focus and zoom cams CF3 and CZ3 is shifted from position g31 to position g32.

At this time, the displacement of third lens unit G3 along zoom cam CZ3 in the X direction (optical axis direction) is Xz(3)= −1.2308, as shown in Table 4-(2). It will be seen that this value is identical with the value of ΔX (DX) shown in Table 3 noted before. The displacement of third lens unit G3 along focus cam CF3 in the X direction (optical axis direction) is Xf(3)=0.3415, as shown in Table 4-(2).

As is seen from FIG. 5, the actual displacement ΔF of the focus cam in the X direction (optical axis direction) (i.e., displacement in the optical axis direction from focus ca CF3 shown by solid line to focus cam CF3 shown by double-dash-and-bar line) in focusing with object distance from R=∞ to R=1,500 is, ΔF=Xz(3)−Δf(3)=−1.5723 from Xz(3)=−1.2308 and Xf(3)=0.3415 in Table 4-(2). It will be seen that this value is identical with ΔF (DF)=−1.5723 in Table 3.

On the other hand, when focus cam CF3 is displaced from $CF3_1$ to $CF3_2$, the displacement of third lens unit G3 along zoom cam CZ3 in the direction (perpendicular to the optical axis) is $\phi z(3) = -0.7891$ as in Table 4-(2), and displacement of third lens unit G3 along focus cam CF3 in the $\phi$ direction is $\phi f(3) = -0.7891$. It will be seen from FIG. 5 and the specific numerical values shown in Table 4-(2) that both the cams are displaced to the same extent in the direction (perpendicular to the optical axis).

It will be appreciated that optical displacement of not only third lens unit G3 but also fourth lens unit G4 in the X direction (optical axis direction) as shown in Table 3 for focusing can be obtained from zoom and focus cams CZ2 and CF3 shown in Tables 4-(1) to 4-(3).

Now, Tables 4-(1) to 4-(3) will be described in detail in conjunction with movement of third lens unit G3 in case of zooming with object distance of R =∞ and focal distance of F=36 to F=102 as an example with reference to FIGS. 6A and 6B also in conjunction with movement of third lens unit G3 in case of focusing with focal distance of F=102 and with object distance of R=∞ to R=1,500, with reference to FIGS. 6C and 6D.

Figure 6A:
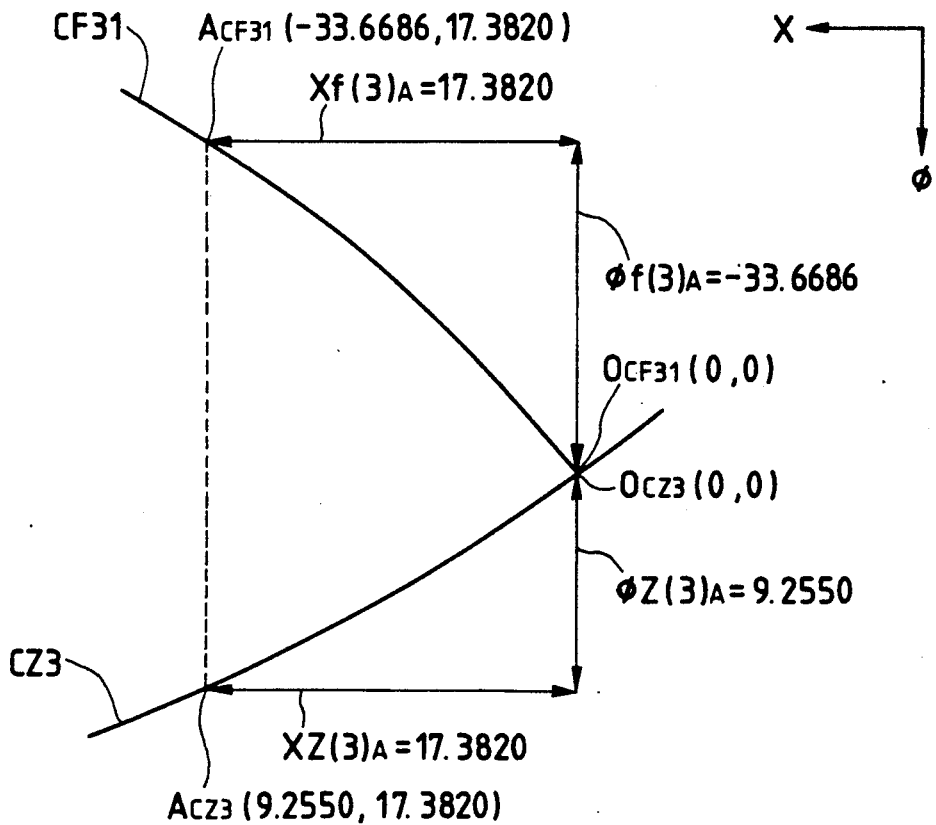
FIG. 6A is a view for explaining zooming attained on the basis of cam data of zoom and focus cams for the third lens unit in case of focal distance of $F=36$ and object distance of $R=\infty$ as shown in Table 4.

FIG. 6A shows the status of focus and zoom cams CF31 and CZ3 of third lens unit G3 with focal distance of F=36 and object distance of R=∞. In the cam data in the tables, the position of intersection between focus and zoom cams CF31 and CZ3 with focal distance of F=36 and object distance of R=∞ are set as origin with respect to each cam. More specifically, $0_{CF31}$ (0, 0) represents the co-ordinates of the origin on focus cam CF31, and $0_{CZ3}$ (0, 0) the co-ordinates of the origin on zoom cam CZ3. In FIG. 6A, and also FIGS. 6B to 6C to be described later, the vertical direction in the plane of paper is taken as $\phi$ direction, while the horizontal direction is taken as X direction (optical axis direction). Each co-ordinates are expressed as ($\phi$, X).

When the focal distance is zoomed from F=36 to F=102 with object distance of R=∞, the coordinates corresponding to the focal distance of F=102 on focus and zoom cams CF31 and CZ3 are $A_{CF31}$ (−33.6686, 17.3820) and $A_{CZ3}$ (9.2550, 17.3820), respectively, as shown in FIG. 6A, from cam data of third lens unit G3 in Table 4-(2).

Therefore, zooming from focal distance of F=36 to F=102 with object distance of R=∞ can be attained by making $A_{CF31}$ (−33.6686, 17.3820) and $A_{CZ3}$ (9.2550, 17.3820) identical with each other.

More specifically, it can be attained with a change of the state of focus cam CF31 as shown by double-dash-and-bar line over to the state of focus cam CF32 shown by solid line caused by displacing focus cam CF31 relative to zoom cam CZ3 in the $\phi$ direction by $\Delta\phi = \phi Z(3)_A - \phi f(3)_A = 42.9236$.

With the change of the state of focus cam CF31 shown by double-dash-and-bar line over to the state of focus cam CF32 shown by solid line, origin $0_{CF31}$ (0, 0) of focus cam CF31 is shifted to position $0_{CF32}$ (0, 0). Consequently, $A_{CF31}$ (−33,6686, 17.3820) is shifted to $A_{CF32}$ (−33.6686, 17.3820). The co-ordinates of $A_{CF32}$ (−33.6686, 17.3820) on focus cam CF32 are shown with origin $0_{CF32}$ (0, 0) on cam CF32 as reference.

Thus, if $A_{CF31}$ (−33.6686, 17.3820) on focus cam CF32 shown by solid line corresponding to $A_{CF32}$ (−33.6686, 17.3820) on focus cam CF31 shown by doubledash-and-bar line coincides with $A_{CZ3}$ (9.2550, 17.3820) on zoom cam CZ3, it means that third lens unit G3 is displaced in the optical axis direction (X direction) by $\Delta XZ3 = 17.3820$.

It will be seen that the value of AXZ3 (=17.3820) in this case is identical with the displacement of third lens unit G3 obtained from changes in the air intervals between adjacent lens units in first position pos(1) (focal distance f(F)=36, object distance R=∞) and sixth position pos(6) (focal distance f(F)=102, object distance R=∞) shown in the lower part of Table 1 noted before. It will thus be seen that zooming from focal distance of F=36 to F=102 is effected accurately while maintaining the object distance of R=∞.

Figure 6B:
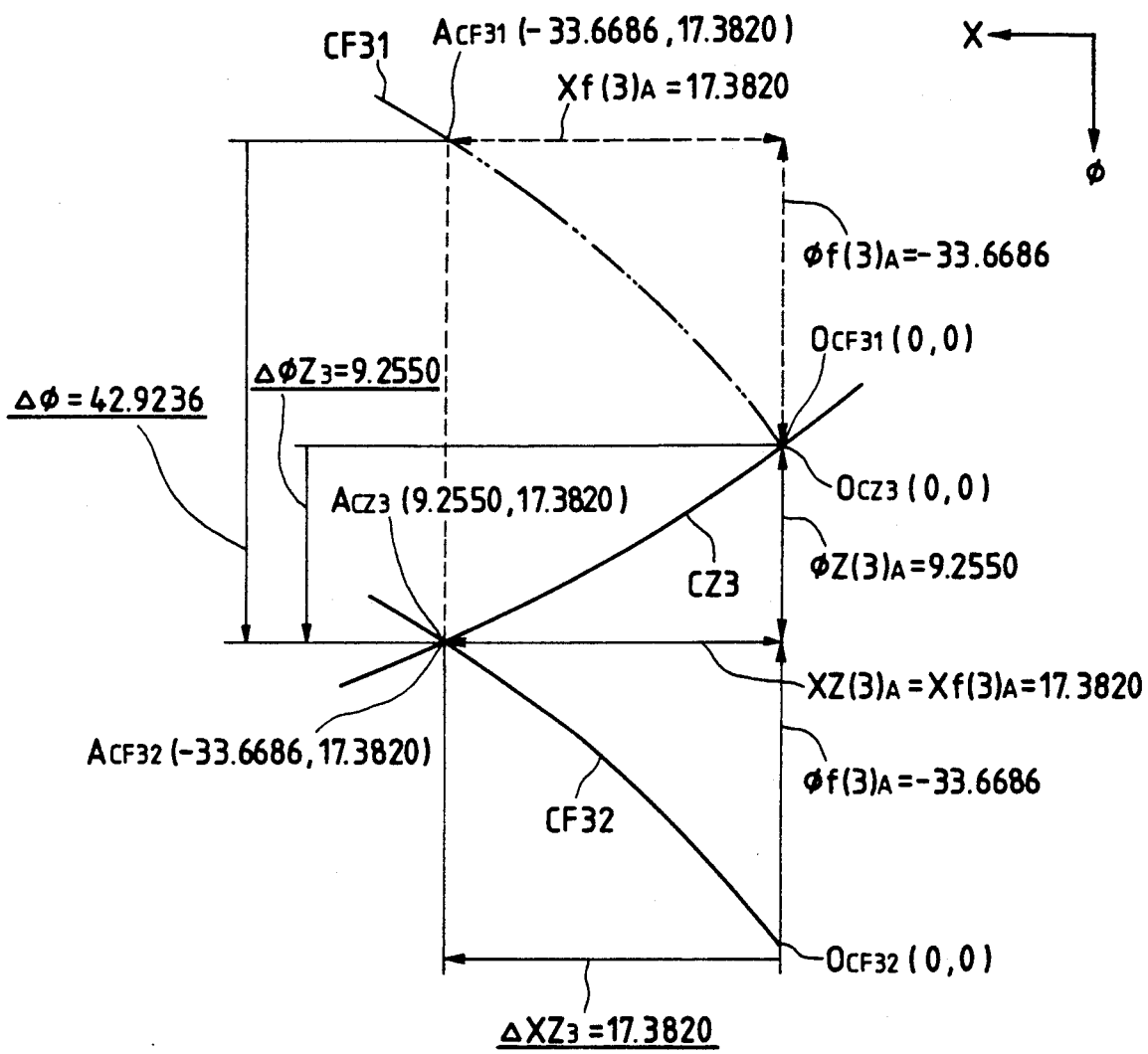
FIG. 6B is a view for explaining zooming attained on the basis of cam data of zoom and focus cams for the third lens unit in case of focal distance of F=102 and object distance of R=∞ as shown in Table 4.
Figure 6C:
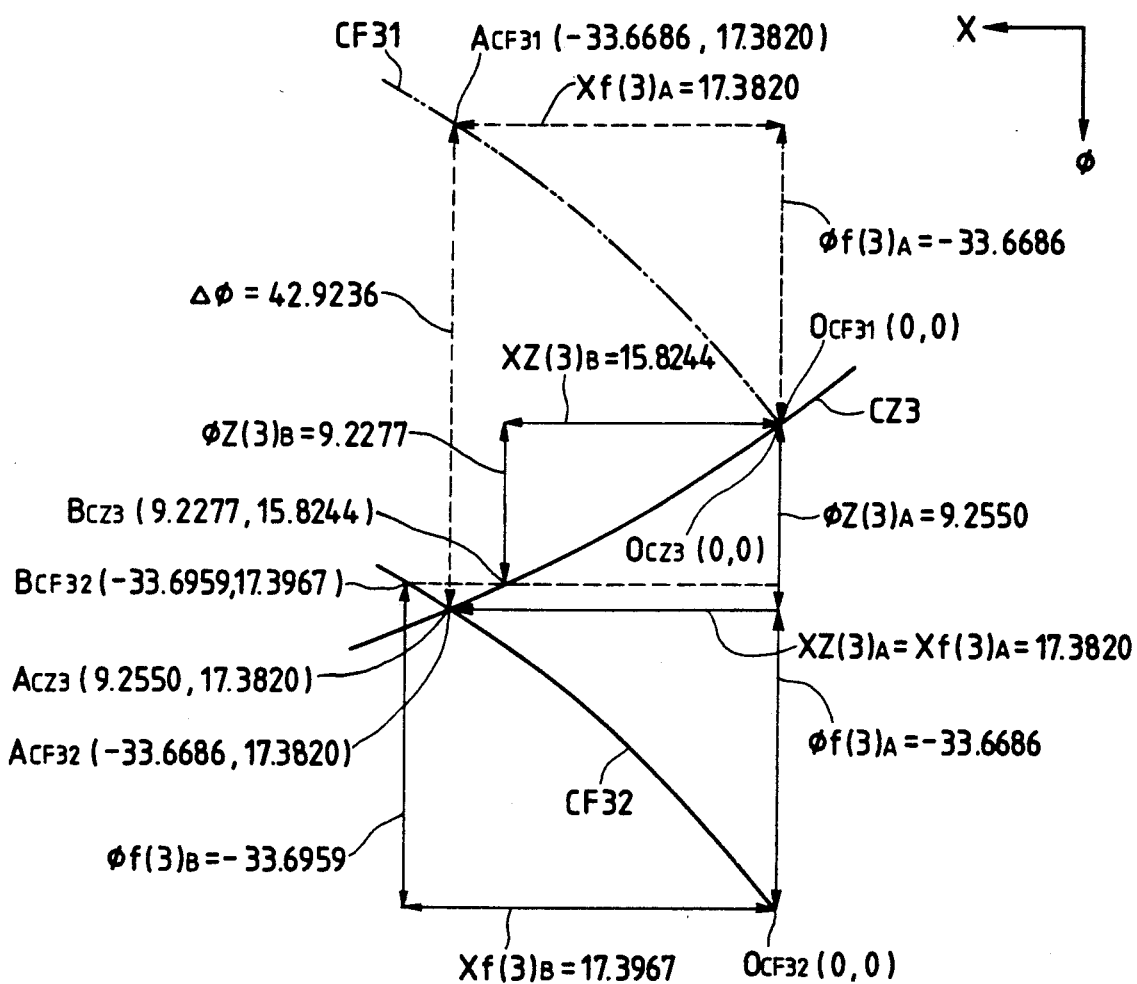
FIG. 6C is a view for explaining focusing attained on the basis of cam data of zoom and focus cams for the third lens unit in case of focal distance of F=102 and object distance of R=∞ as shown in Table 4.

Now, focusing from object distance R=∞ to R =1,500 with focal distance of F=102 as shown in FIG. 6B will be considered. In this case, from the cam data on third lens unit G3 in Table 4-(2) the co-ordinates on focus cam CF32 corresponding to the object distance of R=1,500 are brought to $B_{CF32}$ (−33 6959, 17.3967) with origin $0_{CF32}$ (0, 0) as reference, as shown in FIG. 6C, and the co-ordinates on zoom cam CZ3 corresponding to R=1,500 are $B_{CZ3}$ (9.2277, 15.8244) with origin $0_{CZ3}$ (0, 0) as reference.

Thus, focusing from object distance of R=∞ to R=1,500 with focal distance of F=102 can be attained by bringing $B_{CF32}$ (−33.6959, 17.3967) and $B_{CZ3}$ (9.2277, 15.8244) to be identical.

Figure 6D:
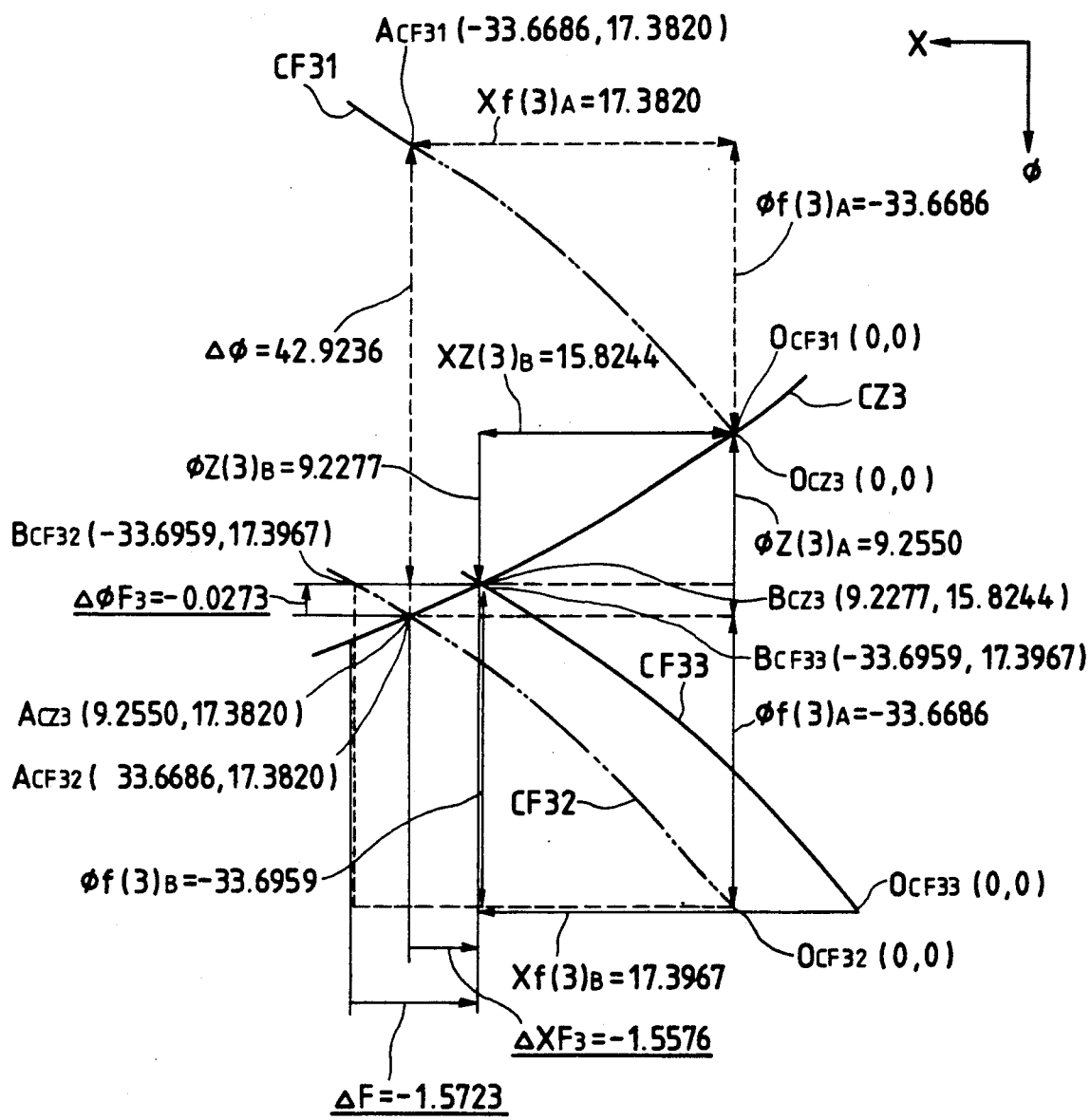
FIG. 6D is a view for explaining focusing attained on the basis of cam data for zoom and focus cams for the third lens unit in case of focal distance of F=102 and object distance of R=500.

More specifically, it may be realized with a change of the state of focus cam CF32 shown by double-dash-and-bar line over to the state of focus cam CF33 shown by solid line caused by causing relative displacement of focus and zoom cams CF32 and CZ3 to each other in the X direction (optical axis direction) by $\Delta F = XZ(3)_B - Xf(3)_B = -1.5723$, as shown in FIG. 6D.

With the change of the state of focus cam CF32 shown by double-dash-and-bar line to the state of focus cam CF33 shown by solid line, origin $0_{CF32}$ (0, 0) of focus cam CF32 is shifted in the X direction to position $0_{CF33}$ (0, 0), and $B_{CF32}$ (−33.6959, 17.3969) is shifted to $B_{CF33}$ (−33.6959, 17.3969).

Thus, if $B_{CF32}$ (−33.6959, 17.3969) on focus cam CF33 shown by solid line corresponding to $B_{CF33}$ (−33.6959, 17.3967) on focus cam CF32 shown by doubledash-and-bar line coincides with $B_{CZ3}$ (9.2277, 15.8244) on zoom cam CZ3, it means that third lens unit G3 is displaced in the optical axis direction (X direction) by $\Delta XF3 = -1.5576$.

It will be seen that the value of ΔXF3 (=−1.5576) in this case is identical with the value in the lower part of Table 3-(2). It will also be seen that the displacement ΔF (DF in Table 3) of focus and zoom cams CF32 and CZ3 relative to each other in the X direction (optical axis direction) is identical with the value in the middle part of Table 3.

It is thus to be understood that focusing from object distance of R=∞ to R=1,500 is effected accurately while maintaining the focal distance of F =102.

It will be appreciated that not only the coordinates of the individual lens units o the focus and zoom cams with each focal distance F and each object distance R but also the positional relation of the lens units to one another can be readily known from the cam data shown in Tables 4-(1) to 4-(3).

TABLE 4(1)

|  | Focus cam | | Zoom cam | | |
|---|---|---|---|---|---|
|  | φf (1) | Xf (1) | φz (1) | Xz (1) | F |
| First lens unit | .0000 | .0000 | .0000 | .0000 | 36.0000 |
|  | .0000 | 13.91921 | 13.9192 | 13.9192 | 50.0000 |
|  | .0000 | 21.5868 | 21.5868 | 21.5868 | 60.0000 |
|  | .0000 | 27.9017 | 27.9017 | 27.9017 | 70.0000 |
|  | .0000 | 35.7012 | 35.7012 | 35.7012 | 85.0000 |
|  | .0000 | 42.9236 | 42.9236 | 42.9236 | 102.0000 |

|  | Focus cam | | Zoom cam | | |
|---|---|---|---|---|---|
|  | φf (2) | Xf (2) | φz (2) | Xz (2) | F |
| Second lens unit | .0000 | .0000 | .0000 | .0000 | 36.0000 |
|  | .0000 | 1.3475 | 13.9192 | 1.3475 | 50.0000 |
|  | .0000 | 2.5902 | 21.5868 | 2.5902 | 60.0000 |
|  | .0000 | 3.9244 | 27.9017 | 3.9244 | 70.0000 |
|  | .0000 | 5.9618 | 35.7012 | 5.9618 | 85.0000 |
|  | .0000 | 8.1540 | 42.9236 | 8.1540 | 102.0000 |

TABLE 4(2)

| Focus cam | | Zoom cam | | | |
|---|---|---|---|---|---|
| φf (3) | Xf (3) | φz (3) | Xz (3) | F | R |
| .0000 | .0000 | .0000 | .0000 | 36.0000 | ∞ |
| −9.9791 | 4.6186 | 3.9402 | 4.6186 | 50.0000 | ∞ |
| −15.4825 | 7.4782 | 6.1043 | 7.4782 | 60.0000 | ∞ |
| −20.3028 | 10.1206 | 7.5990 | 10.1206 | 70.0000 | ∞ |
| −26.7757 | 13.7451 | 8.9255 | 13.7451 | 85.0000 | ∞ |
| −33.6686 | 17.3820 | 9.2550 | 17.3820 | 102.0000 | ∞ |
| −.2524 | .1089 | −.2524 | −.3521 | 36.0000 | 5000.00 |
| −10.2546 | 4.7584 | 3.6647 | 4.2974 | 50.0000 | 5000.00 |
| −15.7051 | 7.5976 | 5.8817 | 7.1366 | 60.0000 | 5000.00 |
| −20.4810 | 10.2213 | 7.4207 | 9.7603 | 70.0000 | 5000.00 |
| −26.8753 | 13.8010 | 8.8259 | 13.3400 | 85.0000 | 5000.00 |
| −33.6603 | 17.3787 | 9.2634 | 16.9177 | 102.0000 | 5000.00 |
| −.4135 | .1784 | −.4135 | −.5953 | 36.0000 | 3000.00 |
| −10.4451 | 4.8546 | 3.4741 | 4.0809 | 50.0000 | 3000.00 |
| −15.8625 | 7.6814 | 5.7242 | 6.9077 | 60.0000 | 3000.00 |
| −20.6070 | 10.2918 | 7.2947 | 9.5181 | 70.0000 | 3000.00 |
| −26.9510 | 13.8427 | 8.7501 | 13.0689 | 85.0000 | 3000.00 |
| −33.6628 | 17.3800 | 9.2608 | 16.6062 | 102.0000 | 3000.00 |
| −.6056 | .2616 | −.6056 | −.9080 | 36.0000 | 2000.00 |
| −10.6882 | 4.9774 | 3.2311 | 3.8078 | 50.0000 | 2000.00 |
| −16.0671 | 7.7906 | 5.5197 | 6.6210 | 60.0000 | 2000.00 |
| −20.7708 | 10.3836 | 7.1309 | 9.2140 | 70.0000 | 2000.00 |
| −27.0541 | 13.8993 | 8.6471 | 12.7297 | 85.0000 | 2000.00 |
| −33.6744 | 17.3858 | 9.2492 | 16.2162 | 102.0000 | 2000.00 |
| −.7891 | .3415 | −.7891 | −1.2308 | 36.0000 | 1500.00 |
| −10.9366 | 5.1032 | 2.9827 | 3.5309 | 50.0000 | 1500.00 |
| −16.2802 | 7.9046 | 5.3066 | 6.3323 | 60.0000 | 1500.00 |
| −20.9417 | 10.4793 | 6.9601 | 8.9071 | 70.0000 | 1500.00 |
| −27.1661 | 13.9608 | 8.5351 | 12.3886 | 85.0000 | 1500.00 |
| −33.6959 | 17.3967 | 9.2277 | 15.8244 | 102.0000 | 1500.00 |
| −1.1395 | .4943 | −1.1395 | −1.9057 | 36.0000 | 1000.00 |
| −11.4462 | 5.3623 | 2.4730 | 2.9623 | 50.0000 | 1000.00 |
| −16.7297 | 8.1463 | 4.8571 | 5.7463 | 60.0000 | 1000.00 |
| −21.3038 | 10.6824 | 6.5979 | 8.2823 | 70.0000 | 1000.00 |
| −27.4157 | 14.0974 | 8.2855 | 11.6974 | 85.0000 | 1000.00 |
| −33.7713 | 17.4346 | 9.1523 | 15.0346 | 102.0000 | 1000.00 |
| −1.3210 | .5736 | −1.3210 | −2.2773 | 36.0000 | 850.00 |
| −11.7207 | 5.5026 | 2.1986 | 2.6517 | 50.0000 | 850.00 |
| −16.9790 | 8.2812 | 4.6078 | 5.4303 | 60.0000 | 850.00 |
| −21.5059 | 10.7957 | 6.3958 | 7.9448 | 70.0000 | 850.00 |
| −27.5621 | 14.1773 | 8.1391 | 11.3264 | 85.0000 | 850.00 |
| −33.8302 | 17.4642 | 9.0934 | 14.6133 | 102.0000 | 850.00 |

TABLE 4(3)

| Focus cam | | Zoom cam | | | |
|---|---|---|---|---|---|
| φf (4) | Xf (4) | φz (4) | Xz (4) | F | R |
| .0000 | .0000 | .0000 | .0000 | 36.0000 | ∞ |
| −14.2889 | 6.8483 | −.3696 | 6.8483 | 50.0000 | ∞ |
| −22.2567 | 10.7930 | −.6699 | 10.7930 | 60.0000 | ∞ |
| −29.3106 | 14.3255 | −1.4088 | 14.3255 | 70.0000 | ∞ |
| −38.9827 | 19.0289 | −3.2816 | 19.0289 | 85.0000 | ∞ |
| −50.0491 | 23.6071 | −7.1255 | 23.6071 | 102.0000 | ∞ |
| .0811 | −.0357 | .0811 | −.4967 | 36.0000 | 5000.00 |
| −14.2834 | 6.8469 | −.3641 | 6.3859 | 50.0000 | 5000.00 |
| −22.1833 | 10.7580 | −.5965 | 10.2970 | 60.0000 | 5000.00 |
| −29.1710 | 14.2567 | −1.2693 | 13.7957 | 70.0000 | 5000.00 |
| −38.6329 | 18.8705 | −2.9317 | 18.4095 | 85.0000 | 5000.00 |
| −49.2518 | 23.3037 | −6.3282 | 22.8427 | 102.0000 | 5000.00 |
| .1588 | −.0712 | .1588 | −.8450 | 36.0000 | 3000.00 |
| −14.2825 | 6.8465 | −.3633 | 6.0728 | 50.0000 | 3000.00 |
| −22.1409 | 10.7370 | −.5542 | 9.9633 | 60.0000 | 3000.00 |
| −29.0842 | 14.2131 | −1.1825 | 13.4394 | 70.0000 | 3000.00 |
| −38.4269 | 18.7761 | −2.7257 | 18.0024 | 85.0000 | 3000.00 |
| −48.7563 | 23.1134 | −5.8327 | 22.3396 | 102.0000 | 3000.00 |
| .2820 | −.1276 | .2820 | −1.2972 | 36.0000 | 2000.00 |
| −14.2823 | 6.8464 | −.3631 | 5.6768 | 50.0000 | 2000.00 |
| −22.0940 | 10.7137 | −.5072 | 9.5441 | 60.0000 | 2000.00 |
| −28.9810 | 14.1612 | −1.0793 | 12.9916 | 70.0000 | 2000.00 |
| −38.1946 | 18.6691 | −2.4934 | 17.4995 | 85.0000 | 2000.00 |
| −48.1934 | 23.8960 | −5.2698 | 21.7264 | 102.0000 | 2000.00 |
| .4250 | −.1928 | .4250 | −1.7651 | 36.0000 | 1500.00 |
| −14.2826 | 6.8465 | −.3633 | 5.2743 | 50.0000 | 1500.00 |
| −22.0540 | 10.6939 | −.4673 | 9.1217 | 60.0000 | 1500.00 |
| −28.8835 | 14.1122 | −.9818 | 12.5399 | 70.0000 | 1500.00 |
| −37.9841 | 18.5717 | −2.2829 | 16.9995 | 85.0000 | 1500.00 |
| −47.6794 | 22.6961 | −4.7558 | 21.1239 | 102.0000 | 1500.00 |
| .7169 | −.3253 | .7169 | −2.7253 | 36.0000 | 1000.00 |
| −14.2826 | 6.8466 | −.3634 | 4.4466 | 50.0000 | 1000.00 |
| −21.9945 | 10.6644 | −.4077 | 8.2644 | 60.0000 | 1000.00 |
| −28.7057 | 14.0228 | −.8040 | 11.6227 | 70.0000 | 1000.00 |
| −37.6110 | 18.3983 | −1.9098 | 15.9983 | 85.0000 | 1000.00 |
| −46.7864 | 22.3451 | −3.8628 | 19.9451 | 102.0000 | 1000.00 |
| .8735 | −.3958 | .8735 | −3.2467 | 36.0000 | 850.00 |
| −14.2794 | 6.8450 | −.3601 | 3.9940 | 50.0000 | 850.00 |
| −21.9736 | 10.6540 | −.3868 | 7.8031 | 60.0000 | 850.00 |
| −28.6215 | 13.9804 | −.7197 | 11.1295 | 70.0000 | 850.00 |
| −37.4362 | 18.3166 | −1.7351 | 15.4657 | 85.0000 | 850.00 |
| −46.3876 | 22.1864 | −3.4639 | 19.3354 | 102.0000 | 850.00 |

Table 5 shows the values of ΔF necessary for optimizing the displacement of the focal point accompanying focusing to zero, as obtained from the orbits of displacement after conversion for each zooming state and each object distance R. Upper portion of Table 5 shows the optimum feed ΔF (DF) of the second cam cylinder with the focus cam for focusing in zooming state with focal distance F of 36, 50, 60, 70, 85 and 102 mm and with object distance R of 0.85, 1.0, 1.5, 2.0, 3.0 and 5.0 m. Middle portion of the table shows the displacement of the focus cam necessary for the optimum focusing to be obtained at the telescope end with each object distance R. Lower portion of the table shows the actual feed extent ΔX (DX) of each lens unit corresponding to each ΔF (DF) in zooming state with focal distance F of 36, 30, 60, 70, 85 and 102 mm and with object distance R of 0.85, 1.0, 1.5, 2.0, 3.0 and 5.0 m.

It will be seen from the values in the upper portion of Table 5 that the values of ΔF (DF) are very close to one another for the same object distance R and the displacement accompanying zooming is extremely reduced. Obviously, even in case where first cam cylinder with zoom cam and second cam cylinder with focus cam are displaced relative to each other using auto-focus system, the promptness of focusing can be improved owing to very slight extent of displacement for compensation.

Regarding the relation between focus and zoom cams CF and CZ after conversion as shown in FIG. 2A, it may be though that problems arise in connection with the mechanism for displacing lens units along cam grooves for zooming and for focusing because the intersection angle between focus and zoom cams CF4 and CZ4 of fourth lens unit G4 is reduced as one goes to the telescope end However, it is possible to vary only the intersection angle between both the cams without influencing the operation of zooming or focusing by enlarging or contracting all the orbits after conversion in the direction. As an alternate method, it is possible to set $\Delta F$ by considering the intersection angle.

The description so far has concerned with focusing in the zoom lens system having the four-lens-unit structure as shown in Table 1 and FIG. 2A while effecting floating with relative displacement of third and fourth lens units G3 and G4 to each other. However, focusing is also possible with displacement of other lens units than third and fourth lens units G3 and G4. It will now be shown that the invention is applicable as well to other methods of focusing.

Table 6 shows feed extent $\Delta X$ and conversion value in the four-lens-unit zoom lens system of the first embodiment for R=1 m when effecting focusing with displacement of sole third lens unit G3. Table 7 shows $\Delta X$ and $\phi$ for R=1 m when effecting focusing with displacement of sole second lens unit G2. Table 8 shows $\Delta X$ and $\phi$ for R=1.5 m when effecting focusing with displacement of sole first lens unit G1 as foremost lens unit.

Figures 7A, 7B:
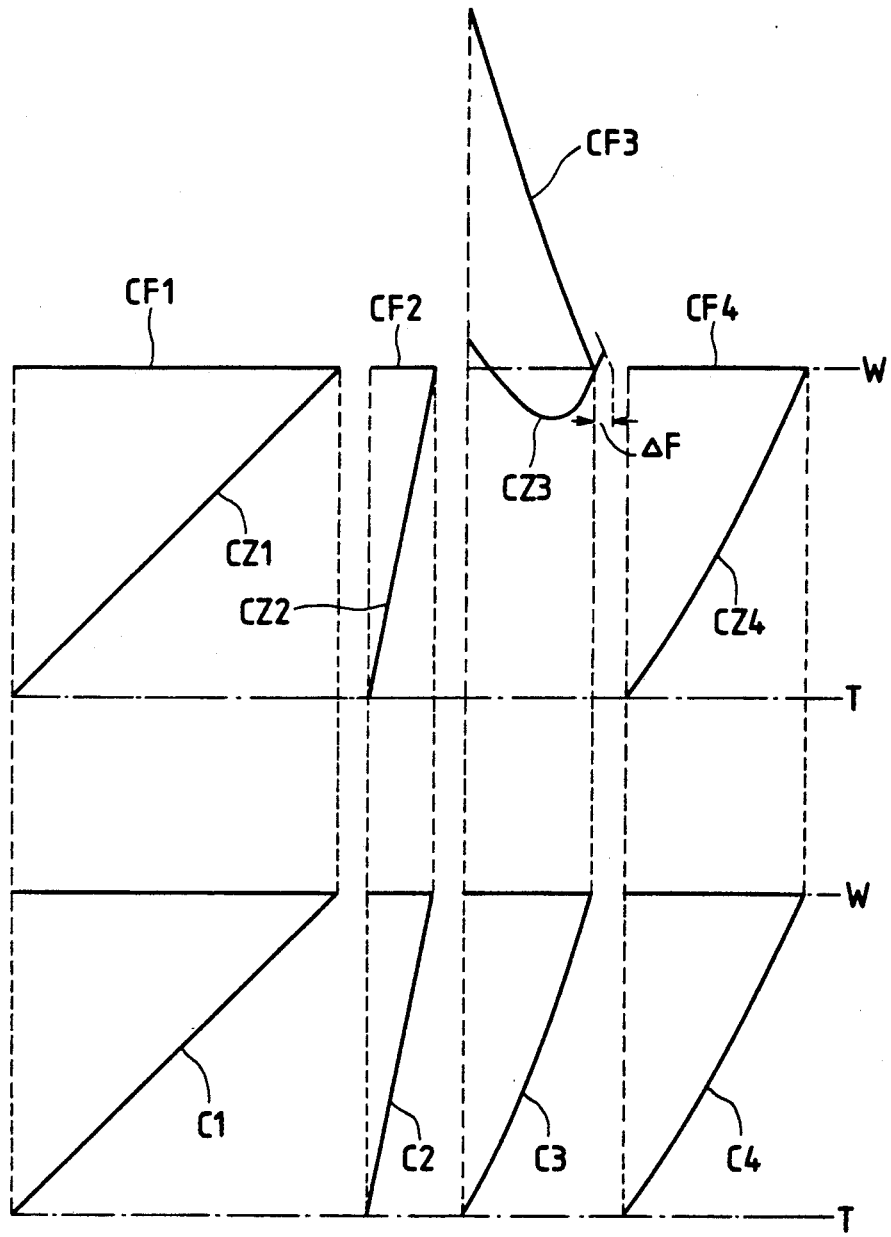
FIGS. 7A and 7B are developed diagrams showing schematic cam orbits of zoom and focus cams in an embodiment of the invention, in which the third lens unit in the zoom lens shown in FIG. 1 is displaced for focusing.

FIG. 7A shows orbits of displacement after conversion in case of effecting focusing with third lens unit G3. These orbits are obtained by using $\Delta X$ and $\phi$ in Table 6 and $\Delta F = -1.0$ mm for the diagram of FIG. 3A. Table 9 shows, like Table 3, the feed extents $\Delta F$ (DF) and $\Delta X$ (DX) for focusing with each focal distance F and object distance R as calculated from the orbits of displacement after conversion and displacement (BF) of the focal point with $\Delta X$ is given.

Figures 8A, 8B:
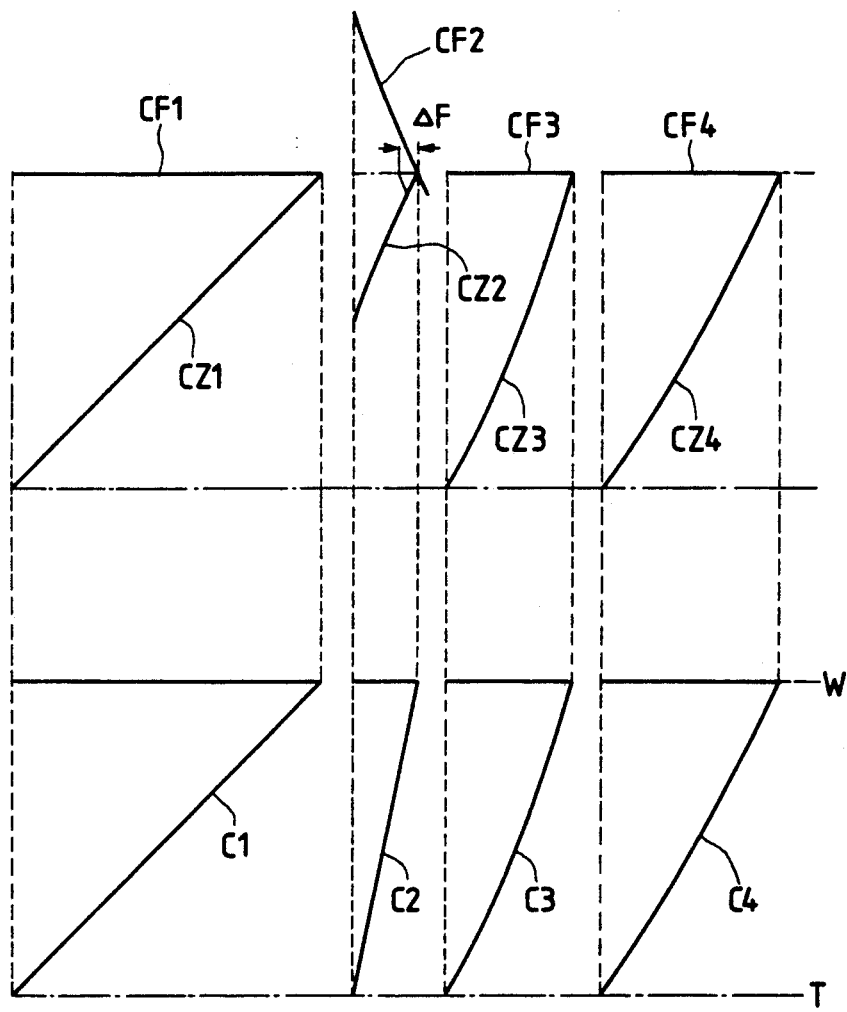
FIGS. 8A and 8B are developed diagrams showing schematic cam orbits of zoom and focus cams in an embodiment of the invention, in which the second lens unit in the zoom lens shown in FIG. 1 is displaced for focusing.

FIG. 8A likewise shows the orbits of displacement after conversion in case of focusing with second lens unit G2. These orbits are obtained by using $\Delta X$ and $\phi$ in Table 7 and $\Delta F = 2.0$ mm for object distance of R=1 m in the conversion diagram of FIG. 10. Table 10 shows the feed extents $\Delta F$ (DF) and $\Delta X$ (DX) for focusing with each focal distance F and each object distance R as calculated from the orbits after conversion and displacement (BF) of the focal point.

Figures 9A, 9B:
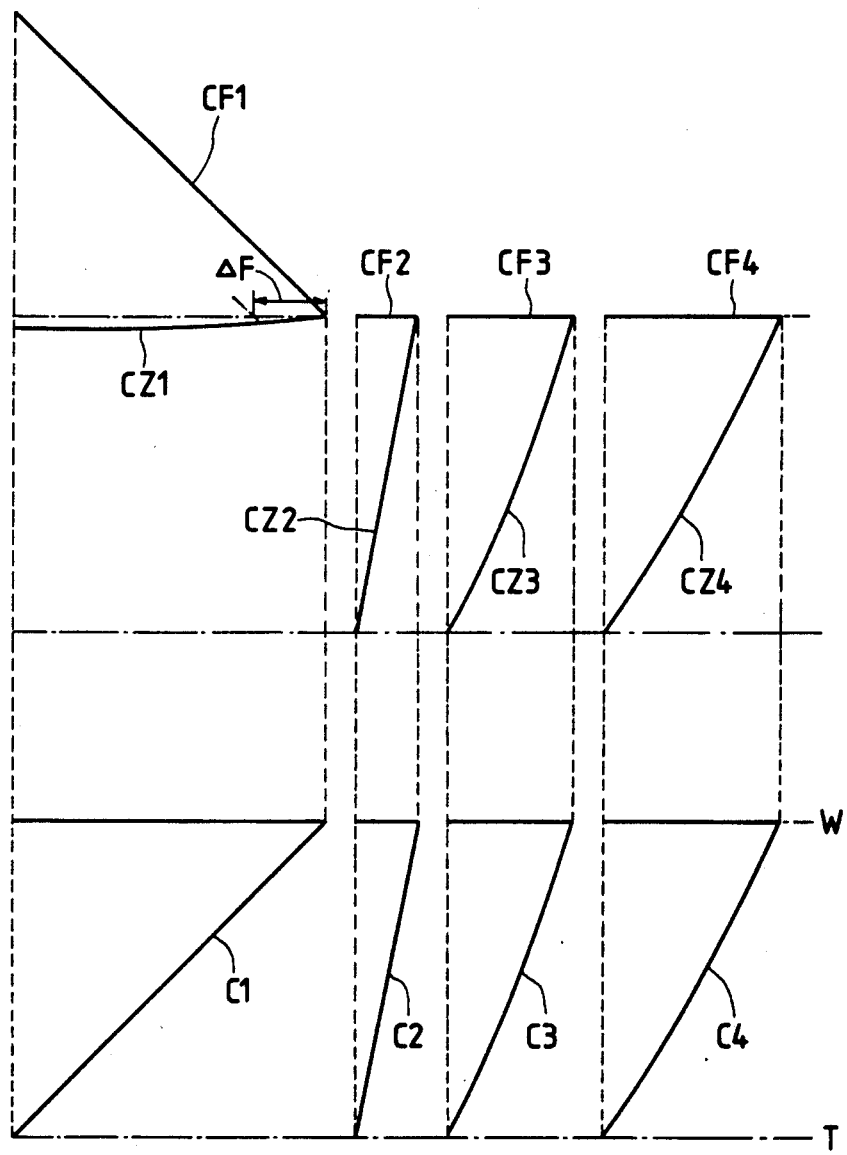
FIGS. 9A and 9B are developed diagrams showing schematic cam orbits of zoom and focus cams in an embodiment of the invention, in which the first lens unit in the zoo lens shown in FIG. 1 is displaced for focusing.

FIG. 9A likewise shows the orbits of displacement after conversion in case of focusing with first lens unit G1. These orbits are obtained by using $\Delta X$ and $\phi$ in Table 8 and $\Delta F = 10.0$ mm for object distance of R =1.5 mm in the conversion diagram of FIG. 10. Table 11 shows the feed extents $\Delta F$ (DF) and $\Delta X$ (DX) for focusing with each focal distance R and each object distance R as calculated from the orbits after conversion and displacement (BF) of the focal point.

Figure 10:
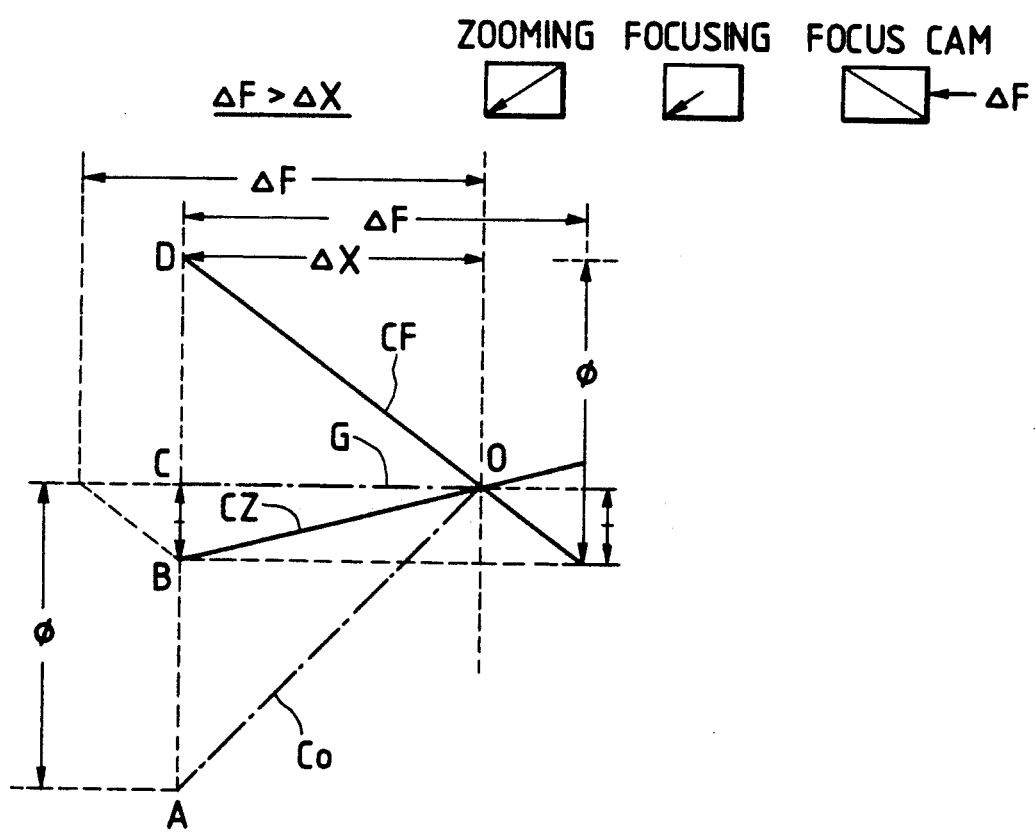
FIG. 10 is a view for explaining the operation for deriving the modified orbits shown in FIGS. 8A, 8B, 9A and 9B.

The operation of conversion with respect to the diagram of FIG. 10 is the same as in the case described before in connection with FIGS. 3A and 3B except for that the direction of displacement for focusing is reversed.

It will be seen from Tables 9 to 11 that in either case the displacement (BF) of the focal point is small and sufficiently within the focal point depth, indicating that the effectiveness of the focusing system according to the invention.

It is obvious from the above results that the invention can be utilized for any lens unit substantially capable of focusing in the zoom lens system shown in Table 1 and FIG. 1A. Further, in any focusing system the displacement $\Delta F$ necessary for focusing may be held substantially constant for the same object distance R irrespective of the zooming state. It will thus be seen that satisfactory focusing can be attained even in case where a plurality of focusing lens units are displaced to different extents.

TABLE 5

|   |   | R | 850.00 | 1000.00 | 1500.00 | 2000.00 | 3000.00 | 5000.00 |
|---|---|---|---|---|---|---|---|---|
| F | 36.0000 | DF | −2.9229 | −2.4003 | −1.5068 | −1.0902 | −.7010 | −.4096 |
| F | 50.0000 | DF | −2.8923 | −2.4001 | −1.5294 | −1.1213 | −.7308 | −.4306 |
| F | 60.0000 | DF | −2.8879 | −2.4000 | −1.5326 | −1.1246 | −.7334 | −.4324 |
| F | 70.0000 | DF | −2.8867 | −2.4115 | −1.5551 | −1.1468 | −.7518 | −.4451 |
| F | 85.0000 | DF | −2.8623 | −2.4000 | −1.5603 | −1.1558 | −.7611 | −.4522 |
| F | 102.0000 | DF | −2.8510 | −2.4000 | −1.5723 | −1.1696 | −.7737 | −.4610 |
|   | FOCUS | DF | −2.8510 | −2.4000 | −1.5723 | −1.1696 | −.7737 | −.4610 |
|   |   |   | (1) | (2) | (3) | (4) |   |   |
| F | 36.0000 | DX | .0000 | .0000 | −2.3369 | −3.3310 R |   | 850.00 |
| F | 50.0000 | DX | .0000 | .0000 | −1.9954 | −2.8959 R |   | 850.00 |
| F | 60.0000 | DX | .0000 | .0000 | −2.0738 | −3.0276 R |   | 850.00 |
| F | 70.0000 | DX | .0000 | .0000 | −2.2025 | −3.2350 R |   | 850.00 |
| F | 85.0000 | DX | .0000 | .0000 | −2.4280 | −3.5765 R |   | 850.00 |
| F | 102.0000 | DX | .0000 | .0000 | −2.7687 | −4.2717 R |   | 850.00 |
| F | 36.0000 | DX | .0000 | .0000 | −1.9059 | −2.7257 R |   | 1000.00 |
| F | 50.0000 | DX | .0000 | .0000 | −1.6563 | −2.4018 R |   | 1000.00 |
| F | 60.0000 | DX | .0000 | .0000 | −1.7319 | −2.5286 R |   | 1000.00 |
| F | 70.0000 | DX | .0000 | .0000 | −1.8469 | −2.7154 R |   | 1000.00 |
| F | 85.0000 | DX | .0000 | .0000 | −2.0477 | −3.0305 R |   | 1000.00 |
| F | 102.0000 | DX | .0000 | .0000 | −2.3474 | −3.6621 R |   | 1000.00 |
| F | 36.0000 | DX | .0000 | .0000 | −1.1781 | −1.6887 R |   | 1500.00 |
| F | 50.0000 | DX | .0000 | .0000 | −1.0582 | −1.5311 R |   | 1500.00 |
| F | 60.0000 | DX | .0000 | .0000 | −1.1176 | −1.6299 R |   | 1500.00 |
| F | 70.0000 | DX | .0000 | .0000 | −1.2005 | −1.7664 R |   | 1500.00 |
| F | 85.0000 | DX | .0000 | .0000 | −1.3465 | −2.0147 R |   | 1500.00 |
| F | 102.0000 | DX | .0000 | .0000 | −1.5576 | −2.4832 R |   | 1500.00 |
| F | 36.0000 | DX | .0000 | .0000 | −.8449 | −1.2056 R |   | 2000.00 |
| F | 50.0000 | DX | .0000 | .0000 | −.7775 | −1.1232 R |   | 2000.00 |
| F | 60.0000 | DX | .0000 | .0000 | −.8248 | −1.2015 R |   | 2000.00 |
| F | 70.0000 | DX | .0000 | .0000 | −.8892 | −1.3082 R |   | 2000.00 |
| F | 85.0000 | DX | .0000 | .0000 | −1.0037 | −1.5121 R |   | 2000.00 |
| F | 102.0000 | DX | .0000 | .0000 | −1.1658 | −1.8807 R |   | 2000.00 |
| F | 36.0000 | DX | .0000 | .0000 | −.5385 | −.7632 R |   | 3000.00 |
| F | 50.0000 | DX | .0000 | .0000 | −.5080 | −.7325 R |   | 3000.00 |

TABLE 5-continued

| | | | | | | | |
|---|---|---|---|---|---|---|---|
| F | 60.0000 | DX | .0000 | .0000 | −.5411 | −.7869 R | 3000.00 |
| F | 70.0000 | DX | .0000 | .0000 | −.5855 | −.8612 R | 3000.00 |
| F | 85.0000 | DX | .0000 | .0000 | −.6653 | −1.0103 R | 3000.00 |
| F | 102.0000 | DX | .0000 | .0000 | −.7757 | −1.2674 R | 3000.00 |
| F | 36.0000 | DX | .0000 | .0000 | −.3125 | −.4404 R | 5000.00 |
| F | 50.0000 | DX | .0000 | .0000 | −.3000 | −.4318 R | 5000.00 |
| F | 60.0000 | DX | .0000 | .0000 | −.3206 | −.4654 R | 5000.00 |
| F | 70.0000 | DX | .0000 | .0000 | −.3479 | −.5116 R | 5000.00 |
| F | 85.0000 | DX | .0000 | .0000 | −.3975 | −.6077 R | 5000.00 |
| F | 102.0000 | DX | .0000 | .0000 | −.4643 | −.7644 R | 50000.00 |

TABLE 6

| F | (1) | (2) | (3) | (4) | R(mm) |
|---|---|---|---|---|---|
| ΔX | | | | | |
| 35.9975 | .0000 | .0000 | −.6202 | .0000 | 1000.00 |
| 50.0000 | .0000 | .0000 | −.8482 | .0000 | 1000.00 |
| 59.9988 | .0000 | .0000 | −1.0189 | .0000 | 1000.00 |
| 85.0000 | .0000 | .0000 | −1.4468 | .0000 | 1000.00 |
| 101.9946 | .0000 | .0000 | −1.7442 | .0000 | 1000.00 |
| φ | | | | | |
| 35.9975 | .0000 | .0000 | −1.9282 | .0000 | 1000.00 |
| 50.0000 | .0000 | .0000 | −2.4416 | .0000 | 1000.00 |
| 59.9988 | .0000 | .0000 | −2.6274 | .0000 | 1000.00 |
| 85.0000 | .0000 | .0000 | −3.0155 | .0000 | 1000.00 |
| 101.9946 | .0000 | .0000 | −3.4255 | .0000 | 1000.00 |

TABLE 7

| F | (1) | (2) | (3) | (4) | R(mm) |
|---|---|---|---|---|---|
| ΔX | | | | | |
| 35.9975 | .0000 | .6393 | .0000 | .0000 | 1000.00 |
| 50.0000 | .0000 | .8865 | .0000 | .0000 | 1000.00 |
| 59.9988 | .0000 | 1.0710 | .0000 | .0000 | 1000.00 |
| 70.0000 | .0000 | 1.2559 | .0000 | .0000 | 1000.00 |
| 85.0000 | .0000 | 1.5358 | .0000 | .0000 | 1000.00 |
| 101.9946 | .0000 | 1.8626 | .0000 | .0000 | 1000.00 |

TABLE 7-continued

| F | (1) | (2) | (3) | (4) | R(mm) |
|---|---|---|---|---|---|
| φ | | | | | |
| 35.9975 | .0000 | 7.6055 | .0000 | .0000 | 1000.00 |
| 50.0000 | .0000 | 5.7219 | .0000 | .0000 | 1000.00 |
| 59.9988 | .0000 | 5.1511 | .0000 | .0000 | 1000.00 |
| 70.0000 | .0000 | 5.0014 | .0000 | .0000 | 1000.00 |
| 85.0000 | .0000 | 5.1115 | .0000 | .0000 | 1000.00 |
| 101.9946 | .0000 | 6.0892 | .0000 | .0000 | 1000.00 |

TABLE 8

| F | (1) | (2) | (3) | (4) | R(mm) |
|---|---|---|---|---|---|
| ΔX | | | | | |
| 35.9975 | 9.4517 | .0000 | .0000 | .0000 | 1500.00 |
| 50.0000 | 9.5556 | .0000 | .0000 | .0000 | 1500.00 |
| 59.9988 | 9.6138 | .0000 | .0000 | .0000 | 1500.00 |
| 85.0000 | 9.7229 | .0000 | .0000 | .0000 | 1500.00 |
| 101.9946 | 9.7796 | .0000 | .0000 | .0000 | 1500.00 |
| φ | | | | | |
| 35.9975 | 9.4517 | .0000 | .0000 | .0000 | 1500.00 |
| 50.0000 | 9.5556 | .0000 | .0000 | .0000 | 1500.00 |
| 59.9988 | 9.6138 | .0000 | .0000 | .0000 | 1500.00 |
| 85.0000 | 9.7229 | .0000 | .0000 | .0000 | 1500.00 |
| 101.9946 | 9.7796 | .0000 | .0000 | .0000 | 1500.00 |

TABLE 9

| | | R | 850.00 | 1000.00 | 1500.00 | 2000.00 | 3000.00 | 5000.00 |
|---|---|---|---|---|---|---|---|---|
| F | 36.0000 | BF | .0061 | .0000 | −.0074 | −.0086 | −.0074 | −.0051 |
| F | 50.0000 | BF | .0159 | −.0002 | −.0174 | −.0198 | −.0166 | −.0113 |
| F | 60.0000 | BF | .0193 | −.0001 | −.0213 | −.0243 | −.0204 | −.0137 |
| F | 70.0000 | BF | .0291 | .0101 | −.0128 | −.0176 | −.0154 | −.0102 |
| F | 85.0000 | BF | .0231 | .0001 | −.0290 | −.0347 | −.0299 | −.0203 |
| F | 102.0000 | BF | .0001 | .0000 | .0000 | .0000 | .0000 | .0000 |
| | FOCUS | DF | −1.1900 | −1.0000 | −.6530 | −.4849 | −.3198 | −.1901 |
| | | | (1) | (2) | (3) | (4) | | |
| F | 36.0000 | DX | .0000 | .0000 | −.7374 | .0000 | R | 850.00 |
| F | 50.0000 | DX | .0000 | .0000 | −1.0044 | .0000 | R | 850.00 |
| F | 60.0000 | DX | .0000 | .0000 | −1.2052 | .0000 | R | 850.00 |
| F | 70.0000 | DX | .0000 | .0000 | −1.4039 | .0000 | R | 850.00 |
| F | 85.0000 | DX | .0000 | .0000 | −1.7062 | .0000 | R | 850.00 |
| F | 102.0000 | DX | .0000 | .0000 | −2.0560 | .0000 | R | 850.00 |
| F | 36.0000 | DX | .0000 | .0000 | −.6203 | .0000 | R | 1000.00 |
| F | 50.0000 | DX | .0000 | .0000 | −.8482 | .0000 | R | 1000.00 |
| F | 60.0000 | DX | .0000 | .0000 | −1.0189 | .0000 | R | 1000.00 |
| F | 70.0000 | DX | .0000 | .0000 | −1.1875 | .0000 | R | 1000.00 |
| F | 85.0000 | DX | .0000 | .0000 | −1.4468 | .0000 | R | 1000.00 |
| F | 102.0000 | DX | .0000 | .0000 | −1.7443 | .0000 | R | 1000.00 |
| F | 36.0000 | DX | .0000 | .0000 | −.4061 | .0000 | R | 1500.00 |
| F | 50.0000 | DX | .0000 | .0000 | −.5589 | .0000 | R | 1500.00 |
| F | 60.0000 | DX | .0000 | .0000 | −.6728 | .0000 | R | 1500.00 |
| F | 70.0000 | DX | .0000 | .0000 | −.7848 | .0000 | R | 1500.00 |
| F | 85.0000 | DX | .0000 | .0000 | −.9612 | .0000 | R | 1500.00 |
| F | 102.0000 | DX | .0000 | .0000 | −1.1587 | .0000 | R | 1500.00 |
| F | 36.0000 | DX | .0000 | .0000 | −.3021 | .0000 | R | 2000.00 |
| F | 50.0000 | DX | .0000 | .0000 | −.4169 | .0000 | R | 2000.00 |
| F | 60.0000 | DX | .0000 | .0000 | −.5024 | .0000 | R | 2000.00 |
| F | 70.0000 | DX | .0000 | .0000 | −.5862 | .0000 | R | 2000.00 |
| F | 85.0000 | DX | .0000 | .0000 | −.7201 | .0000 | R | 2000.00 |
| F | 102.0000 | DX | .0000 | .0000 | −.8675 | .0000 | R | 2000.00 |
| F | 36.0000 | DX | .0000 | .0000 | −.1996 | .0000 | R | 3000.00 |
| F | 50.0000 | DX | .0000 | .0000 | −.2762 | .0000 | R | 3000.00 |
| F | 60.0000 | DX | .0000 | .0000 | −.3332 | .0000 | R | 3000.00 |
| F | 70.0000 | DX | 0000 | .0000 | −.3889 | .0000 | R | 3000.00 |

TABLE 9-continued

| | | | | | | | | |
|---|---|---|---|---|---|---|---|---|
| F | 85.0000 | DX | .0000 | .0000 | −.4792 | .0000 | R | 3000.00 |
| F | 102.0000 | DX | .0000 | .0000 | −.5773 | .0000 | R | 3000.00 |
| F | 36.0000 | DX | .0000 | .0000 | −.1189 | .0000 | R | 5000.00 |
| F | 50.0000 | DX | .0000 | .0000 | −.1648 | .0000 | R | 5000.00 |
| F | 60.0000 | DX | .0000 | .0000 | −.1989 | .0000 | R | 5000.00 |
| F | 70.0000 | DX | .0000 | .0000 | −.2323 | .0000 | R | 5000.00 |
| F | 85.0000 | DX | .0000 | .0000 | −.2869 | .0000 | R | 5000.00 |
| F | 102.0000 | DX | .0000 | .0000 | −.3459 | .0000 | R | 5000.00 |

TABLE 10

| | | R | 850.00 | 1000.00 | 1500.00 | 2000.00 | 3000.00 | 5000.00 |
|---|---|---|---|---|---|---|---|---|
| F | 36.0000 | BF | −.0333 | .0001 | .0394 | .0352 | .0028 | .0112 |
| F | 50.0000 | BF | −.0108 | .0000 | .0621 | .0734 | .0612 | .0386 |
| F | 60.0000 | BF | .0180 | −.0002 | .0035 | −.0150 | −.0330 | −.0338 |
| F | 70.0000 | BF | .0256 | .0000 | −.0160 | −.0419 | −.0580 | −.0533 |
| F | 85.0000 | BF | −.0497 | −.0004 | .0581 | .0222 | −.0169 | −.0326 |
| F | 102.0000 | BF | .0001 | .0000 | .0000 | .0000 | .0000 | .0000 |
| | FOCUS | DF | 2.3236 | 2.0000 | 1.3629 | 1.0437 | .7152 | .4408 |
| | | | (1) | (2) | (3) | (4) | | |
| F | 36.0000 | DX | .0000 | .7762 | .0000 | .0000 | R | 850.00 |
| F | 50.0000 | DX | .0000 | 1.0547 | .0000 | .0000 | R | 850.00 |
| F | 60.0000 | DX | .0000 | 1.2609 | .0000 | .0000 | R | 850.00 |
| F | 70.0000 | DX | .0000 | 1.4739 | .0000 | .0000 | R | 850.00 |
| F | 85.0000 | DX | .0000 | 1.8119 | .0000 | .0000 | R | 850.00 |
| F | 102.0000 | DX | .0000 | 2.1740 | .0000 | .0000 | R | 850.00 |
| F | 36.0000 | DX | .0000 | .6393 | .0000 | .0000 | R | 1000.00 |
| F | 50.0000 | DX | .0000 | .8865 | .0000 | .0000 | R | 1000.00 |
| F | 60.0000 | DX | .0000 | 1.0711 | .0000 | .0000 | R | 1000.00 |
| F | 70.0000 | DX | .0000 | 1.2559 | .0000 | .0000 | R | 1000.00 |
| F | 85.0000 | DX | .0000 | 1.5358 | .0000 | .0000 | R | 1000.00 |
| F | 102.0000 | DX | .0000 | 1.8627 | .0000 | .0000 | R | 1000.00 |
| F | 36.0000 | DX | .0000 | .3991 | .0000 | .0000 | R | 1500.00 |
| F | 50.0000 | DX | .0000 | .5620 | .0000 | .0000 | R | 1500.00 |
| F | 60.0000 | DX | .0000 | .7072 | .0000 | .0000 | R | 1500.00 |
| F | 70.0000 | DX | .0000 | .8394 | .0000 | .0000 | R | 1500.00 |
| F | 85.0000 | DX | .0000 | 1.0186 | .0000 | .0000 | R | 1500.00 |
| F | 102.0000 | DX | .0000 | 1.2635 | .0000 | .0000 | R | 1500.00 |
| F | 36.0000 | DX | .0000 | .2935 | .0000 | .0000 | R | 2000.00 |
| F | 50.0000 | DX | .0000 | .4095 | .0000 | .0000 | R | 2000.00 |
| F | 60.0000 | DX | .0000 | .5335 | .0000 | .0000 | R | 2000.00 |
| F | 70.0000 | DX | .0000 | .6366 | .0000 | .0000 | R | 2000.00 |
| F | 85.0000 | DX | .0000 | .7716 | .0000 | .0000 | R | 2000.00 |
| F | 102.0000 | DX | .0000 | .9570 | .0000 | .0000 | R | 2000.00 |
| F | 36.0000 | DX | .0000 | .1938 | .0000 | .0000 | R | 3000.00 |
| F | 50.0000 | DX | .0000 | .2669 | .0000 | .0000 | R | 3000.00 |
| F | 60.0000 | DX | .0000 | .3610 | .0000 | .0000 | R | 3000.00 |
| F | 70.0000 | DX | .0000 | .4319 | .0000 | .0000 | R | 3000.00 |
| F | 85.0000 | DX | .0000 | .5235 | .0000 | .0000 | R | 3000.00 |
| F | 102.0000 | DX | .0000 | .6448 | .0000 | .0000 | R | 3000.00 |
| F | 36.0000 | DX | .0000 | .1165 | .0000 | .0000 | R | 5000.00 |
| F | 50.0000 | DX | .0000 | .1586 | .0000 | .0000 | R | 5000.00 |
| F | 60.0000 | DX | .0000 | .2201 | .0000 | .0000 | R | 5000.00 |
| F | 70.0000 | DX | .0000 | .2639 | .0000 | .0000 | R | 5000.00 |
| F | 85.0000 | DX | .0000 | .3203 | .0000 | .0000 | R | 5000.00 |
| F | 102.0000 | DX | .0000 | .3905 | .0000 | .0000 | R | 5000.00 |

TABLE 11

| | | R | 1000.00 | 1500.00 | 2000.00 | 3000.00 | 5000.00 | 7000.00 |
|---|---|---|---|---|---|---|---|---|
| F | 36.0000 | BF | −.0440 | .0000 | .0080 | .0101 | .0080 | .0061 |
| F | 50.0000 | BF | −.0629 | .0000 | .0113 | .0144 | .0114 | .0087 |
| F | 60.0000 | BF | −.0739 | .0000 | .0126 | .0165 | .0131 | .0099 |
| F | 70.0000 | BF | −.0760 | −.0019 | .0125 | .0181 | .0146 | .0108 |
| F | 85.0000 | BF | −.0686 | .0000 | .0207 | .0204 | .0140 | .0098 |
| F | 102.0000 | BF | −.0001 | .0000 | .0000 | .0000 | .0000 | .0000 |
| | FOCUS | DF | 16.8021 | 10.0000 | 7.1196 | 4.5129 | 2.6054 | 1.8327 |
| | | | (1) | (2) | (3) | (4) | | |
| F | 36.0000 | DX | 15.9192 | .0000 | .0000 | .0000 | R | 1000.00 |
| F | 50.0000 | DX | 16.0950 | .0000 | .0000 | .0000 | R | 1000.00 |
| F | 60.0000 | DX | 16.1991 | .0000 | .0000 | .0000 | R | 1000.00 |
| F | 70.0000 | DX | 16.2724 | .0000 | .0000 | .0000 | R | 1000.00 |
| F | 85.0000 | DX | 16.3684 | .0000 | .0000 | .0000 | R | 1000.00 |
| F | 102.0000 | DX | 16.4130 | .0000 | .0000 | .0000 | R | 1000.00 |
| F | 36.0000 | DX | 9.4518 | .0000 | .0000 | .0000 | R | 1500.00 |
| F | 50.0000 | DX | 9.5556 | .0000 | .0000 | .0000 | R | 1500.00 |
| F | 60.0000 | DX | 9.6138 | .0000 | .0000 | .0000 | R | 1500.00 |
| F | 70.0000 | DX | 9.6670 | .0000 | .0000 | .0000 | R | 1500.00 |
| F | 85.0000 | DX | 9.7229 | .0000 | .0000 | .0000 | R | 1500.00 |
| F | 102.0000 | DX | 9.7797 | .0000 | .0000 | .0000 | R | 1500.00 |

TABLE 11-continued

| | | | | | | | |
|---|---|---|---|---|---|---|---|
| F | 36.0000 | DX | 6.7223 | .0000 | .0000 | .0000 R | 2000.00 |
| F | 50.0000 | DX | 6.7959 | .0000 | .0000 | .0000 R | 2000.00 |
| F | 60.0000 | DX | 6.8380 | .0000 | .0000 | .0000 R | 2000.00 |
| F | 70.0000 | DX | 6.8743 | .0000 | .0000 | .0000 R | 2000.00 |
| F | 85.0000 | DX | 6.9013 | .0000 | .0000 | .0000 R | 2000.00 |
| F | 102.0000 | DX | 6.9648 | .0000 | .0000 | .0000 R | 2000.00 |
| F | 36.0000 | DX | 4.2574 | .0000 | .0000 | .0000 R | 3000.00 |
| F | 50.0000 | DX | 4.3040 | .0000 | .0000 | .0000 R | 3000.00 |
| F | 60.0000 | DX | 4.3306 | .0000 | .0000 | .0000 R | 3000.00 |
| F | 70.0000 | DX | 4.3514 | .0000 | .0000 | .0000 R | 3000.00 |
| F | 85.0000 | DX | 4.3745 | .0000 | .0000 | .0000 R | 3000.00 |
| F | 102.0000 | DX | 4.4203 | .0000 | .0000 | .0000 R | 3000.00 |
| F | 36.0000 | DX | 2.4564 | .0000 | .0000 | .0000 R | 5000.00 |
| F | 50.0000 | DX | 2.4832 | .0000 | .0000 | .0000 R | 5000.00 |
| F | 60.0000 | DX | 2.4985 | .0000 | .0000 | .0000 R | 5000.00 |
| F | 70.0000 | DX | 2.5100 | .0000 | .0000 | .0000 R | 5000.00 |
| F | 85.0000 | DX | 2.5268 | .0000 | .0000 | .0000 R | 5000.00 |
| F | 102.0000 | DX | 2.5541 | .0000 | .0000 | .0000 R | 5000.00 |
| F | 36.0000 | DX | 1.7274 | .0000 | .0000 | .0000 R | 7000.00 |
| F | 50.0000 | DX | 1.7462 | .0000 | .0000 | .0000 R | 7000.00 |
| F | 60.0000 | DX | 1.7570 | .0000 | .0000 | .0000 R | 7000.00 |
| F | 70.0000 | DX | 1.7651 | .0000 | .0000 | .0000 R | 7000.00 |
| F | 85.0000 | DX | 1.7775 | .0000 | .0000 | .0000 R | 7000.00 |
| F | 102.0000 | DX | 1.7959 | .0000 | .0000 | .0000 R | 7000.00 |

The invention is not limited to the above four-lens-unit zoom lens system but is effectively applicable as well to other zoom lens systems.

Figure 11A:
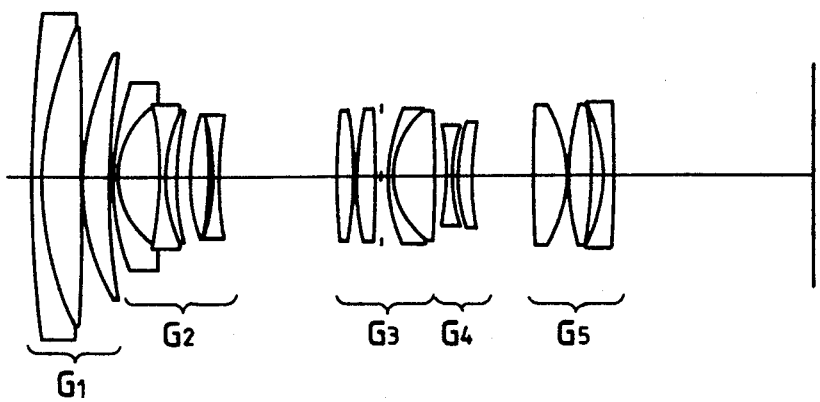
FIG. 11A is a schematic view showing a zoom lens having a five-lens-unit structure used for an embodiment of the invention.
Figure 11B:
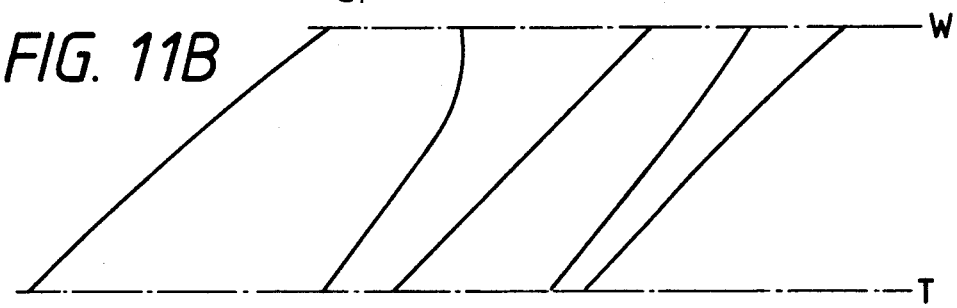
FIG. 11B is a diagram showing orbits of displacement of the individual lens units in the zoom lens for zooming.

The zoom lens system shown in FIG. 11A five lens units, i.e., first lens unit G1 having positive refracting power, second lens unit G2 having negative refracting power, third lens unit G3 having positive refracting power, fourth lens unit G4 having negative refracting power, and fifth lens unit G5 having positive refracting power, these lens units being arranged in the mentioned order from the object side and being all displaced to the object side for zooming from the wide angle side to the telephoto side. Table 12 shows specifications of this zoom lens system, and FIG. 11B shows the orbits of displacement of the individual lens units in this zoom lens system. The abscissa (optical axis direction) and ordinate ($\theta$ direction) is selected such that the orbit of displacement of third lens unit G3 for zooming is a straight line at an angle of 45° with respect to the optical axis.

Figures 12A, 12B:
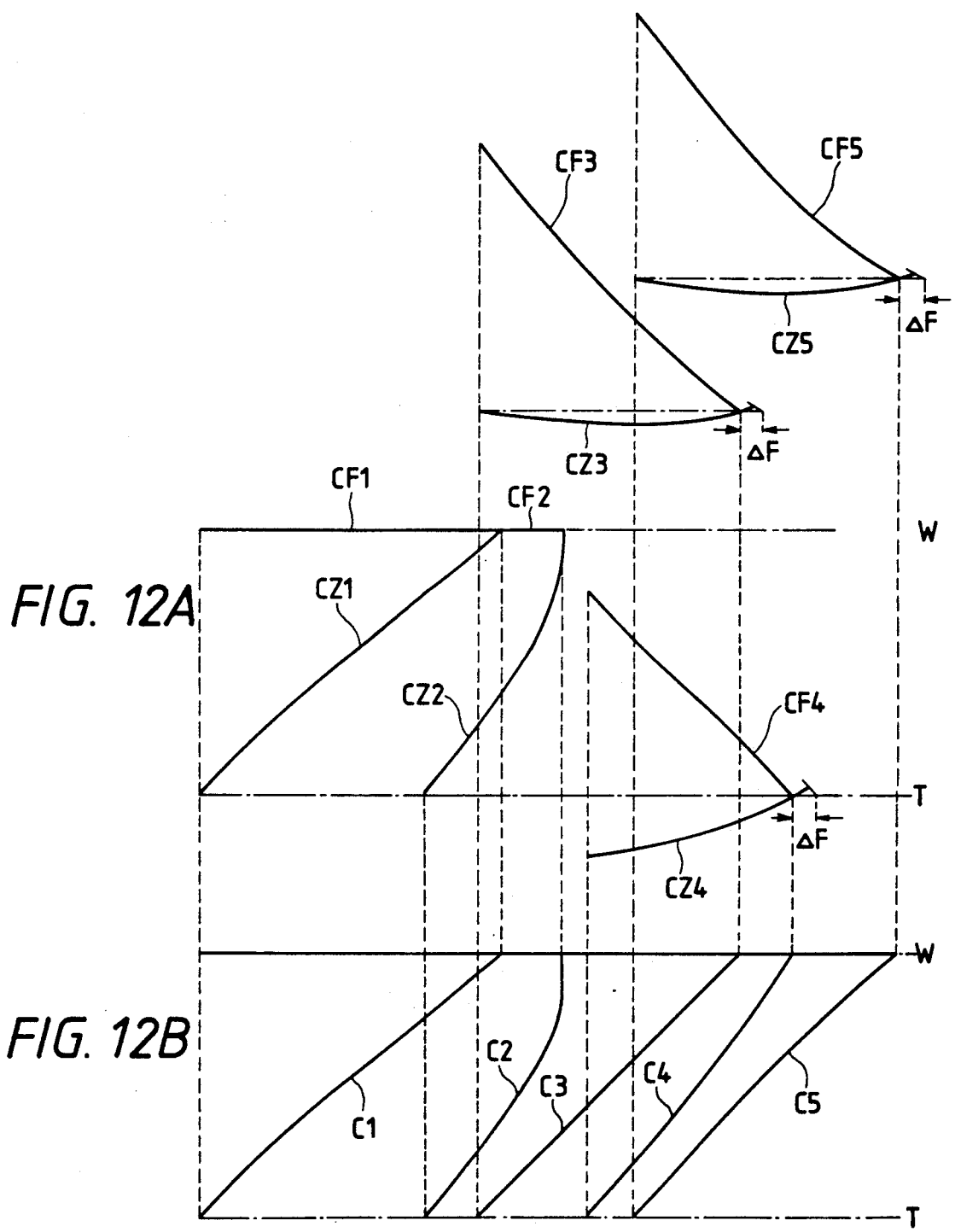
FIGS. 12A and 12B are developed diagrams showing orbits of zoom and focus cams in a focusing system of the zoom lens shown in FIGS. 12A and 12B, in which third to fifth lens units constitute an optical system for both zooming and focusing, before modification of the cam shape (FIG. 12A) and after modification thereof (FIG. 12B)
Figure 16A:
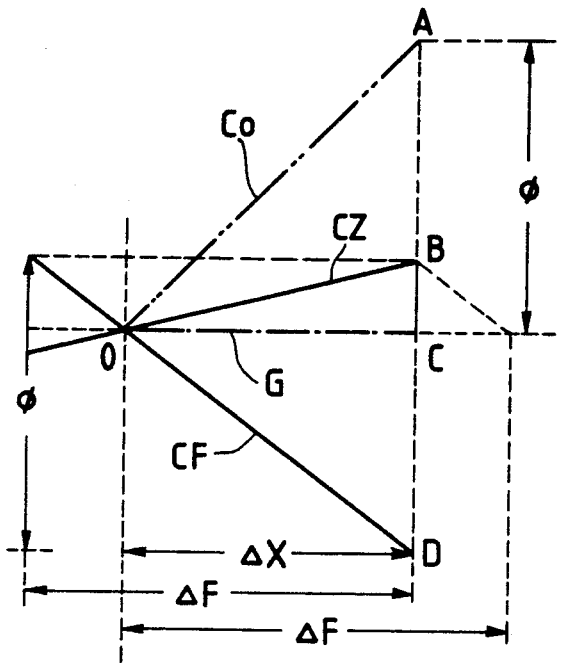
Figure 16B:
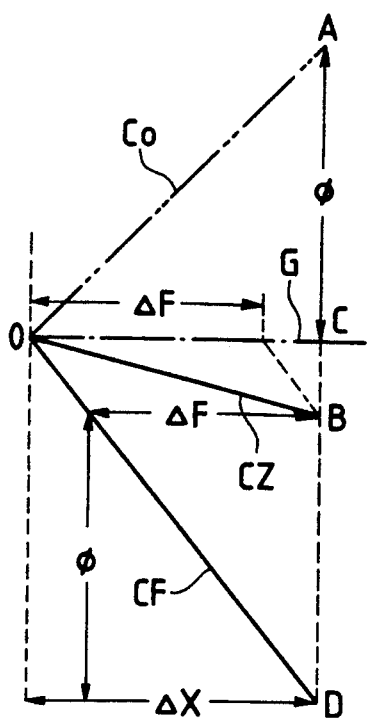
Figure 17A:
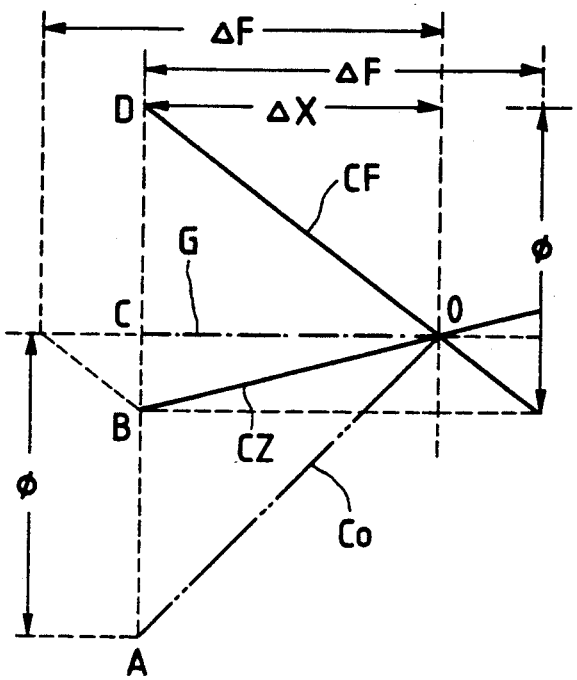
Figure 17B:
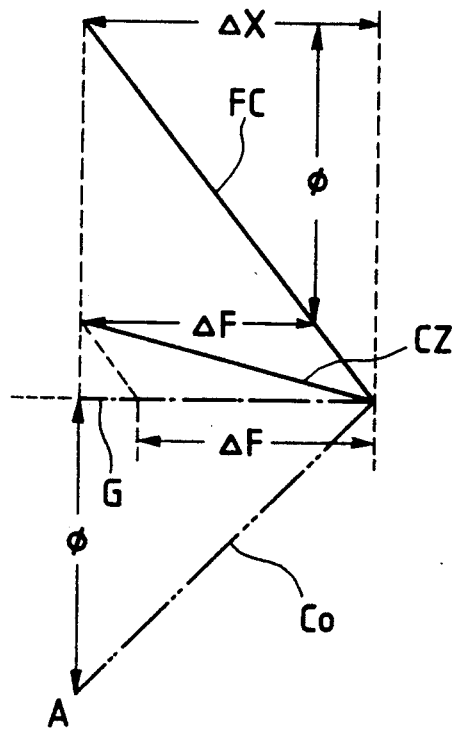
Figure 18A:
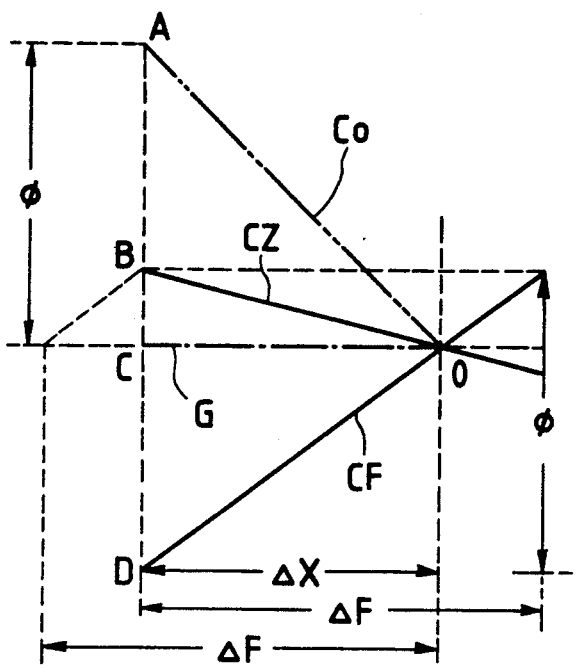
Figure 18B:
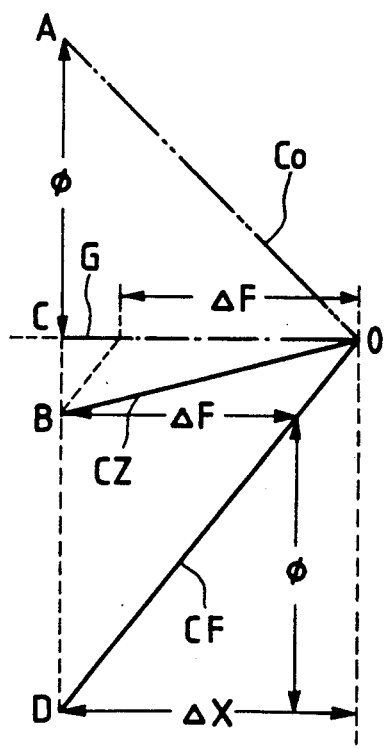
Figure 19A:
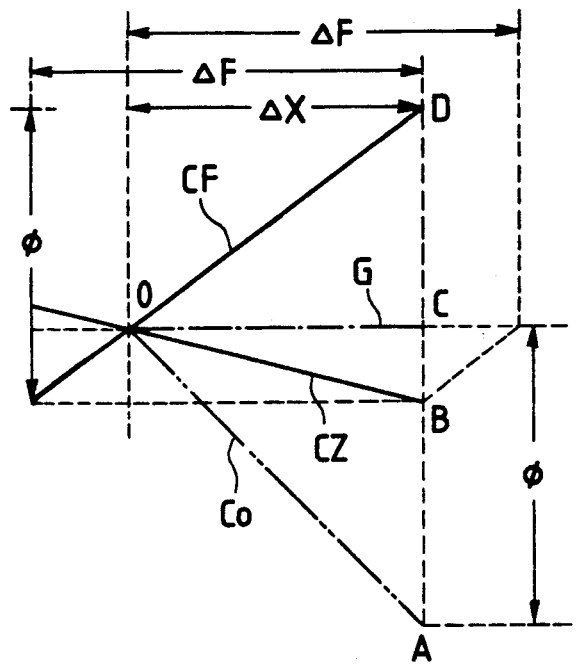
Figure 19B:
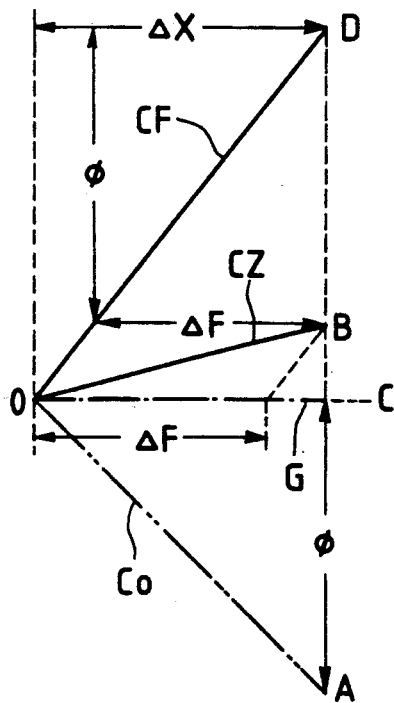
Figure 20A:
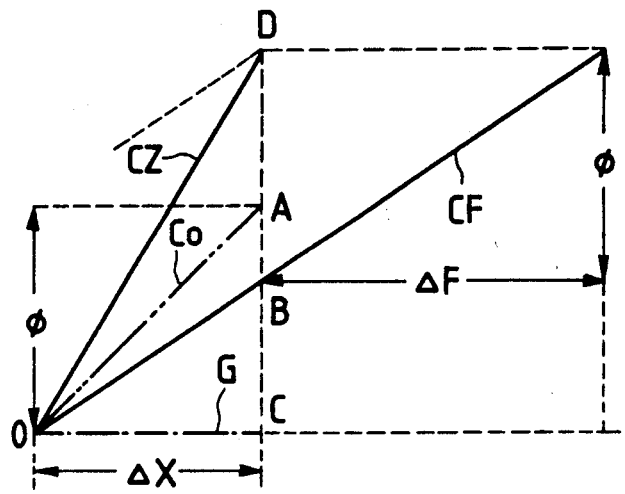
Figure 20B:
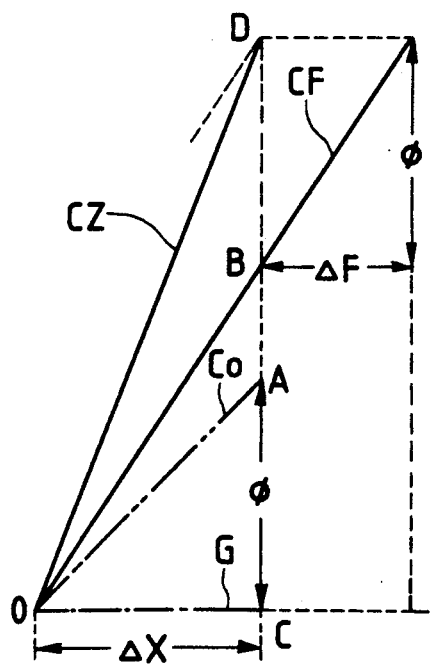
Figure 23A:
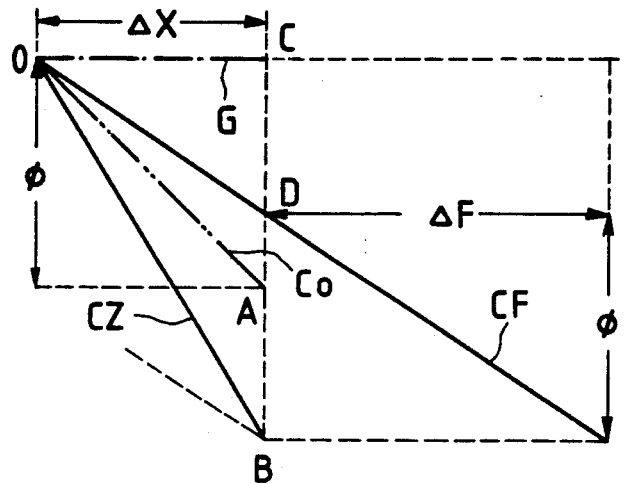
Figure 23B:
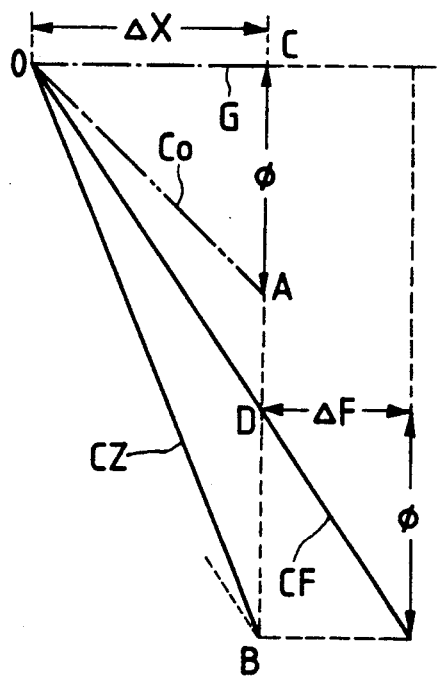

Table 13 shows the displacement $\Delta X$ in the optical axis direction and conversion value $\phi$ with respect to the $\phi$ direction in this zoom lens system when focusing is effected by causing displacement of third to fifth lens units G3 to G5 while causing a so-called floating to suppress close aberration variations and maintain high performance with object distance of 1.5 m. FIG. 12A shows orbits of displacement after conversion based on the conversion diagram of FIG. 3A with $\Delta F = -1.3731$ mm set for object distance of R=10 m for $\Delta X$ and $\phi$.

In the case of FIG. 12A, the orbits of the individual lens units are displaced by parallel displacement in the $\theta$ direction (vertical direction) lest the orbits after conversion should interfere with one another. By forming the individual lens units in the actual barrel such as to prevent interference in this way, correspondence to the orbits before conversion (FIG. 12B) can be obtained without fail. For zooming, the positions of the lens units on the optical axis are changed by causing relative displacement of focus and zoom cams CF and CZ in the $\theta$ direction, while focusing is effected by displacing focus cams CF by $\Delta F$ in the optical axis direction with the same object distance.

Table 14 shows, like Table 3, the extents $\Delta X$ (DX), $\Delta F$ (DF) of feed of the cams and lens units for focusing with each focal distance F and each object distance R as calculated from the orbits after conversion and displacement (BF) of the focal point when $\Delta X$ of relative displacement between cams CF and CZ is given.

It will be seen from Table 14 that the displacement BF of the focal point is small and sufficiently within the focal point depth.

It will be seen from the above that in this embodiment it is possible to set a fixed feed extent $\Delta F$ of focus cam CF even if the feed extent varies with the zooming state, object distance and individual focusing lens units, and the invention can be sufficiently applied to the commonly termed manual focus system.

Now, the application of the invention to a focusing system based on feeding of the entire zoom lens system will be described.

Figure 13A:
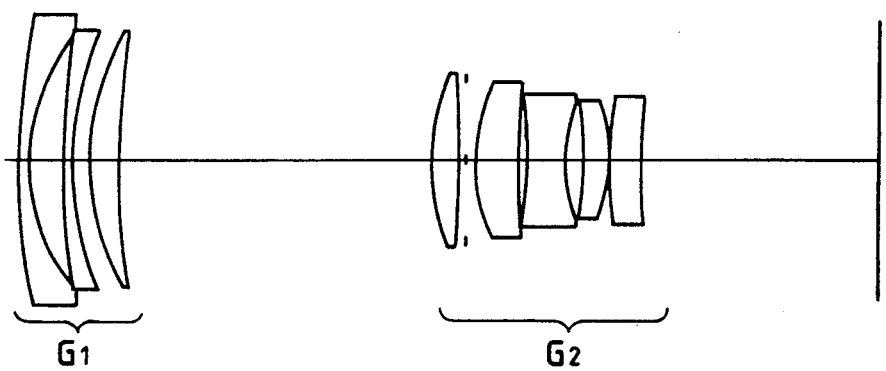
FIG. 13A is a schematic view showing a zoom lens having a two-lens-unit structure used for an embodiment of the invention.
Figure 13B:
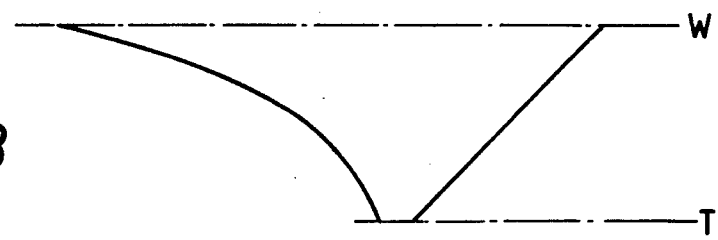
FIG. 13B is a diagram showing orbits of displacement of the individual lens units in the zoom lens for zooming.

FIG. 13A shows a zoom lens system having a two-lens-unit structure consisting of first lens unit G1 having negative refracting power and second lens unit G2 having positive refracting power, these lens units being arranged in the mentioned order from the object side and being displaced with respect to the image plane for zooming. Table 15 shows specifications (numerical data) of this two-lens-unit zoom lens system. FIG. 11B shows orbits of displacement of the lens units for zooming. The abscissa (optical axis direction) and ordinate ($\theta$ direction) are selected such that the orbit of displacement of second lens unit G2 is a straight line at an angle of 45° with respect to the optical axis.

Table 16 shows the displacement $\Delta X$ in the optical axis direction and the conversion value $\phi$ with respect to the $\theta$ direction in two-unit zoom lens system when focusing is performed by causing displacement of whole system with object distance R=1.5 m.

FIG. 14A shows orbits of displacement after conversion based on the converting operation shown in FIGS. 10 and 15 with the optical axis direction displacement $\Delta F$ for object distance of R=1.5 m set to $\Delta F=5.0$ mm with $\Delta X$ and $\phi$ shown in Table 16.

In the case of FIG. 14A, the orbits of displacement of the individual lens units are displaced by parallel displacement in the $\theta$ direction (vertical direction) lest the orbits of displacement of first and second lens units G1 and G2 after conversion should interfere with each other. By forming the individual lens units in the actual barrel such as to prevent interference in this way, correspondence to the orbits before conversion (FIG. 14B) can be obtained without fail, as noted before. Zooming is effected by displacing either focus cam CF or zoom cam CZ in the $\theta$ direction, while focusing is effected by displacing focus cam CF by the same extent $\Delta F$ in the optical axis direction irrespective of the zooming state with the same object distance.

Table 17, like Table 3, shows the extents $\Delta X$ (DX) and $\Delta F$ (DF) of feed of the lens units for focusing with each focal distance F and each object distance R as calculated from the orbits of displacement after conversion and displacement (BF) of the focal point when the relative displacement $\Delta X$ between cams CF and CZ is given. It will be seen from Table 17 that the displacement BF of the focal point is small and sufficiently within the focal point depth in every focusing state.

It will be seen from the above that the invention is applicable to the focusing system, in which the entire zoom lens system is fed, and thus can be sufficiently applied to the commonly termed manual focus system.

As has been shown, the invention is applicable to various zoom lens systems when various focusing systems are assumed, thus permitting manual focusing which could not have heretofore been attained.

Further, the invention is applicable substantially to any focusing system of any zoom lens system, in which a given lens unit is displaced except for lens units fixed to the image plane at the time of zooming and thus epochally permits manual focusing.

While the conversion relation has been described above in connection to FIGS. 3A, 3B, 10 and 15, various conversion relations are conceivable depending on the direction of displacement of the focusing lens units at the time of zooming and at the time of focusing, sign of $\Delta F$ and relation between $\Delta X$ and $\Delta F$. FIGS. 16A to 23B collectively show the conversion relation in all cases of the converting operation according to the invention. In these Figures, the direction of displacement of the focusing lens units at the time of zooming and at the time of focusing, sign of $\Delta F$ (positive on the object side) and relation between $\Delta X$ and $\Delta F$ are shown in symbolized form in upper portion of each Figure. Such symbolized showing is also provided in FIGS. 3A, 3B, 10 and 15. While in each conversion diagram all the orbits are shown as straight lines for the sake of simplicity, the orbits of displacement in the entire zooming range are non-linear as obvious from the orbits after conversion in each embodiment.

In FIGS. 16A to 23B, FIGS. 16A and 20A, FIGS. 16A and 20B, FIGS. 17A and 21A, FIGS. 17B and 21B, FIGS. 18A and 22A, FIGS. 18B and 22B, FIGS. 19A and 23A and FIGS. 19B and 23B are in correspondence relation to each other, and the paired diagrams can be substituted for by each other by changing the sign of $\Delta F$. In other words, according to the invention, when any focusing system is selected, there are two different kinds of conversion with different signs of $\Delta F$.

Figure 24A:
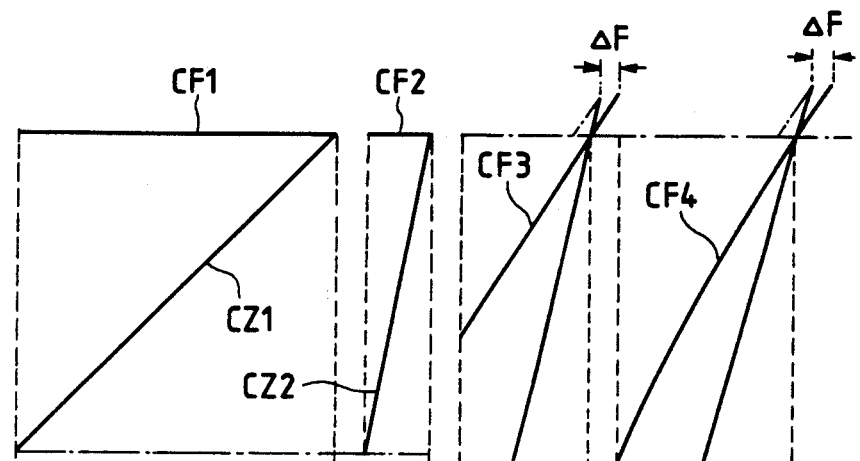
FIGS. 24A and 24B are developed views showing cam orbits of focus and zoom cams after orbit modification in a focusing system different from that shown in FIGS. 2A and 2B in the zoom lens shown in FIG. 1A.
Figure 24B:
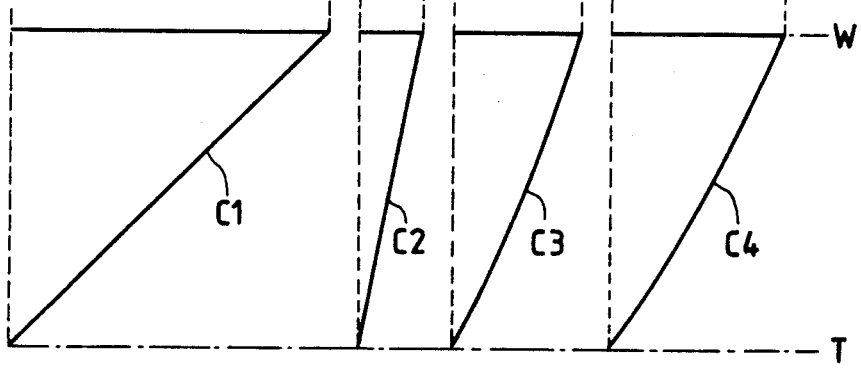
Figure 25:
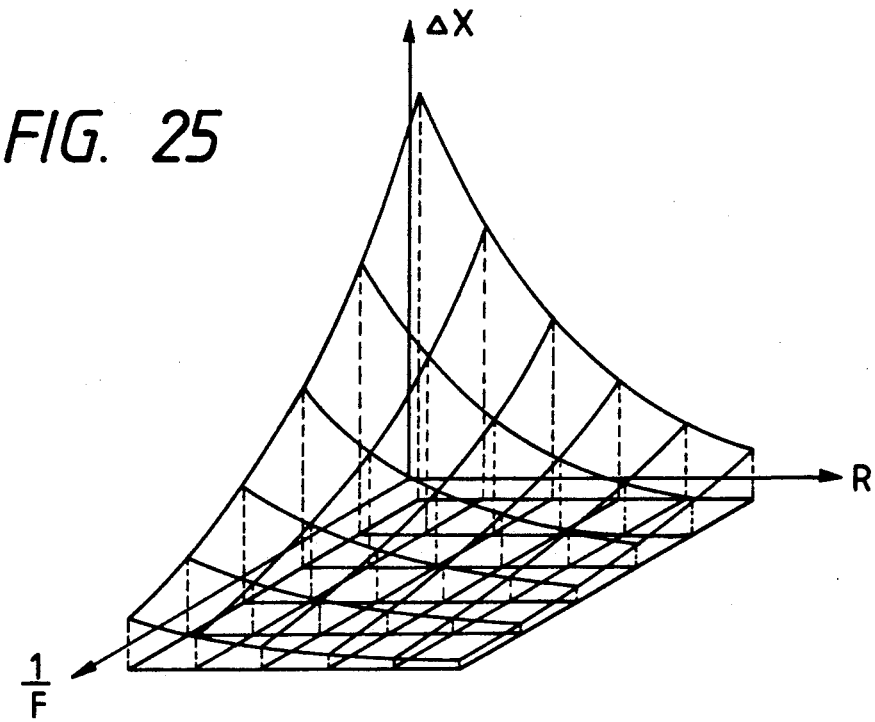
FIG. 25 is a three-dimensional diagram showing the relationship among displacement ΔX of focusing lens units in the optical axis direction, inverse 1/F to the focal distance and object distance R in usual focusing in zoom lens.

As a specific example, orbits of displacement after conversion corresponding to the orbits after conversion shown in FIG. 2A are shown in FIG. 24A. While FIG. 2A shows the orbits obtained by conversion of the orbits of displacement of the zoom lens system shown in Table 1 and FIG. 3A on the basis of the conversion diagrams of FIGS. 3A and 3B by using $\Delta X$ and $\phi$ in Table 2 and $F = -2.4$, FIG. 24A shows orbits obtained by conversion of the orbits of displacement of the zoom lens system shown in FIG. 1 on the basis of the conversion diagrams of FIGS. 20A and 20B (corresponding to FIGS. 16A and 16B) by using the values in Table 2 and $\Delta F = 2.9$.

Table 18 shows the extents $\Delta F$ and $\Delta X$ of feed for focusing with each focal distance and each object distance as calculated from the orbits of displacement after conversion shown in FIG. 24A and displacement of the focal point when $\Delta X$ is given. It will be seen from Table 18 with the corresponding other conversion the displacement of the focal point is sufficiently small and the invention is sufficiently applicable to the manual focusing. Where the angle of intersection between the focus and zoom cams after conversion is small and there are problems in the cam structure, only the angle may be changed without influencing the zooming or focusing by proportionally enlarging or contracting all the orbits after conversion in the $\theta$ direction. Alternatively, it is possible to set $\Delta F$ in advance by taking the intersection angle into considerations.

In the description so far the orbits of displacement of lens units are selected to be at 45° with respect to the optical axis in the conversion of $\Delta X$ to $\phi$. This is, however, is done so for the sole sake of convenience, and various modifications are possible in this connection.

While cam data after conversion shown in FIG. 2A are shown in Tables 4-(1) to 4-(3), cam data after conversion in different embodiments are shown in Tables 19-(1) to 24-(3).

Tables 19-(1) and 19-(2) show cam data after conversion corresponding to FIG. 7A (focus and zoom cams after conversion) and Table 9. Table 19-(1) shows cam data of first, second and fourth lens units G1, G2 and G4, and Table 19-(2) shows cam data of third lens G3.

Tables 20-(1) and 20-(2) show cam data after conversion corresponding to FIG. 8A (zoom and focus cams after conversion) and Table 10. Table 20-(1) shows cam data of first, third and fourth lens units G1, G3 and G4, and Table 20-(2) shows cam data of second lens unit G2.

Tables 21-(1) and 21-(2) show cam data after conversion corresponding to FIG. 9A (focus and zoom cams after conversion) and Table 11. Table 21-(1) shows cam data of first lens unit G1, and Table 21-(2) shows cam data of second to fourth lens units G2 to G4.

Table 22-(1) to 22-(4) show cam data after conversion corresponding to FIG. 12A (focus and zoom cams after conversion) and Table 14. Table 22-(1) shows cam data of first and second lens units G1 and G2, Table 22-(2) shows cam data of third lens unit G3, Table 22-(3) shows cam data of fourth lens unit G4, and Table 22-(4) shows cam data of fifth lens unit G5.

Table 23-(1) to 23-(2) show cam data after conversion corresponding to FIG. 14A (focus and zoom cams after conversion) and Table 17. Table 23-(1) shows cam data of first lens unit G1, and Table 23-(2) shows cam data of second lens unit G2.

Tables 24-(1) to 24-(3) show cam data corresponding to FIG. 24A (focus and zoom cams after conversion) and Table 18. Table 24-(1) shows cam data of first and second lens units G1 and G2, Table 24-(2) shows cam data of third lens unit G3, and Table 24-(3) shows cam data of fourth lens unit G4.

The above tables are of the same formula as Tables 4-(1) to 4-(3) noted above, and they can be consulted with in the same way as with Table 18.

TABLE 12

| f = 28.8–146.0 FN = 4.1–5.7 | | | | | |
|---|---|---|---|---|---|
| r 1 = 243.846 | d 1 = 1.900 | n 1 = 1.86074 | v 1 = 23.0 | L 1 | G₁ |
| r 2 = 64.913 | d 2 = 7.900 | n 2 = 1.61720 | v 2 = 54.0 | L 2 | |
| r 3 = −966.969 | d 3 = .100 | | | | |
| r 4 = 48.137 | d 4 = 5.400 | n 3 = 1.72000 | v 3 = 50.3 | L 3 | |
| r 5 = 160.443 | d 5 = .742 | | | | |
| r 6 = 53.009 | d 6 = 1.200 | n 4 = 1.78797 | v 4 = 47.5 | L 4 | G₂ |
| r 7 = 16.902 | d 7 = 7.800 | | | | |
| r 8 = −67.538 | d 8 = 1.100 | n 5 = 1.78797 | v 5 = 47.5 | L 5 | |
| r 9 = 28.182 | d 9 = 2.300 | n 6 = 1.86074 | v 6 = 23.0 | L 6 | |
| r10 = 51.522 | d10 = 2.300 | | | | |
| r11 = 31.688 | d11 = 4.000 | n 7 = 1.78472 | v 7 = 25.8 | L 7 | |
| r12 = −80.446 | d12 = 1.000 | | | | |
| r13 = −39.394 | d13 = 1.000 | n 8 = 1.77279 | v 8 = 49.4 | L 8 | |
| r14 = 73.669 | d14 = 23.463 | | | | |
| r15 = 121.643 | d15 = 3.600 | n 9 = 1.48749 | v 9 = 70.2 | L 9 | G₃ |
| r16 = −61.082 | d16 = .100 | | | | |
| r17 = 58.219 | d17 = 4.000 | n10 = 1.48749 | v10 = 70.2 | L10 | |
| r18 = −244.932 | d18 = 1.000 | | | | |
| r19 = .000 | d19 = 1.200 | | | | |
| r20 = 30.508 | d20 = 1.300 | n11 = 1.80458 | v11 = 25.5 | L11 | |
| r21 = 16.141 | d21 = 8.000 | n12 = 1.62280 | v12 = 57.0 | L12 | |
| r22 = −213.435 | d22 = 1.977 | | | | |
| r23 = −66.796 | d23 = 1.200 | n13 = 1.79668 | v13 = 45.4 | L13 | G₄ |
| r24 = 30.075 | d24 = 1.200 | | | | |
| r25 = 30.186 | d25 = 2.800 | n14 = 1.86074 | v14 = 23.0 | L14 | |
| r26 = 56.097 | d26 = 12.160 | | | | |
| r27 = 178.339 | d27 = 6.800 | n15 = 1.48749 | v15 = 70.2 | L15 | G₅ |
| r28 = −24.410 | d28 = .100 | | | | |
| r29 = 47.492 | d29 = 4.800 | n16 = 1.51680 | v16 = 64.1 | L16 | |
| r30 = −65.021 | d30 = 2.200 | | | | |
| r31 = −26.793 | d31 = 2.000 | n17 = 1.90265 | v17 = 35.8 | L17 | |
| r32 = −233.439 | d32 = 39.920 | | | | |

| | pos(1) | pos(2) | pos(3) | pos(4) | pos(5) | pos(6) |
|---|---|---|---|---|---|---|
| f&b | 28.800 | 35.000 | 50.000 | 70.000 | 105.000 | 146.001 |
| d 0 | .000 | .000 | .000 | .000 | .000 | .000 |
| d 5 | .742 | 4.841 | 12.442 | 19.297 | 25.954 | 29.104 |
| d14 | 23.463 | 19.481 | 13.642 | 9.322 | 4.826 | 1.697 |
| d22 | 1.977 | 3.108 | 5.575 | 7.618 | 10.265 | 12.057 |
| d26 | 12.160 | 10.333 | 7.339 | 5.237 | 3.368 | 2.092 |
| d32 | 39.920 | 43.512 | 49.911 | 57.320 | 69.016 | 85.756 |

TABLE 13

| ΔX F | (1) | (2) | (3) | (4) | (5) | R(mm) |
|---|---|---|---|---|---|---|
| 28.8000 | .0000 | .0000 | −.7408 | −.9630 | −.9630 | 1500.00 |
| 35.0000 | .0000 | .0000 | −.8888 | −.9776 | −.9776 | 1500.00 |
| 50.0000 | .0000 | .0000 | −1.2195 | −.9756 | −1.1585 | 1500.00 |
| 70.0000 | .0000 | .0000 | −1.3265 | −.9285 | −1.1938 | 1500.00 |
| 105.0000 | .0000 | .0000 | −1.4943 | −1.0460 | −1.4943 | 1500.00 |
| 146.0000 | .0000 | .0000 | −1.5242 | −1.2193 | −1.6004 | 1500.00 |

| Φ F | (1) | (2) | (3) | (4) | (5) | R(mm) |
|---|---|---|---|---|---|---|
| 28.8000 | .0000 | .0000 | −.7408 | −1.5626 | −.7629 | 1500.00 |
| 35.0000 | .0000 | .0000 | −.8888 | −1.6202 | −.8077 | 1500.00 |
| 50.0000 | .0000 | .0000 | −1.2195 | −1.6328 | −1.1189 | 1500.00 |
| 70.0000 | .0000 | .0000 | −1.3265 | −1.1488 | −1.2101 | 1500.00 |
| 105.0000 | .0000 | .0000 | −1.4943 | −1.3930 | −1.6187 | 1500.00 |
| 146.0000 | .0000 | .0000 | −1.5242 | −1.3217 | −1.6234 | 1500.00 |

TABLE 14

| | R | 1000.00 | 1500.00 | 2000.00 | 3000.00 | 5000.00 | 7000.00 |
|---|---|---|---|---|---|---|---|
| F 28.8000 | BF | .0401 | .0001 | −.0087 | −.0114 | −.0094 | −.0074 |
| F 35.0000 | BF | .0172 | .0000 | −.0041 | −.0053 | −.0040 | −.0030 |
| F 50.0000 | BF | .0963 | −.0001 | −.0240 | −.0318 | −.0266 | −.0213 |
| F 70.0000 | BF | .0827 | .0001 | −.0205 | −.0275 | −.0231 | −.0185 |
| F 105.0000 | BF | .0927 | −.0001 | −.0233 | −.0312 | −.0261 | −.0209 |
| F 146.0000 | BF | .0002 | −.0001 | .0001 | .0000 | .0001 | .0000 |
| | Focus DF | −2.1096 | −1.3731 | −1.0178 | −.6707 | −.3987 | −.2837 |
| | | (1) | (2) | (3) | (4) | (5) | |
| F 28.8000 | DX | .0000 | .0000 | −1.1359 | −1.4684 | −1.4763 | R 1000.00 |
| F 35.0000 | DX | .0000 | .0000 | −1.3571 | −1.5086 | −1.5068 | R 1000.00 |
| F 50.0000 | DX | .0000 | .0000 | −1.8544 | −1.4823 | −1.7680 | R 1000.00 |
| F 70.0000 | DX | .0000 | .0000 | −2.0343 | −1.4229 | −1.8330 | R 1000.00 |

TABLE 14-continued

| | | | | | | |
|---|---|---|---|---|---|---|
| F 105.0000 DX | .0000 | .0000 | −2.2903 | −1.5875 | −2.2799 | R 1000.00 |
| F 146.0000 DX | .0000 | .0000 | −2.3395 | −1.8699 | −2.4560 | R 1000.00 |
| F 28.8000 DX | .0000 | .0000 | −.7408 | −.9630 | −.9630 | R 1500.00 |
| F 35.0000 DX | .0000 | .0000 | −.8888 | −.9776 | −.9776 | R 1500.00 |
| F 50.0000 DX | .0000 | .0000 | −1.2195 | −.9756 | −1.1585 | R 1500.00 |
| F 70.0000 DX | .0000 | .0000 | −1.3265 | −.9285 | −1.1938 | R 1500.00 |
| F 105.0000 DX | .0000 | .0000 | −1.4943 | −1.0460 | −1.4943 | R 1500.00 |
| F 146.0000 DX | .0000 | .0000 | −1.5242 | −1.2193 | −1.6004 | R 1500.00 |
| F 28.8000 DX | .0000 | .0000 | −.5499 | −.7162 | −.7146 | R 2000.00 |
| F 35.0000 DX | .0000 | .0000 | −.6606 | −.7231 | −.7234 | R 2000.00 |
| F 50.0000 DX | .0000 | .0000 | −.9083 | −.7273 | −.8615 | R 2000.00 |
| F 70.0000 DX | .0000 | .0000 | −.9842 | −.6894 | −.8855 | R 2000.00 |
| F 105.0000 DX | .0000 | .0000 | −1.1088 | −.7804 | −1.1114 | R 2000.00 |
| F 146.0000 DX | .0000 | .0000 | −1.1303 | −.9046 | −1.1869 | R 2000.00 |
| F 28.8000 DX | .0000 | .0000 | −.3629 | −.4735 | −.4714 | R 3000.00 |
| F 35.0000 DX | .0000 | .0000 | −.4364 | −.4754 | −.4760 | R 3000.00 |
| F 50.0000 DX | .0000 | .0000 | −.6012 | −.4820 | −.5694 | R 3000.00 |
| F 70.0000 DX | .0000 | .0000 | −.6493 | −.4552 | −.5840 | R 3000.00 |
| F 105.0000 DX | .0000 | .0000 | −.7314 | −.5178 | −.7348 | R 3000.00 |
| F 146.0000 DX | .0000 | .0000 | −.7452 | −.5966 | −.7825 | R 3000.00 |
| F 28.8000 DX | .0000 | .0000 | −.2160 | −.2822 | −.2805 | R 5000.00 |
| F 35.0000 DX | .0000 | .0000 | −.2599 | −.2820 | −.2827 | R 5000.00 |
| F 50.0000 DX | .0000 | .0000 | −.3586 | −.2878 | −.3393 | R 5000.00 |
| F 70.0000 DX | .0000 | .0000 | −.3864 | −.2711 | −.3475 | R 5000.00 |
| F 105.0000 DX | .0000 | .0000 | −.4351 | −.3095 | −.4380 | R 5000.00 |
| F 146.0000 DX | .0000 | .0000 | −.4432 | −.3549 | −.4654 | R 5000.00 |
| F 28.8000 DX | .0000 | .0000 | −.1538 | −.2010 | −.1996 | R 7000.00 |
| F 35.0000 DX | .0000 | .0000 | −.1851 | −.2004 | −.2010 | R 7000.00 |
| F 50.0000 DX | .0000 | .0000 | −.2555 | −.2052 | −.2417 | R 7000.00 |
| F 70.0000 DX | .0000 | .0000 | −.2750 | −.1930 | −.2474 | R 7000.00 |
| F 105.0000 DX | .0000 | .0000 | −.3097 | −.2208 | −.3120 | R 7000.00 |
| F 146.0000 DX | .0000 | .0000 | −.3154 | −.2526 | −.3312 | R 7000.00 |

TABLE 15 f = 37.0–70.0  FN = 3.5

| | | | | |
|---|---|---|---|---|
| r 1 = 110.000 | d 1 = 1.400 | n 1 = 1.80454 | v 1 = 39.6 | L 1 G$_1$ |
| r 2 = 30.624 | d 2 = 5.550 | | | |
| r 3 = 117.186 | d 3 = 1.500 | n 2 = 1.74400 | v 2 = 45.1 | L 2 |
| r 4 = 50.320 | d 4 = 2.600 | | | |
| r 5 = 38.740 | d 5 = 4.700 | n 3 = 1.79504 | v 3 = 28.6 | L 3 |
| r 6 = 120.021 | d 6 = 49.751 | | | |
| r 7 = 33.490 | d 7 = 4.250 | n 4 = 1.62041 | v 4 = 60.3 | L 4 G$_2$ |
| r 8 = −161.519 | d 8 = 1.250 | | | |
| r 9 = .000 | d 9 = 1.200 | | | |
| r10 = 27.120 | d10 = 7.100 | n 5 = 1.62041 | v 5 = 60.3 | L 5 |
| r11 = 133.032 | d11 = 1.150 | | | |
| r12 = −70.850 | d12 = 5.750 | n 6 = 1.79504 | v 6 = 28.6 | L 6 |
| r13 = 22.360 | d13 = 3.200 | | | |
| r14 = −50.320 | d14 = 3.950 | n 7 = 1.79631 | v 7 = 41.0 | L 7 |
| r15 = −27.761 | d15 = .100 | | | |
| r16 = 63.800 | d16 = 5.000 | n 8 = 1.79631 | v 8 = 41.0 | L 8 |
| r17 = 125.322 | d17 = 40.119 | | | |

| | pos(1) | pos(2) | pos(3) |
|---|---|---|---|
| f&b | 37.000 | 50.000 | 70.000 |
| d 0 | .000 | .000 | .000 |
| d 6 | 49.751 | 22.877 | 1.025 |
| d17 | 40.119 | 47.118 | 57.886 |

TABLE 16

| ΔX F | (1) | (2) | R(mm) |
|---|---|---|---|
| 37.0000 | .9992 | .9992 | 1500.00 |
| 50.0000 | 1.8304 | 1.8304 | 1500.00 |
| 70.0000 | 3.6573 | 3.6573 | 1500.00 |

TABLE 16-continued

| Φ F | (1) | (2) | R(mm) |
|---|---|---|---|
| 37.0000 | −.2696 | .9992 | 1500.00 |
| 50.0000 | −.9638 | 1.8304 | 1500.00 |
| 70.0000 | −5.3164 | 3.6573 | 1500.00 |

TABLE 17

| R | 1000.00 | 1500.00 | 2000.00 | 3000.00 | 5000.00 | 7000.00 |
|---|---|---|---|---|---|---|
| F 37.0000 BF | .0746 | .0000 | −.0180 | −.0166 | −.0060 | −.0020 |
| F 50.0000 BF | −.0358 | .0000 | .0120 | .0226 | .0274 | .0248 |
| F 70.0000 BF | .0000 | .0000 | .0000 | .0000 | .0000 | .0000 |
| FOCUS DF | 7.8424 (1) | 5.0000 (2) | 3.6432 | 2.3348 | 1.3283 | .9224 |
| F 37.0000 DX | 1.5993 | 1.4452 | R 1000.00 | | | |

TABLE 17-continued

| | | | | | |
|---|---|---|---|---|---|
| F 50.0000 | DX | 3.1153 | 2.7945 | R | 1000.00 |
| F 70.0000 | DX | 5.8612 | 5.5543 | R | 1000.00 |
| F 37.0000 | DX | .9992 | .9992 | R | 1500.00 |
| F 50.0000 | DX | 1.8304 | 1.8304 | R | 1500.00 |
| F 70.0000 | DX | 3.6573 | 3.6573 | R | 1500.00 |
| F 37.0000 | DX | .7199 | .7637 | R | 2000.00 |
| F 50.0000 | DX | 1.2719 | 1.3585 | R | 2000.00 |
| F 70.0000 | DX | 2.6435 | 2.7392 | R | 2000.00 |
| F 37.0000 | DX | .4543 | .5089 | R | 3000.00 |
| F 50.0000 | DX | .7834 | .8805 | R | 3000.00 |
| F 70.0000 | DX | 1.7055 | 1.7871 | R | 3000.00 |
| F 37.0000 | DX | .2545 | .2971 | R | 5000.00 |
| F 50.0000 | DX | .4354 | .5048 | R | 5000.00 |
| F 70.0000 | DX | 1.0117 | 1.0143 | R | 5000.00 |
| F 37.0000 | DX | .1755 | .2082 | R | 7000.00 |
| F 50.0000 | DX | .3003 | .3515 | R | 7000.00 |
| F 70.0000 | DX | .7226 | .7008 | R | 7000.00 |

TABLE 18

| | R | 850.00 | 1000.00 | 1500.00 | 2000.00 | 3000.00 | 5000.00 |
|---|---|---|---|---|---|---|---|
| F 36.0000 | BF | −.0309 | .0001 | .0493 | .0364 | .0226 | .0181 |
| F 50.0000 | BF | −.0885 | .0001 | .0593 | .0620 | .0487 | .0284 |
| F 60.0000 | BF | −.0632 | .0000 | .0468 | .0508 | .0379 | .0225 |
| F 70.0000 | BF | −.0750 | −.0061 | .0578 | .0537 | .0318 | .0136 |
| F 85.0000 | BF | −.0302 | −.0001 | −.0018 | −.0203 | −.0300 | −.0276 |
| F 102.0000 | BF | −.0001 | .0001 | .0000 | .0000 | .0000 | .0000 |
| FOCUS | DF | 3.4791 (1) | 2.9000 (2) | 1.8622 (3) | 1.3740 (4) | .9051 | .5391 |
| F 36.0000 | DX | .0000 | .0000 | −2.3492 | −3.3231 | R | 850.00 |
| F 50.0000 | DX | .0000 | .0000 | −2.0284 | −2.8978 | R | 850.00 |
| F 60.0000 | DX | .0000 | .0000 | −2.0892 | −3.0148 | R | 850.00 |
| F 70.0000 | DX | .0000 | .0000 | −2.2225 | −3.2353 | R | 850.00 |
| F 85.0000 | DX | .0000 | .0000 | −2.4321 | −3.5642 | R | 850.00 |
| F 102.0000 | DX | .0000 | .0000 | −2.7610 | −4.2297 | R | 850.00 |
| F 36.0000 | DX | .0000 | .0000 | −1.9057 | −2.7253 | R | 1000.00 |
| F 50.0000 | DX | .0000 | .0000 | −1.6563 | −2.4017 | R | 1000.00 |
| F 60.0000 | DX | .0000 | .0000 | −1.7319 | −2.5286 | R | 1000.00 |
| F 70.0000 | DX | .0000 | .0000 | −1.8453 | −2.7030 | R | 1000.00 |
| F 85.0000 | DX | .0000 | .0000 | −2.0477 | −3.0306 | R | 1000.00 |
| F 102.0000 | DX | .0000 | .0000 | −2.3474 | −3.6620 | R | 1000.00 |
| F 36.0000 | DX | .0000 | .0000 | −1.1425 | −1.6643 | R | 1500.00 |
| F 50.0000 | DX | .0000 | .0000 | −1.0415 | −1.5414 | R | 1500.00 |
| F 60.0000 | DX | .0000 | .0000 | −1.1048 | −1.6323 | R | 1500.00 |
| F 70.0000 | DX | .0000 | .0000 | −1.1827 | −1.7529 | R | 1500.00 |
| F 85.0000 | DX | .0000 | .0000 | −1.3546 | −2.0525 | R | 1500.00 |
| F 102.0000 | DX | .0000 | .0000 | −1.5635 | −2.5181 | R | 1500.00 |
| F 36.0000 | DX | .0000 | .0000 | −.8316 | −1.2141 | R | 2000.00 |
| F 50.0000 | DX | .0000 | .0000 | −.7626 | −1.1407 | R | 2000.00 |
| F 60.0000 | DX | .0000 | .0000 | −.8116 | −1.2053 | R | 2000.00 |
| F 70.0000 | DX | .0000 | .0000 | −.8747 | −1.3028 | R | 2000.00 |
| F 85.0000 | DX | .0000 | .0000 | −1.0181 | −1.5634 | R | 2000.00 |
| F 102.0000 | DX | .0000 | .0000 | −1.1714 | −1.9144 | R | 2000.00 |
| F 36.0000 | DX | .0000 | .0000 | −.5420 | −.7938 | R | 3000.00 |
| F 50.0000 | DX | .0000 | .0000 | −.4998 | −.7562 | R | 3000.00 |
| F 60.0000 | DX | .0000 | .0000 | −.5326 | −.7941 | R | 3000.00 |
| F 70.0000 | DX | .0000 | .0000 | −.5788 | −.8648 | R | 3000.00 |
| F 85.0000 | DX | .0000 | .0000 | −.6825 | −1.0674 | R | 3000.00 |
| F 102.0000 | DX | .0000 | .0000 | −.7795 | −1.2911 | R | 3000.00 |
| F 36.0000 | DX | .0000 | .0000 | −.3168 | −.4684 | R | 5000.00 |
| F 50.0000 | DX | .0000 | .0000 | −.2972 | −.4515 | R | 5000.00 |
| F 60.0000 | DX | .0000 | .0000 | −.3167 | −.4737 | R | 5000.00 |
| F 70.0000 | DX | .0000 | .0000 | −.3465 | −.5192 | R | 5000.00 |
| F 85.0000 | DX | .0000 | .0000 | −.4118 | −.6537 | R | 5000.00 |
| F 102.0000 | DX | .0000 | .0000 | −.4667 | −.7797 | R | 5000.00 |

TABLE 19-(1)

| First lens unit | | | | |
|---|---|---|---|---|
| Focus cam | | Zoom cam | | |
| φf(1) | Xf(1) | φz(1) | Xz(1) | F |
| .0000 | .0000 | .0000 | .0000 | 36.0000 |
| .0000 | 13.9192 | 13.9192 | 13.9192 | 50.0000 |
| .0000 | 21.5868 | 21.5868 | 21.5868 | 60.0000 |
| .0000 | 27.9017 | 27.9017 | 27.9017 | 70.0000 |
| .0000 | 35.7012 | 35.7012 | 35.7012 | 85.0000 |
| .0000 | 42.9236 | 42.9236 | 42.9236 | 102.0000 |

TABLE 19-(1)-continued

| Second lens unit | | | | |
|---|---|---|---|---|
| Focus cam | | Zoom cam | | |
| φf(2) | Xf(2) | φz(2) | Xz(2) | F |
| .0000 | .0000 | .0000 | .0000 | 36.0000 |
| .0000 | 1.3475 | 13.9192 | 1.3475 | 50.0000 |
| .0000 | 2.5902 | 21.5868 | 2.5902 | 60.000 |
| .0000 | 3.9244 | 27.9017 | 3.9244 | 70.0000 |
| .0000 | 5.9618 | 35.7012 | 5.9618 | 85.0000 |
| .0000 | 8.1540 | 42.9236 | 8.1540 | 102.0000 |

TABLE 19-(1)-continued

| Focus cam | Fourth lens unit | | | |
|---|---|---|---|---|
| | | Zoom cam | | |
| f(4) | Xf(4) | φx(4) | Xz(4) | F |
| .0000 | .0000 | .0000 | .0000 | 36.0000 |
| .0000 | 6.8483 | 13.9192 | 6.8483 | 50.0000 |
| .0000 | 10.7930 | 21.5868 | 10.7930 | 60.0000 |
| .0000 | 14.3255 | 27.9017 | 14.3255 | 70.0000 |
| .0000 | 19.0289 | 35.7012 | 19.0289 | 85.0000 |
| .0000 | 23.6071 | 42.9236 | 23.6071 | 102.0000 |

TABLE 19 (2)

| Focus cam | | Zoom cam | | | |
|---|---|---|---|---|---|
| φ f (3) | X f (3) | φ z (3) | X z (3) | F | R |
| .0000 | .0000 | .0000 | .0000 | 36.0000 | ∞ |
| −10.2898 | 4.6186 | 3.6295 | 4.6186 | 50.0000 | ∞ |
| −17.6413 | 7.4782 | 3.9455 | 7.4782 | 60.0000 | ∞ |
| −24.8404 | 10.1206 | 3.0614 | 10.1206 | 70.0000 | ∞ |
| −35.5025 | 13.7451 | .1987 | 13.7451 | 85.0000 | ∞ |
| −47.6941 | 17.3820 | −4.7705 | 17.3820 | 102.0000 | ∞ |
| −.1377 | .0712 | −.1377 | −.1189 | 36.0000 | 5000.00 |
| −10.3500 | 4.6439 | 3.5692 | 4.4538 | 50.0000 | 5000.00 |
| −17.6153 | 7.4694 | 3.9715 | 7.2793 | 60.0000 | 5000.00 |
| −24.7197 | 10.0784 | 3.1820 | 9.8883 | 70.0000 | 5000.00 |
| −35.1979 | 13.6483 | .5033 | 13.4582 | 85.0000 | 5000.00 |
| −47.1320 | 17.2262 | −4.2083 | 17.0361 | 102.0000 | 5000.00 |
| −.2344 | .1201 | −.2344 | −.1996 | 36.0000 | 3000.00 |
| −10.3952 | 4.6622 | 3.5240 | 4.3424 | 50.0000 | 3000.00 |
| −17.6032 | 7.4648 | 3.9836 | 7.1450 | 60.0000 | 3000.00 |
| −24.6444 | 10.0514 | 3.2543 | 9.7316 | 70.0000 | 3000.00 |
| −35.0035 | 13.5857 | .6977 | 13.2659 | 85.0000 | 3000.00 |
| −46.7689 | 17.1244 | −3.8452 | 16.8046 | 102.0000 | 3000.00 |
| −.3586 | .1828 | −.3586 | −.3021 | 36.0000 | 2000.00 |
| −10.4556 | 4.6865 | 3.4636 | 4.2016 | 50.0000 | 2000.00 |
| −17.5922 | 7.4607 | 3.9946 | 6.9758 | 60.0000 | 2000.00 |
| −24.5545 | 10.0192 | 3.3473 | 9.5343 | 70.0000 | 2000.00 |
| −34.7687 | 13.5099 | .9325 | 13.0250 | 85.0000 | 2000.00 |
| −46.3246 | 16.9994 | −3.4010 | 16.5145 | 102.0000 | 2000.00 |
| −.4864 | .2469 | −.4864 | −.4061 | 36.0000 | 1500.00 |
| −10.5202 | 4.7126 | 3.3990 | 4.0597 | 50.0000 | 1500.00 |
| −17.5860 | 7.4583 | 4.0008 | 6.8054 | 60.0000 | 1500.00 |
| −24.4695 | 9.9888 | 3.4323 | 9.3358 | 70.0000 | 1500.00 |
| −34.5432 | 13.4369 | 1.1580 | 12.7839 | 85.0000 | 1500.00 |
| −45.8899 | 16.8762 | −2.9663 | 16.2233 | 102.0000 | 1500.00 |
| −.7523 | .3798 | −.7523 | −.6202 | 36.0000 | 1000.00 |
| −10.6636 | 4.7704 | 3.2557 | 3.7704 | 50.0000 | 1000.00 |
| −17.5886 | 7.4593 | 3.9982 | 6.4593 | 60.0000 | 1000.00 |
| −24.3143 | 9.9331 | 3.5875 | 8.9331 | 70.0000 | 1000.00 |
| −34.1170 | 13.2984 | 1.5842 | 12.2983 | 85.0000 | 1000.00 |
| −45.0541 | 16.6377 | −2.1305 | 15.6377 | 102.0000 | 1000.00 |
| −.8984 | .4526 | −.8984 | −.7374 | 36.0000 | 850.00 |
| −10.7475 | 4.8041 | 3.1717 | 3.6141 | 50.0000 | 850.00 |
| −17.5984 | 7.4630 | 3.9884 | 6.2730 | 60.0000 | 850.00 |
| −24.2405 | 9.9066 | 3.6613 | 8.7166 | 70.0000 | 850.00 |
| −33.9043 | 13.2290 | 1.7969 | 12.0390 | 85.0000 | 850.00 |
| −44.6304 | 16.5160 | −1.7067 | 15.3260 | 102.0000 | 850.00 |

TABLE 20 (1)

| | Focus cam | | Zoom cam | | |
|---|---|---|---|---|---|
| | φ f (1) | X f (1) | φ z (1) | X z (1) | F |
| First lens unit | .0000 | .0000 | .0000 | .0000 | 36.0000 |
| | .0000 | 13.9192 | 13.9192 | 13.9192 | 50.0000 |
| | .0000 | 21.5868 | 21.5868 | 21.5868 | 60.0000 |
| | .0000 | 27.9051 | 27.9051 | 27.9051 | 70.0000 |
| | .0000 | 35.7011 | 35.7011 | 35.7011 | 85.0000 |
| | .0000 | 42.9236 | 42.9236 | 42.9236 | 102.0000 |
| | φ f (3) | X f (3) | φ z (3) | X z (3) | F |
| Third lens unit | .0000 | .0000 | .0000 | .0000 | 36.0000 |
| | .0000 | 4.6185 | 13.9192 | 4.6185 | 50.0000 |
| | .0000 | 7.4782 | 21.5868 | 7.4782 | 60.0000 |
| | .0000 | 10.1259 | 27.9051 | 10.1259 | 70.0000 |
| | .0000 | 13.7450 | 35.7011 | 13.7450 | 85.0000 |
| | .0000 | 17.3819 | 42.9236 | 17.3819 | 102.0000 |
| | φ f (4) | X f (4) | φ z (4) | X z (4) | F |

TABLE 20 (1)-continued

| | Focus cam | | Zoom cam | | |
|---|---|---|---|---|---|
| Fourth lens unit | .0000 | .0000 | .0000 | .0000 | 36.0000 |
| | .0000 | 6.8483 | 13.9192 | 6.8483 | 50.0000 |
| | .0000 | 10.7930 | 21.5868 | 10.7930 | 60.0000 |
| | .0000 | 14.3274 | 27.9051 | 14.3274 | 70.0000 |
| | .0000 | 19.0288 | 35.7011 | 19.0288 | 85.0000 |
| | .0000 | 23.6070 | 42.9236 | 23.6070 | 102.0000 |

TABLE 20 (2)

| Focus cam | | Zoom cam | | | |
|---|---|---|---|---|---|
| φ f (2) | X f (2) | φ z (2) | X z (2) | F | R |
| .0000 | .0000 | .0000 | .0000 | 36.0000 | ∞ |
| −4.1628 | 1.3474 | 9.7564 | 1.3474 | 50.0000 | ∞ |
| −7.3966 | 2.5902 | 14.1902 | 2.5902 | 60.0000 | ∞ |
| −10.8073 | 3.9295 | 17.0977 | 3.9295 | 70.0000 | ∞ |
| −15.8548 | 5.9616 | 19.8463 | 5.9616 | 85.0000 | ∞ |
| −21.6162 | 8.1539 | 21.3073 | 8.1539 | 102.0000 | ∞ |
| 1.1009 | −.3243 | 1.1009 | .1165 | 36.0000 | 5000.00 |
| −3.4193 | 1.0652 | 10.5000 | 1.5060 | 50.0000 | 5000.00 |
| −6.8293 | 2.3695 | 14.7574 | 2.8103 | 60.0000 | 5000.00 |
| −10.3604 | 3.7526 | 17.5447 | 4.1934 | 70.0000 | 5000.00 |
| −15.5525 | 5.8411 | 20.1486 | 6.2819 | 85.0000 | 5000.00 |
| −21.4780 | 8.1036 | 21.4455 | 8.5444 | 102.0000 | 5000.00 |
| 1.8185 | −.5214 | 1.8185 | .1938 | 36.0000 | 3000.00 |
| −2.9548 | .8991 | 10.9644 | 1.6144 | 50.0000 | 3000.00 |
| −6.4897 | 2.2360 | 15.0971 | 2.9512 | 60.0000 | 3000.00 |
| −10.0921 | 3.6462 | 17.8130 | 4.3614 | 70.0000 | 3000.00 |
| −15.3743 | 5.7700 | 20.3268 | 6.4852 | 85.0000 | 3000.00 |
| −21.4236 | 8.0835 | 21.5000 | 8.7988 | 102.0000 | 3000.00 |
| 2.7083 | −.7503 | 2.7083 | .2935 | 36.0000 | 2000.00 |
| −2.3942 | .7132 | 11.5250 | 1.7569 | 50.0000 | 2000.00 |
| −6.0943 | 2.0799 | 15.4924 | 3.1236 | 60.0000 | 2000.00 |
| −9.7806 | 3.5224 | 18.1245 | 4.5662 | 70.0000 | 2000.00 |
| −15.1733 | 5.6895 | 20.5278 | 6.7333 | 85.0000 | 2000.00 |
| −21.3794 | 8.0672 | 21.5441 | 9.1109 | 102.0000 | 2000.00 |
| 3.6011 | −.9637 | 3.6011 | .3991 | 36.0000 | 1500.00 |
| −1.8440 | .5466 | 12.0752 | 1.9095 | 50.0000 | 1500.00 |
| −5.7149 | 1.9345 | 15.8719 | 3.2974 | 60.0000 | 1500.00 |
| −9.4874 | 3.4060 | 18.4177 | 4.7689 | 70.0000 | 1500.00 |
| −14.9936 | 5.6174 | 20.7075 | 6.9803 | 85.0000 | 1500.00 |
| −21.3454 | 8.0545 | 21.5782 | 9.4174 | 102.0000 | 1500.00 |
| 5.4494 | −1.3607 | 5.4494 | .6393 | 36.0000 | 1000.00 |
| −.7625 | .2339 | 13.1567 | 2.2339 | 50.0000 | 1000.00 |
| −4.9788 | 1.6612 | 16.6080 | 3.6612 | 60.0000 | 1000.00 |
| −8.9286 | 3.1854 | 18.9764 | 5.1854 | 70.0000 | 1000.00 |
| −14.6961 | 5.4974 | 21.0050 | 7.4974 | 85.0000 | 1000.00 |
| −21.2439 | 8.0166 | 21.6796 | 10.0166 | 102.0000 | 1000.00 |
| 6.4116 | −1.5475 | 6.4116 | .7762 | 36.0000 | 850.00 |
| −.2536 | .0785 | 13.6657 | 2.4022 | 50.0000 | 850.00 |
| −4.6274 | 1.5275 | 16.9594 | 3.8511 | 60.0000 | 850.00 |
| −8.6585 | 3.0797 | 19.2465 | 5.4034 | 70.0000 | 850.00 |
| −14.5787 | 5.4499 | 21.1223 | 7.7736 | 85.0000 | 850.00 |
| −21.2113 | 8.0043 | 21.7123 | 10.3280 | 102.0000 | 850.00 |

TABLE 21 (1)

| Focus cam | | Zoom cam | | | |
|---|---|---|---|---|---|
| φ f (1) | X f (1) | φ z (1) | X z (1) | F | R |
| .0000 | .0000 | .0000 | .0000 | 36.0000 | ∞ |
| −13.1820 | 13.9192 | .7373 | 13.9192 | 50.0000 | ∞ |
| −20.5043 | 21.5868 | 1.0825 | 21.5868 | 60.0000 | ∞ |
| −26.5690 | 27.9017 | 1.3328 | 27.9017 | 70.0000 | ∞ |
| −34.1041 | 35.7012 | 1.5971 | 35.7012 | 85.0000 | ∞ |
| −41.1070 | 42.9236 | 1.8167 | 42.9236 | 102.0000 | ∞ |
| .1019 | −.1052 | .1019 | 1.7275 | 36.0000 | 7000.00 |
| −13.0968 | 13.8328 | .8224 | 15.6655 | 50.0000 | 7000.00 |
| −20.4289 | 21.5111 | 1.1578 | 23.3438 | 60.0000 | 7000.00 |
| −26.5011 | 27.8342 | 1.4006 | 29.6669 | 70.0000 | 7000.00 |
| −34.0477 | 35.6460 | 1.6535 | 37.4787 | 85.0000 | 7000.00 |
| −41.0682 | 42.8868 | 1.8554 | 44.7195 | 102.0000 | 7000.00 |
| .1431 | −.1490 | .1431 | 2.4564 | 36.0000 | 5000.00 |
| −13.0628 | 13.7970 | .8565 | 16.4024 | 50.0000 | 5000.00 |
| −20.3991 | 21.4799 | 1.1877 | 24.0853 | 60.0000 | 5000.00 |
| −26.4743 | 27.8063 | 1.4274 | 30.4118 | 70.0000 | 5000.00 |
| −34.0250 | 35.6225 | 1.6762 | 38.2280 | 85.0000 | 5000.00 |
| −41.0540 | 42.8722 | 1.8697 | 45.4777 | 102.0000 | 5000.00 |
| .2434 | −.2555 | .2434 | 4.2574 | 36.0000 | 3000.00 |

TABLE 21 (1)-continued

| Focus cam | | Zoom cam | | | |
|---|---|---|---|---|---|
| φ f (1) | X f (1) | φ z (1) | X z (1) | F | R |
| −12.9802 | 13.7103 | .9390 | 18.2232 | 50.0000 | 3000.00 |
| −20.3268 | 21.4045 | 1.2599 | 25.9174 | 60.0000 | 3000.00 |
| −26.4107 | 27.7403 | 1.4910 | 32.2532 | 70.0000 | 3000.00 |
| −33.9671 | 35.5628 | 1.7341 | 40.0757 | 85.0000 | 3000.00 |
| −41.0137 | 42.8310 | 1.9099 | 47.3439 | 102.0000 | 3000.00 |
| .3769 | −.3972 | .3769 | 6.7223 | 36.0000 | 2000.00 |
| −12.8710 | 13.5955 | 1.0483 | 20.7151 | 50.0000 | 2000.00 |
| −20.2317 | 21.3052 | 1.3551 | 28.4247 | 60.0000 | 2000.00 |
| −26.3301 | 27.6565 | 1.5716 | 34.7761 | 70.0000 | 2000.00 |
| −33.8896 | 35.4829 | 1.8116 | 42.6025 | 85.0000 | 2000.00 |
| −40.9531 | 42.7689 | 1.9705 | 49.8884 | 102.0000 | 2000.00 |
| .5192 | −.5483 | .5192 | 9.4518 | 36.0000 | 1500.00 |
| −12.7561 | 13.4748 | 1.1631 | 23.4749 | 50.0000 | 1500.00 |
| −20.1316 | 21.2006 | 1.4552 | 31.2006 | 60.0000 | 1500.00 |
| −26.2456 | 27.5687 | 1.6562 | 37.5687 | 70.0000 | 1500.00 |
| −33.8326 | 35.4241 | 1.8686 | 45.4241 | 85.0000 | 1500.00 |
| −40.8891 | 42.7032 | 2.0346 | 52.7033 | 102.0000 | 1500.00 |
| .8341 | −.8829 | .8341 | 15.9192 | 36.0000 | 1000.00 |
| −12.5061 | 13.2122 | 1.4131 | 30.0142 | 50.0000 | 1000.00 |
| −19.9241 | 20.9839 | 1.6627 | 37.7859 | 60.0000 | 1000.00 |
| −26.0564 | 27.3721 | 1.8453 | 44.1741 | 70.0000 | 1000.00 |
| −33.6808 | 35.2675 | 2.0204 | 52.0696 | 85.0000 | 1000.00 |
| −40.7247 | 42.5346 | 2.1989 | 59.3366 | 102.0000 | 1000.00 |

TABLE 21 (2)

| | Focus cam | | Zoom cam | | |
|---|---|---|---|---|---|
| | φ f (2) | X f (2) | φ z (2) | X z (2) | F |
| Second | .0000 | .0000 | .0000 | .0000 | 36.0000 |
| lens | .0000 | 1.3475 | 13.9192 | 1.3475 | 50.0000 |
| unit | .0000 | 2.5902 | 21.5868 | 2.5902 | 60.0000 |
| | .0000 | 3.9244 | 27.9017 | 3.9244 | 70.0000 |
| | .0000 | 5.9618 | 35.7012 | 5.9618 | 85.0000 |
| | .0000 | 8.1540 | 42.9236 | 8.1540 | 102.0000 |

| | φ f (3) | X f (3) | φ z (3) | X z (3) | F |
|---|---|---|---|---|---|
| Third | .0000 | .0000 | .0000 | .0000 | 36.0000 |
| lens | .0000 | 4.6186 | 13.9192 | 4.6186 | 50.0000 |
| unit | .0000 | 7.4782 | 21.5868 | 7.4782 | 60.0000 |
| | .0000 | 10.1206 | 27.9017 | 10.1206 | 70.0000 |
| | .0000 | 13.7451 | 35.7012 | 13.7451 | 85.0000 |
| | .0000 | 17.3820 | 42.9236 | 17.3820 | 102.0000 |

| | φ f (4) | X f (4) | φ z (4) | X z (4) | F |
|---|---|---|---|---|---|
| Fourth | .0000 | .0000 | .0000 | .0000 | 36.0000 |
| lens | .0000 | 6.8483 | 13.9192 | 6.8483 | 50.0000 |
| unit | .0000 | 10.7930 | 21.5868 | 10.7930 | 60.0000 |
| | .0000 | 14.3255 | 27.9017 | 14.3255 | 70.0000 |
| | .0000 | 19.0289 | 35.7012 | 19.0289 | 85.0000 |
| | .0000 | 23.6071 | 42.9236 | 23.6071 | 102.0000 |

TABLE 22 (1)

| | Focus cam | | Zoom cam | | |
|---|---|---|---|---|---|
| | φ f (1) | X f (1) | φ z (1) | X z (1) | F |
| First | .0000 | .0000 | .0000 | .0000 | 28.8000 |
| lens | .0000 | 3.0144 | 2.8966 | 3.0144 | 35.0000 |
| unit | .0000 | 10.6482 | 8.7686 | 10.6482 | 50.0000 |
| | .0000 | 20.5331 | 16.1187 | 20.5331 | 70.0000 |
| | .0000 | 35.1672 | 28.5926 | 35.1672 | 105.0000 |
| | .0000 | 52.4447 | 45.8489 | 52.4447 | 146.0000 |

| | φ f (2) | X f (2) | φ z (2) | X z (2) | F |
|---|---|---|---|---|---|
| Second | .0000 | .0000 | .0000 | .0000 | 28.8000 |
| lens | .0000 | −1.0852 | 2.8966 | −1.0852 | 35.0000 |
| unit | .0000 | −1.0523 | 8.7686 | −1.0523 | 50.0000 |
| | .0000 | 1.9777 | 16.1187 | 1.9777 | 70.0000 |
| | .0000 | 9.9553 | 28.5926 | 9.9553 | 105.0000 |
| | .0000 | 24.0830 | 45.8489 | 24.0830 | 146.0000 |

TABLE 22 (2)

| Focus cam | | Zoom cam | | | |
|---|---|---|---|---|---|
| φ f (3) | X f (3) | φ z (3) | X z (3) | F | R |
| .0000 | .0000 | .0000 | .0000 | 28.8000 | ∞ |
| −1.7285 | 2.8966 | 1.1681 | 2.8966 | 35.0000 | ∞ |
| −6.3667 | 8.7686 | 2.4018 | 8.7686 | 50.0000 | ∞ |
| −13.3253 | 16.1187 | 2.7934 | 16.1187 | 70.0000 | ∞ |
| −26.2598 | 28.5926 | 2.3328 | 28.5926 | 105.0000 | ∞ |
| −45.2763 | 45.8489 | .5725 | 45.8489 | 146.0000 | ∞ |
| −.0711 | .1299 | −.0711 | −.1538 | 28.8000 | 7000.00 |
| −1.7932 | 2.9952 | 1.1034 | 2.7115 | 35.0000 | 7000.00 |
| −6.3922 | 8.7968 | 2.3764 | 8.5131 | 50.0000 | 7000.00 |
| −13.3338 | 16.1274 | 2.7849 | 15.8437 | 70.0000 | 7000.00 |
| −26.2314 | 28.5666 | 2.3612 | 28.2829 | 105.0000 | 7000.00 |
| −45.2411 | 45.8172 | .6078 | 45.5335 | 146.0000 | 7000.00 |
| −.1003 | .1827 | −.1003 | −.2160 | 28.8000 | 5000.00 |
| −1.8196 | 3.0354 | 1.0770 | 2.6367 | 35.0000 | 5000.00 |
| −6.4030 | 8.8087 | 2.3656 | 8.4099 | 50.0000 | 5000.00 |
| −13.3374 | 16.1311 | 2.7813 | 15.7323 | 70.0000 | 5000.00 |
| −26.2200 | 28.5562 | 2.3726 | 28.1575 | 105.0000 | 5000.00 |
| −45.2269 | 45.8045 | .6220 | 45.4057 | 146.0000 | 5000.00 |
| −.1700 | .3078 | −.1700 | −.3629 | 28.8000 | 3000.00 |
| −1.8828 | 3.1309 | 1.0138 | 2.4602 | 35.0000 | 3000.00 |
| −6.4296 | 8.8380 | 2.3390 | 8.1673 | 50.0000 | 3000.00 |
| −13.3461 | 16.1401 | 2.7726 | 15.4694 | 70.0000 | 3000.00 |
| −26.1935 | 28.5319 | 2.3991 | 27.8612 | 105.0000 | 3000.00 |
| −45.1935 | 45.7744 | .6553 | 45.1037 | 146.0000 | 3000.00 |
| −.2601 | .4679 | −.2601 | −.5499 | 28.8000 | 2000.00 |
| −1.9647 | 3.2538 | .9319 | 2.2360 | 35.0000 | 2000.00 |
| −6.4658 | 8.8781 | 2.3027 | 7.8603 | 50.0000 | 2000.00 |
| −13.3579 | 16.1523 | 2.7608 | 15.1345 | 70.0000 | 2000.00 |
| −26.1603 | 28.5016 | 2.4323 | 27.4838 | 105.0000 | 2000.00 |
| −45.1512 | 45.7364 | .6977 | 44.7186 | 146.0000 | 2000.00 |
| −.3532 | .6323 | −.3532 | −.7408 | 28.8000 | 1500.00 |
| −2.0504 | 3.3809 | .8462 | 2.0078 | 35.0000 | 1500.00 |
| −6.5058 | 8.9222 | 2.2628 | 7.5491 | 50.0000 | 1500.00 |
| −13.3706 | 16.1653 | 2.7481 | 14.7922 | 70.0000 | 1500.00 |
| −26.1274 | 28.4714 | 2.4652 | 27.0983 | 105.0000 | 1500.00 |
| −45.1083 | 45.6978 | .7406 | 44.3247 | 146.0000 | 1500.00 |
| −.5474 | .9737 | −.5474 | −1.1359 | 28.8000 | 1000.00 |
| −2.2341 | 3.6492 | .6625 | 1.5395 | 35.0000 | 1000.00 |
| −6.5981 | 9.0238 | 2.1705 | 6.9142 | 50.0000 | 1000.00 |
| −13.3985 | 16.1940 | 2.7202 | 14.0844 | 70.0000 | 1000.00 |
| −26.0625 | 28.4120 | 2.5301 | 26.3023 | 105.0000 | 1000.00 |
| −45.0207 | 45.6190 | .8281 | 43.5094 | 146.0000 | 1000.00 |

TABLE 22-(3)

| Focus cam | | Zoom cam | | | |
|---|---|---|---|---|---|
| φf(4) | Xf(4) | φz(4) | Xz(4) | F | R |
| .0000 | .0000 | .0000 | .0000 | 28.8000 | ∞ |
| −2.0584 | 1.7654 | .8382 | 1.7654 | 35.0000 | ∞ |
| −6.1715 | 5.1710 | 2.5971 | 5.1710 | 50.0000 | ∞ |
| −11.3854 | 10.4778 | 4.7333 | 10.4778 | 70.0000 | ∞ |
| −20.2568 | 20.3042 | 8.3358 | 20.3042 | 105.0000 | ∞ |
| −35.3377 | 35.7695 | 10.5112 | 35.7695 | 146.0000 | ∞ |
| −.0951 | .0827 | −.0951 | −.2010 | 28.8000 | 7000.00 |
| −2.1578 | 1.8487 | .7388 | 1.5650 | 35.0000 | 7000.00 |
| −6.2637 | 5.2495 | 2.5049 | 4.9658 | 50.0000 | 7000.00 |
| −11.4604 | 10.5684 | 4.6583 | 10.2848 | 70.0000 | 7000.00 |
| −20.3209 | 20.3671 | 8.2717 | 20.0834 | 105.0000 | 7000.00 |
| −35.3677 | 35.8005 | 10.4812 | 35.5168 | 146.0000 | 7000.00 |
| −.1340 | .1165 | −.1340 | −.2822 | 28.8000 | 5000.00 |
| −2.1977 | 1.8822 | .6989 | 1.4834 | 35.0000 | 5000.00 |
| −6.3016 | 5.2819 | 2.4670 | 4.8832 | 50.0000 | 5000.00 |
| −11.4909 | 10.6054 | 4.6278 | 10.2067 | 70.0000 | 5000.00 |
| −20.3477 | 20.3934 | 8.2449 | 19.9946 | 105.0000 | 5000.00 |
| −35.3800 | 35.8132 | 10.4689 | 35.4145 | 146.0000 | 5000.00 |
| −.2272 | .1972 | −.2272 | −.4735 | 28.8000 | 3000.00 |
| −2.2916 | 1.9607 | .6050 | 1.2900 | 35.0000 | 3000.00 |
| −6.3924 | 5.3597 | 2.3761 | 4.6890 | 50.0000 | 3000.00 |
| −11.5633 | 10.6933 | 4.5554 | 10.0226 | 70.0000 | 3000.00 |
| −20.4126 | 20.4571 | 8.1800 | 19.7864 | 105.0000 | 3000.00 |
| −35.4092 | 35.8435 | 10.4396 | 35.1728 | 146.0000 | 3000.00 |
| −.3479 | .3016 | −.3479 | −.7162 | 28.8000 | 2000.00 |
| −2.4106 | 2.0601 | .4860 | 1.0423 | 35.0000 | 2000.00 |
| −6.5107 | 5.4615 | 2.2579 | 4.4438 | 50.0000 | 2000.00 |
| −11.6561 | 10.8062 | 4.4626 | 9.7884 | 70.0000 | 2000.00 |
| −20.4988 | 20.5415 | 8.0938 | 19.5238 | 105.0000 | 2000.00 |
| −35.4471 | 35.8826 | 10.4018 | 34.8649 | 146.0000 | 2000.00 |
| −.4735 | .4101 | −.4735 | −.9630 | 28.8000 | 1500.00 |

TABLE 22-(3)-continued

| Focus cam | | Zoom cam | | | |
|---|---|---|---|---|---|
| φf(4) | Xf(4) | φz(4) | Xz(4) | F | R |
| −2.5313 | 2.1609 | .3653 | .7878 | 35.0000 | 1500.00 |
| −6.6341 | 5.5685 | 2.1345 | 4.1954 | 50.0000 | 1500.00 |
| −11.7514 | 10.9224 | 4.3673 | 9.5493 | 70.0000 | 1500.00 |
| −20.5903 | 20.6313 | 8.0023 | 19.2582 | 105.0000 | 1500.00 |
| −35.4864 | 35.9233 | 10.3625 | 34.5502 | 146.0000 | 1500.00 |
| −.7411 | .6411 | −.7411 | −1.4685 | 28.8000 | 1000.00 |
| −2.7777 | 2.3665 | .1189 | .2569 | 35.0000 | 1000.00 |
| −6.8964 | 5.7983 | 1.8722 | 3.6887 | 50.0000 | 1000.00 |
| −11.9496 | 11.1645 | 4.1691 | 9.0549 | 70.0000 | 1000.00 |
| −20.7894 | 20.8262 | 7.8032 | 18.7166 | 105.0000 | 1000.00 |
| −35.5695 | 36.0091 | 10.2794 | 33.8995 | 146.0000 | 1000.00 |

TABLE 22-(4)

| Focus Cam | | Zoom Cam | | | |
|---|---|---|---|---|---|
| φf(5) | Xf(5) | φz(5) | Xz(5) | F | R |
| .0000 | .0000 | .0000 | .0000 | 28.8000 | ∞ |
| −2.0455 | 3.5919 | .8511 | 3.5919 | 35.0000 | ∞ |
| −6.5889 | 9.9913 | 2.1797 | 9.9913 | 50.0000 | ∞ |
| −12.9669 | 17.4001 | 3.1518 | 17.4001 | 70.0000 | ∞ |
| −25.3305 | 29.0961 | 3.2621 | 29.0961 | 105.0000 | ∞ |
| −45.1820 | 45.8370 | .6669 | 45.8370 | 146.0000 | ∞ |
| −.0469 | .0841 | −.0469 | −.1996 | 28.8000 | 7000.00 |
| −2.0947 | 3.6746 | .8019 | 3.3909 | 35.0000 | 7000.00 |
| −6.6237 | 10.0333 | 2.1449 | 9.7496 | 50.0000 | 7000.00 |
| −12.9992 | 17.4365 | 3.1195 | 17.1528 | 70.0000 | 7000.00 |
| −25.2970 | 29.0679 | 3.2956 | 28.7842 | 105.0000 | 7000.00 |
| −45.1257 | 45.7894 | .7232 | 45.5058 | 146.0000 | 7000.00 |
| −.0660 | .1183 | −.0660 | −.2805 | 28.8000 | 5000.00 |
| −2.1146 | 3.7080 | .7820 | 3.3092 | 35.0000 | 5000.00 |
| −6.6381 | 10.0507 | 2.1304 | 9.6519 | 50.0000 | 5000.00 |
| −13.0124 | 17.4514 | 3.1062 | 17.0526 | 70.0000 | 5000.00 |
| −25.2840 | 29.0569 | 3.3086 | 28.6581 | 105.0000 | 5000.00 |
| −45.1030 | 45.7703 | .7459 | 45.3715 | 146.0000 | 5000.00 |
| −.1112 | .1993 | −.1112 | −.4714 | 28.8000 | 3000.00 |
| −2.1615 | 3.7866 | .7351 | 3.1159 | 35.0000 | 3000.00 |
| −6.6729 | 10.0925 | 2.0957 | 9.4218 | 50.0000 | 3000.00 |
| −13.0440 | 17.4868 | 3.0747 | 16.8161 | 70.0000 | 3000.00 |
| −25.2545 | 29.0320 | 3.3381 | 28.3613 | 105.0000 | 3000.00 |
| −45.0495 | 45.7251 | .7994 | 45.0544 | 146.0000 | 3000.00 |
| −.1693 | .3032 | −.1693 | −.7146 | 28.8000 | 2000.00 |
| −2.2213 | 3.8862 | .6753 | 2.8685 | 35.0000 | 2000.00 |
| −6.7186 | 10.1476 | 2.0500 | 9.1298 | 50.0000 | 2000.00 |
| −13.0847 | 17.5325 | 3.0340 | 16.5147 | 70.0000 | 2000.00 |
| −25.2195 | 29.0025 | 3.3731 | 27.9848 | 105.0000 | 2000.00 |
| −44.9817 | 45.6678 | .8672 | 44.6501 | 146.0000 | 2000.00 |
| −.2290 | .4101 | −.2290 | −.9630 | 28.8000 | 1500.00 |
| −2.2823 | 3.9874 | .6143 | 2.6143 | 35.0000 | 1500.00 |
| −6.7671 | 10.2059 | 2.0015 | 8.8328 | 50.0000 | 1500.00 |
| −13.1266 | 17.5794 | 2.9921 | 16.2063 | 70.0000 | 1500.00 |
| −25.1867 | 28.9749 | 3.4059 | 27.6018 | 105.0000 | 1500.00 |
| −44.9128 | 45.6097 | .9361 | 44.2366 | 146.0000 | 1500.00 |
| −.3539 | .6334 | −.3539 | −1.4762 | 28.8000 | 1000.00 |
| −2.4081 | 4.1947 | .4885 | 2.0851 | 35.0000 | 1000.00 |
| −6.8730 | 10.3329 | 1.8956 | 8.2233 | 50.0000 | 1000.00 |
| −13.2137 | 17.6769 | 2.9050 | 15.5672 | 70.0000 | 1000.00 |
| −25.1286 | 28.9259 | 3.4640 | 26.8163 | 105.0000 | 1000.00 |
| −44.7717 | 45.4905 | 1.0771 | 43.3809 | 146.0000 | 1000.00 |

TABLE 23-(1)

| Focus cam | | Zoom cam | | | |
|---|---|---|---|---|---|
| φf(1) | Xf(1) | φz(1) | Xz(1) | F | R |
| .0000 | .0000 | .0000 | .0000 | 37.0000 | ∞ |
| −1.7331 | −19.8741 | 5.2660 | −19.8741 | 50.0000 | ∞ |
| −6.7602 | −30.9590 | 11.0069 | −30.9590 | 70.0000 | ∞ |
| −.0385 | −.7469 | −.0385 | .1755 | 37.0000 | 7000.00 |
| −1.8448 | −20.4963 | 5.1544 | −19.5739 | 50.0000 | 7000.00 |
| −7.0708 | −31.1588 | 10.6963 | −30.2365 | 70.0000 | 7000.00 |
| −.0559 | −1.0738 | −.0559 | .2545 | 37.0000 | 5000.00 |
| −1.8944 | −20.7670 | 5.1048 | −19.4387 | 50.0000 | 5000.00 |
| −7.2597 | −31.2756 | 10.5074 | −29.9473 | 70.0000 | 5000.00 |
| −.1000 | −1.8805 | −.1000 | .4543 | 37.0000 | 3000.00 |
| −2.0204 | −21.4256 | 4.9788 | −19.0908 | 50.0000 | 3000.00 |
| −7.7888 | −31.5883 | 9.9783 | −29.2535 | 70.0000 | 3000.00 |
| −.1588 | −2.9233 | −.1588 | .7199 | 37.0000 | 2000.00 |

TABLE 23-(1)-continued

| Focus cam | | Zoom cam | | | |
|---|---|---|---|---|---|
| φf(1) | Xf(1) | φz(1) | Xz(1) | F | R |
| −2.1942 | −22.2454 | 4.8050 | −18.6022 | 50.0000 | 2000.00 |
| −8.4510 | −31.9588 | 9.3161 | −28.3156 | 70.0000 | 2000.00 |
| −.2208 | −4.0008 | −.2208 | .9992 | 37.0000 | 1500.00 |
| −2.3902 | −23.0438 | 4.6090 | −18.0438 | 50.0000 | 1500.00 |
| −9.0878 | −32.3017 | 8.6793 | −27.3017 | 70.0000 | 1500.00 |
| −.3548 | −6.2431 | −.3548 | 1.5993 | 37.0000 | 1000.00 |
| −2.8355 | −24.6013 | 4.1637 | −16.7589 | 50.0000 | 1000.00 |
| −10.3087 | −32.9403 | 7.4584 | −25.0979 | 70.0000 | 1000.00 |

TABLE 23-(2)

| Focus cam | | Zoom cam | | | |
|---|---|---|---|---|---|
| φf(2) | Xf(2) | φz(2) | Xz(2) | F | R |
| .0000 | .0000 | .0000 | .0000 | 37.0000 | ∞ |
| −2.1166 | 6.9992 | 4.8826 | 6.9992 | 50.0000 | ∞ |
| −7.7139 | 17.7671 | 10.0532 | 17.7671 | 70.0000 | ∞ |
| .1608 | −.7141 | .1608 | .2082 | 37.0000 | 7000.00 |
| −1.9012 | 6.4284 | 5.0980 | 7.3507 | 50.0000 | 7000.00 |
| −7.5508 | 17.5456 | 10.2163 | 18.4679 | 70.0000 | 7000.00 |
| .2295 | −1.0312 | .2295 | .2971 | 37.0000 | 5000.00 |
| −1.8081 | 6.1757 | 5.1911 | 7.5040 | 50.0000 | 5000.00 |
| −7.4841 | 17.4532 | 10.2830 | 18.7815 | 70.0000 | 5000.00 |
| .3927 | −1.8259 | .3927 | .5089 | 37.0000 | 3000.00 |
| −1.5818 | 5.5449 | 5.4174 | 7.8797 | 50.0000 | 3000.00 |
| −7.3192 | 17.2194 | 10.4479 | 19.5543 | 70.0000 | 3000.00 |
| .5881 | −2.8796 | .5881 | .7636 | 37.0000 | 2000.00 |
| −1.2979 | 4.7145 | 5.7013 | 8.3577 | 50.0000 | 2000.00 |
| −7.0802 | 16.8631 | 10.6870 | 20.5063 | 70.0000 | 2000.00 |
| .7673 | −4.0008 | .7673 | .9992 | 37.0000 | 1500.00 |
| −1.0220 | 3.8296 | 5.9772 | 8.8296 | 50.0000 | 1500.00 |
| −6.8105 | 16.4244 | 10.9566 | 21.4244 | 70.0000 | 1500.00 |
| 1.1015 | −6.3972 | 1.1015 | 1.4452 | 37.0000 | 1000.00 |
| −.4779 | 1.9512 | 6.5213 | 9.7936 | 50.0000 | 1000.00 |
| −6.2979 | 15.4791 | 11.4693 | 23.3215 | 70.0000 | 1000.00 |

TABLE 24-(1)

| Focus cam | | Zoom can | | |
|---|---|---|---|---|
| | | First lens unit | | |
| φf(1) | Xf(1) | φz(1) | Xz(1) | F |
| .0000 | .0000 | .0000 | .0000 | 36.0000 |
| .0000 | 13.9192 | 13.9192 | 13.9192 | 50.0000 |
| .0000 | 21.5868 | 21.5868 | 21.5868 | 60.0000 |
| .0000 | 27.9017 | 27.9017 | 27.9017 | 70.0000 |
| .0000 | 35.7012 | 35.7012 | 35.7012 | 85.0000 |
| .0000 | 42.9236 | 42.9236 | 42.9236 | 102.0000 |
| | | Second lens unit | | |
| φf(2) | Xf(2) | φz(2) | Xz(2) | F |
| .0000 | .0000 | .0000 | .0000 | 36.0000 |
| .0000 | 1.3475 | 13.9192 | 1.3475 | 50.0000 |
| .0000 | 2.5902 | 21.5868 | 2.5902 | 60.0000 |
| .0000 | 3.9244 | 27.9017 | 3.9244 | 70.0000 |
| .0000 | 5.9618 | 35.7012 | 5.9618 | 85.0000 |
| .0000 | 8.1540 | 42.9236 | 8.1540 | 102.0000 |

TABLE 24-(2)

| Focus cam | | Zoom cam | | | |
|---|---|---|---|---|---|
| φf(3) | Xf(3) | φz(3) | Xz(3) | F | R |
| .0000 | .0000 | .0000 | .0000 | 36.0000 | ∞ |
| 7.5494 | 4.6186 | 21.4688 | 4.6186 | 50.0000 | ∞ |
| 11.8838 | 7.4782 | 33.4705 | 7.4782 | 60.0000 | ∞ |
| 15.7733 | 10.1206 | 43.6750 | 10.1206 | 70.0000 | ∞ |
| 21.3252 | 13.7451 | 57.0264 | 13.7451 | 85.0000 | ∞ |
| 27.3794 | 17.3820 | 70.3030 | 17.3820 | 102.0000 | ∞ |
| −1.5489 | −.8559 | −1.5489 | −.3168 | 36.0000 | 5000.00 |
| 6.2365 | 3.7823 | 20.1558 | 4.3214 | 50.0000 | 5000.00 |
| 10.6085 | 6.6224 | 32.1953 | 7.1615 | 60.0000 | 5000.00 |
| 14.4682 | 9.2350 | 42.3699 | 9.7741 | 70.0000 | 5000.00 |
| 19.8231 | 12.7943 | 55.5243 | 13.3334 | 85.0000 | 5000.00 |
| 25.6710 | 16.3762 | 68.5946 | 16.9153 | 102.0000 | 5000.00 |
| −2.6565 | −1.4471 | −2.6565 | −.5420 | 36.0000 | 3000.00 |

TABLE 24-(2)-continued

| Focus cam | | Zoom cam | | | |
|---|---|---|---|---|---|
| $\phi f(3)$ | $Xf(3)$ | $\phi z(3)$ | $Xz(3)$ | F | R |
| 5.3361 | 3.2137 | 19.2553 | 4.1188 | 50.0000 | 3000.00 |
| 9.7325 | 6.0405 | 31.3193 | 6.9456 | 60.0000 | 3000.00 |
| 13.5896 | 8.6367 | 41.4914 | 9.5418 | 70.0000 | 3000.00 |
| 18.8352 | 12.1575 | 54.5364 | 13.0626 | 85.0000 | 3000.00 |
| 24.5271 | 15.6974 | 67.4508 | 16.6024 | 102.0000 | 3000.00 |
| −4.0881 | −2.2050 | −4.0881 | −.8316 | 36.0000 | 2000.00 |
| 4.1606 | 2.4820 | 18.0799 | 3.8560 | 50.0000 | 2000.00 |
| 8.5916 | 5.2927 | 30.1783 | 6.6667 | 60.0000 | 2000.00 |
| 12.4642 | 7.8719 | 40.3659 | 9.2459 | 70.0000 | 2000.00 |
| 17.6087 | 11.3531 | 53.3099 | 12.7271 | 85.0000 | 2000.00 |
| 23.0948 | 14.8367 | 66.0185 | 16.2106 | 102.0000 | 2000.00 |
| −5.6306 | −3.0047 | −5.6306 | −1.1425 | 36.0000 | 1500.00 |
| 2.9050 | 1.7149 | 16.8242 | 3.5771 | 50.0000 | 1500.00 |
| 7.3806 | 4.5112 | 28.9673 | 6.3734 | 60.0000 | 1500.00 |
| 11.2850 | 7.0756 | 39.1867 | 8.9378 | 70.0000 | 1500.00 |
| 16.3757 | 10.5284 | 52.0769 | 12.3906 | 85.0000 | 1500.00 |
| 21.6617 | 13.9562 | 64.5854 | 15.8184 | 102.0000 | 1500.00 |
| −9.4171 | −4.8057 | −9.4171 | −1.9057 | 36.0000 | 1000.00 |
| .1070 | .0623 | 14.0262 | 2.9623 | 50.0000 | 1000.00 |
| 4.7500 | 2.8463 | 26.3368 | 5.7463 | 60.0000 | 1000.00 |
| 8.7185 | 5.3753 | 36.6202 | 8.2753 | 70.0000 | 1000.00 |
| 13.8257 | 8.7974 | 49.5268 | 11.6974 | 85.0000 | 1000.00 |
| 18.7998 | 12.1346 | 61.7234 | 15.0346 | 102.0000 | 1000.00 |
| −11.6051 | −5.8281 | −11.6051 | −2.3491 | 36.0000 | 850.00 |
| −1.6099 | −.8888 | 12.3094 | 2.5902 | 50.0000 | 850.00 |
| 3.2266 | 1.9101 | 24.8134 | 5.3891 | 60.0000 | 850.00 |
| 7.2368 | 4.4192 | 35.1386 | 7.8982 | 70.0000 | 850.00 |
| 12.4084 | 7.8341 | 48.1095 | 11.3131 | 85.0000 | 850.00 |
| 17.2914 | 11.1421 | 60.2150 | 14.6210 | 102.0000 | 850.00 |

TABLE 24-(3)

| Focus cam | | Zoom cam | | | |
|---|---|---|---|---|---|
| $\phi f(4)$ | $Xf(4)$ | $\phi z(4)$ | $Xz(4)$ | F | R |
| .0000 | .0000 | .0000 | .0000 | 36.0000 | ∞ |
| 11.5031 | 6.8483 | 25.4224 | 6.8483 | 50.0000 | ∞ |
| 18.0541 | 10.7930 | 39.6409 | 10.7930 | 60.0000 | ∞ |
| 23.9129 | 14.3255 | 51.8147 | 14.3255 | 70.0000 | ∞ |
| 32.5954 | 19.0289 | 68.2966 | 19.0289 | 85.0000 | ∞ |
| 42.6130 | 23.6071 | 85.5366 | 23.6071 | 102.0000 | ∞ |
| −1.7866 | −1.0075 | −1.7866 | −.4684 | 36.0000 | 5000.00 |
| 9.8400 | 5.8577 | 23.7593 | 6.3968 | 50.0000 | 5000.00 |
| 16.3835 | 9.7802 | 37.9703 | 10.3193 | 60.0000 | 5000.00 |
| 22.1385 | 13.2672 | 50.0403 | 13.8063 | 70.0000 | 5000.00 |
| 30.2300 | 17.8360 | 65.9312 | 18.3751 | 85.0000 | 5000.00 |
| 39.6105 | 22.2883 | 82.5341 | 22.8274 | 102.0000 | 5000.00 |
| −3.0311 | −1.6988 | −3.0311 | −.7937 | 36.0000 | 3000.00 |
| 8.7172 | 5.1870 | 22.6364 | 6.0921 | 50.0000 | 3000.00 |
| 15.2487 | 9.0939 | 36.8355 | 9.9990 | 60.0000 | 3000.00 |
| 20.9588 | 12.5556 | 48.8606 | 13.4607 | 70.0000 | 3000.00 |
| 28.7487 | 17.0564 | 64.4499 | 17.9615 | 85.0000 | 3000.00 |
| 37.6524 | 21.4110 | 80.5760 | 22.3161 | 102.0000 | 3000.00 |
| −4.6446 | −2.5880 | −4.6446 | −1.2141 | 36.0000 | 2000.00 |
| 7.2986 | 4.3336 | 21.2179 | 5.7076 | 50.0000 | 2000.00 |
| 13.7845 | 8.2138 | 35.3713 | 9.5878 | 60.0000 | 2000.00 |
| 19.4610 | 11.6488 | 47.3628 | 13.0228 | 70.0000 | 2000.00 |
| 26.9862 | 16.0916 | 62.6875 | 17.4655 | 85.0000 | 2000.00 |
| 35.2783 | 20.3188 | 78.2020 | 21.6927 | 102.0000 | 2000.00 |
| −6.3779 | −3.5265 | −6.3779 | −1.6643 | 36.0000 | 1500.00 |
| 5.8198 | 3.4447 | 19.7390 | 5.3069 | 50.0000 | 1500.00 |
| 12.2548 | 7.2986 | 33.8416 | 9.1608 | 60.0000 | 1500.00 |
| 17.9158 | 10.7104 | 45.8175 | 12.5726 | 70.0000 | 1500.00 |
| 25.2626 | 15.1142 | 60.9638 | 16.9764 | 85.0000 | 1500.00 |
| 32.9958 | 19.2268 | 75.9194 | 21.0890 | 102.0000 | 1500.00 |
| −10.4722 | −5.6253 | −10.4722 | −2.7253 | 36.0000 | 1000.00 |
| 2.6478 | 1.5466 | 16.5670 | 4.4468 | 50.0000 | 1000.00 |
| 9.0133 | 5.3644 | 30.6001 | 8.2644 | 60.0000 | 1000.00 |
| 14.6322 | 8.7225 | 42.5339 | 11.6225 | 70.0000 | 1000.00 |
| 21.8581 | 13.0983 | 57.5592 | 15.9983 | 85.0000 | 1000.00 |
| 28.7276 | 17.0451 | 71.6512 | 19.9451 | 102.0000 | 1000.00 |
| −12.7922 | −6.8020 | −12.7922 | −3.3230 | 36.0000 | 850.00 |
| .8162 | .4716 | 14.7354 | 3.9506 | 50.0000 | 850.00 |
| 7.2417 | 4.2994 | 28.8285 | 7.7783 | 60.0000 | 850.00 |
| 12.7780 | 7.6114 | 40.6798 | 11.0903 | 70.0000 | 850.00 |
| 20.0169 | 11.9858 | 55.7181 | 15.4648 | 85.0000 | 850.00 |
| 26.6414 | 15.8985 | 69.5650 | 19.3775 | 102.0000 | 850.00 |

As has been shown in the foregoing, according to the invention the displacement of the cam cylinder which is displaced for focusing is substantially held constant irrespective of changes in the focal distance, i.e., changes in the zooming state, and despite this simple construction it is possible to permit the displacement of the focusing lens unit itself for focusing to be varied according to the zooming state or, where there are a plurality of focusing lens units, permit displacement of the individual focusing lens units to different extents. It is this possible to permit utmost us of the freedom of the lens system. For this reason, it is possible to compensate for close aberration variations by the commonly termed floating with a plurality of focusing lenses and maintain stable and excellent focusing performance at all time in the photography of infinitely distant as well as close objects. Further, the focusing system according to the invention permits the commonly termed manual focusing in all focusing systems based on displacement of lens units other than lens units fixed with respect to the image plane at the time of zooming (such as front lens feed, all lens feed, inner focus rear focus and floating) so long as there is a practical solution of focus substantially in any zoom lens system. In addition, it is possible to revolutionally increase the promptness of auto-focusing.

The zoom lens barrel structure of the embodiment shown in FIG. 2A will now be described with reference to FIG. 26.

Figure 26:
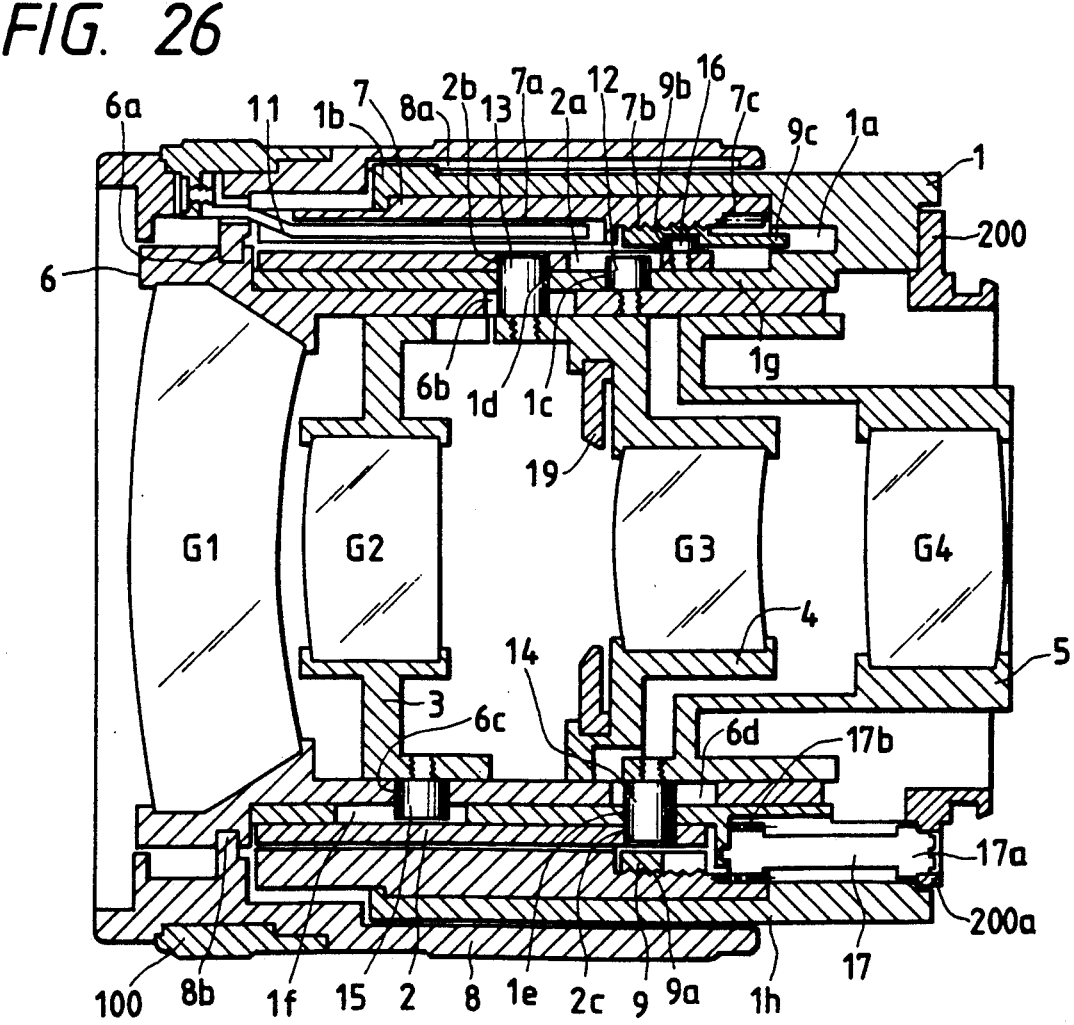
FIG. 26 is a sectional view showing a cam cylinder in the zoom lens shown in FIGS. 2A and 2B.

Referring to FIG. 26, the structure comprises stationary cylinder 1 integral with byonet 200 which is mounted on a camera body and outer cylinder 1h. Optical systems G1 to G4 for photography are held in inner cylinder 1g. Movable holding member 6 holding optical system G1 which participates in zooming only is slidably provided in inner cylinder 1g of stationary cylinder 1. Holder 6 has drive pin 12, which is engaged in lead groove 1c of inner cylinder 1g and also in straight run groove 2a formed in cam ring 2 fitted on inner cylinder 1g for rotation and displacement in the optical axis direction. Movable holder 3 holding optical system G2 which participates in zooming only is slidably provided in movable holder 6. Movable holder 3 has drive pin 15, which is engaged in cam groove 6c of holder 6 and also in straight run guide groove 1f of inner cylinder 1g.

In movable holder 6, movable holders 4 and 5 are slidably provided, which hold respective lens units G3 and G4 having both the functions of focusing and zooming. Movable holder 4 has drive pin 13, which is engaged in zooming guide groove 1d provided in inner cylinder 1g of stationary cylinder 1 and also in focusing guide groove 2b provided in cam ring 2. Movable holder 6 has escapement groove 6b for pin 13. Holder 5, likewise, has drive pin 14, which is engaged in zooming guide groove 1e provided in inner cylinder 1g of stationary cylinder 1 and focusing guide groove 2c provided in cam ring 2. Movable holder 6 has escapement groove 6d for pin 14.

Figure 27:
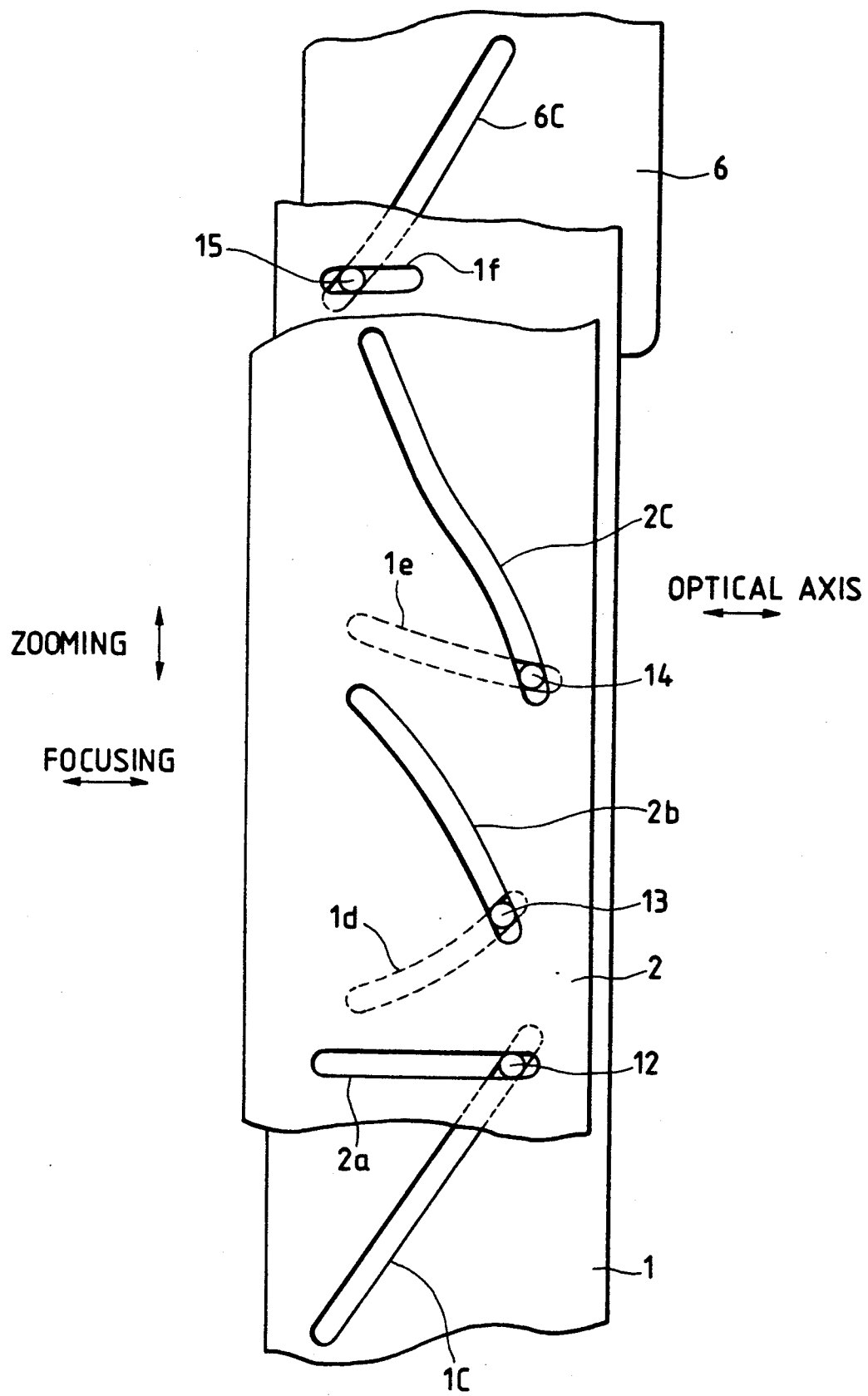
FIG. 27 is a fragmentary developed view showing the cam cylinder shown in FIG. 26.

FIG. 27 is a developed view showing the relationship among zooming guide grooves 1d and 1e of stationary cylinder 1 and focusing guide grooves 2b and 2c of cam ring 2. Here, actual shapes of the structure shown in FIGS. 14A and 14B are shown.

Zoom ring 8 has protuberance 8b rotatably fitted in recess 6a formed in a front side outer periphery of movable holder 6. Key 1b provided at an end of outer cylinder 1h of stationary cylinder 1 is fitted in straight run guide groove 8a formed in the inner periphery of zoom ring 8. In a front portion of zoom ring 8 (remoter from the mount), distance ring 100 is rotatably provided on zoom ring 8. Straight run key 11 is secured by screw to distance ring 100. Rotation transmitting member 7 is fitted in outer cylinder 1h of the stationary cylinder for rotation about the optical axis and not for displacement in the optical axis direction. Rotation transmitting member 7 is provided with straight run groove 7a, in which key 11 is engaged.

The inner periphery of member 7 is formed with female helicoid thread 7b. Straight run key 9 has male helicoid thread 9a meshing with thread 7b. Member 9 has key 9c provided at a position closer to the mount. Key 9c is engaged in straight run groove 1a of stationary cylinder 1. The inner periphery of member 9 is provided with circumferential guide groove 9b, in which pin 16 of cam ring 2 is engaged. Member 7 has gear 7c provided on the mount side. Gear 7c is in mesh with rotary shaft gear 17b, which is supported in rotary shaft bearing 20a of mount 200 and a portion of inner cylinder 1g of stationary cylinder 1 for rotation but not for displacement in the axial direction. Rotary shaft 17 is provided on the mount side with coupling recess 17a for transmitting drive force of a drive shaft (not shown) of the camera body to the lens side.

The operation of the above barrel will now be described. For zooming, zoom ring 8 is displaced straight. Zoom ring 8 can only be displaced straight and can not be rotated due to engagement between straight run guide groove 8a and key 1b of stationary cylinder 1. Displacement of zoom ring 8 in the optical axis direction is transmitted to movable holder 6 via protuberance 8b and recess 6a. Since drive pin 12 integral with member 6 is engaged in lead groove 1c of stationary cylinder 1, member 6 is driven in the optical axis direction while being rotated by lead groove 1c and pin 12.

Meanwhile, since pin 15 integral with movable holder 3 holding lens unit G2 is engaged in cam groove 6c of member 6 and straight run groove 1f of the stationary cylinder, lens unit G2 is displaced in the optical axis direction with the movement of member 6.

Further, pin 12 is engaged in straight groove 2a of cam ring 2, and pin 16 integral with cam ring 2 is restricted against displacement in the optical axis direction by circumferential groove 9b of member 9 unless focusing is done by the above structure. Thus, when member 6 is displaced while it is rotated, cam ring 2 is rotated about the optical axis.

When cam ring 2 is rotated about the optical axis, lens units G3 and G4 having both the functions of focusing and zooming are displaced in the optical axis direction along the zooming and focusing guide grooves. By the above operation, lens units G1 to G4 are displaced along the optical axis for zooming.

Focusing operation will now be described. For manual focusing, distance ring 100 is rotated. Rotation of distance ring 100 is converted to displacement of cam ring 2 in the optical axis direction by focusing conversion transmitting means, while consists of key 11 integral with distance ring 100, helicoid 7b provided in member 7, which transmits only rotation of key 11, helicoid thread 9a meshing with helicoid 7b, key 9c, straight run groove 1a of the stationary cylinder in engagement with key 9c, circumferential groove 9b of member 9 and pin 16 integral with cam ring 2. When cam ring 2 is displaced in the optical axis direction, pin 12 engaged in straight run groove 2a of cam ring 2 is not driven.

Thus, with the above structure lens units G1 and G2 are held stationary when cam ring 2 is displaced in the optical axis direction.

On the other hand, when cam ring 2 is displaced in the optical axis direction, focusing lens units G3 and G4 are displaced in the axis direction along the zooming and focusing guide grooves for focusing.

In auto-focusing, drive force from a motor on the camera body side is transmitted from coupling recess 17a of lens side rotary shaft 17 to rotate gear 17b, causing rotation of member 7 via gear 7a meshing with gear, 7b to rotate distance ring 100. Thus focusing is done in a manner like the manual focusing described above.

As has been shown, with the barrel having the above construction both zooming and focusing are possible with stationary cam cylinder 1 with zooming guide grooves 1d and 1e and cam ring 2 with focusing guide grooves 2b with focusing guide grooves 2b and 2c. Displacement of the cam ring necessary for focusing from infinitely distant state to a predetermined object distance may be made substantially constant irrespective of the zooming state.

For this reason, compensation for close aberration variations with floating is possible with a simple construction permitting both focusing and zooming with single cam groove 2, and high performance can be obtained at the time of close focusing.

Further, since manual focusing possible with rotation of distance ring 100, which is displaced in unison with zoom ring 8 in the optical axis direction, it is possible to improve the promptness of manual operation and operability of focusing.

We claim:

1. A zoom lens barrel comprising:
   a zoom lens optical system including at least one lens unit capable of being displaced along an optical axis for zooming and also for focusing;
   a cylindrical focusing member having at least one focus cam groove;
   a cylindrical zooming member having at least one zoom cam groove;
   engaging means for engaging said at least one lens unit in said focus and zoom cam grooves;
   zooming means for causing relative rotation about the optical axis between said cylindrical focusing and zooming members for zooming of said zoom lens optical system, said at least one lens unit being displaced along the optical axis with relative rotation between said cylindrical focusing and zooming members; and
   focusing means for causing relative displacement along the optical axis between said cylindrical focusing and zooming members for focusing of said zoom lens optical system, said at least one lens unit being displaced along the optical axis with relative displacement between said cylindrical focusing and zooming members;
   said focus cam groove being formed non-linear so that said cylindrical focusing and zooming members may be relatively displaced to a substantially constant extent irrespective of the focal distance of said zoom lens optical system and that said at least one lens unit may be displaced in the optical axis direction by said focusing means to a variable extent according to the focal distance of said zoom lens optical system.

2. The zoom lens barrel according to claim 1, wherein said cylindrical zooming member is fixed with respect to said barrel.

3. The zoom lens barrel according to claim 1, wherein said zoom lens optical system includes a first lens unit having positive refracting power and capable of being displaced along the optical axis for zooming, a second lens unit having negative refracting power and capable of being displaced along the optical axis for zooming and third and fourth lens units having positive refracting power and capable of being displaced along the optical axis for fulfilling both the functions of zooming and focusing, said cylindrical zooming member has two zoom cam grooves for displacing said third and fourth lens units, and said cylindrical focusing member has two focus cam grooves for displacing said third and fourth lens units, said first to fourth lens units being arranged in the mentioned order from the object side.

4. The zoom lens barrel according to claim 1, wherein said zoom lens optical system includes a first lens unit having positive refracting power and capable of being displaced along the optical axis for zooming, a second lens unit having negative refracting power and capable of being displaced along the optical axis for zooming, a third lens unit having positive refracting power and capable of being displaced along the optical axis for fulfilling both the functions of zooming and focusing and a fourth lens unit having positive refracting power and capable of being displace along the optical axis for zooming, said first to fourth lens units being arranged in the mentioned order from object side, and wherein said cylindrical zooming and focusing members cause displacement of said third lens unit along the optical axis.

5. The zoom lens barrel according to claim 1, wherein said zoom lens optical system includes a first lens unit having positive refracting power and capable of being displaced along the optical aixs for zooming, a second lens unit having negative refracting power and capable of being displaced along the optical axis for fulfilling both the functions of zooming and focusing and third and fourth lens units having positive refracting power and capable of being displace along the optical axis for zooming, said first to fourth lens units being arranged in the mentioned order from the object side, and wherein said cylindrical zooming and focusing members cause displacement of said second lens unit along the optical axis.

6. The zooming lens barrel according to claim 1, wherein said zoom lens optical system includes a first lens unit having positive refracting power and capable of being displaced along the optical axis for fulfilling both the functions of zooming and focusing, a second lens unit having negative refracting power and capable of being displaced along the optical axis for zooming and third and fourth lens units having positive refracting power and capable of being displaced along the optical axis for zooming, said first to fourth lens units being arranged in the mentioned order from the object side, and wherein said cylindrical zooming and focusing members cause displacement of said first lens unit along the optical axis.

7. The zoom lens barrel according to claim 1, wherein said zoom lens optical system includes a first lens unit having positive refracting power and capable of being displaced along the optical axis for zooming, a second lens unit having negative refracting power and capable of being displaced along the optical axis for zooming, a third lens unit having positive refracting power and capable of being displaced along the optical axis for fulfilling both the functions of zooming and focusing, a fourth lens unit having negative power and capable of being displaced along the optical axis for fulfilling both the functions of zooming and focusing and a fifth lens unit having positive refracting power and capable of being displaced along the optical axis for fulfilling both the functions of zooming and focusing, said first to fifth lens units being arranged in the mentioned order from the object side, wherein said cylindrical zooming member has three zoom cam grooves for displacing said third to fifth lens units, and wherein said cylindrical focusing member has three focus cam grooves for displacing said third to fifth lens units.

8. The zoom lens barrel according to claim 1, wherein said zoom lens optical system includes a first lens unit having negative refracting power and capable of being displaced along the optical axis for fulfilling both the functions of zooming and focusing and a second lens unit having positive refracting power and capable of being displaced along the optical axis for fulfilling both the functions of zooming and focusing, said first and second lens units being arranged in the mentioned order from the object side, wherein said cylindrical zooming member has two zoom cam grooves for displacing said first and second lens units, and wherein said cylindrical focusing member has two focus cam grooves for displacing said first and second lens units.

9. The zoom lens barrel according to claim 1, which further comprises a further lens unit contributing to zooming but not contributing to focusing, a zoom ring capable of being displaced in the optical axis direction for zooming and further engaging means for engaging said further lens unit in said zoom ring, displacement of said zoom ring in the optical axis direction being converted by zooming means into relative rotation between said cylindrical focusing and zooming members.

10. The zoom lens barrel according to claim 9, which further comprises a distance ring rotatable about the optical axis for focusing, rotation of said distance ring being converted by focusing means into relative displacement between said cylindrical focusing and zooming members.

* * * * *